(12) United States Patent
Agrawal et al.

(10) Patent No.: US 10,948,796 B2
(45) Date of Patent: Mar. 16, 2021

(54) ELECTROCHROMIC MATERIALS, DEVICES AND APPLICATIONS OF THE SAME

(71) Applicants: Anoop Agrawal, Tucson, AZ (US); John P Cronin, Tucson, AZ (US); Lori L Adams, Tucson, AZ (US); Juan Carlos L Tonazzi, Tucson, AZ (US)

(72) Inventors: Anoop Agrawal, Tucson, AZ (US); John P Cronin, Tucson, AZ (US); Lori L Adams, Tucson, AZ (US); Juan Carlos L Tonazzi, Tucson, AZ (US)

( * ) Notice: Subject to any disclaimer, the term of this patent is extended or adjusted under 35 U.S.C. 154(b) by 210 days.

(21) Appl. No.: 14/679,213

(22) Filed: Apr. 6, 2015

(65) Prior Publication Data
US 2016/0091767 A1     Mar. 31, 2016

Related U.S. Application Data

(62) Division of application No. 13/002,275, filed as application No. PCT/US2009/049644 on Jul. 2, 2009, now Pat. No. 9,030,724.

(60) Provisional application No. 61/078,328, filed on Jul. 3, 2008, provisional application No. 61/087,796, filed on Aug. 11, 2008, provisional application No. 61/109,691, filed on Oct. 30, 2008, provisional application No. 61/156,932, filed on Mar. 3, 2009, provisional application No. 61/168,421, filed on Apr. 10, 2009, provisional application No. 61/187,619, filed on Jun. 16, 2009.

(51) Int. Cl.
*G02F 1/163*     (2006.01)
*G02F 1/155*     (2006.01)
*G02F 1/1506*    (2019.01)
*G02F 1/161*     (2006.01)
*G02F 1/1516*    (2019.01)
*G02F 1/15*      (2019.01)
*G02F 1/153*     (2006.01)

(52) U.S. Cl.
CPC ............. *G02F 1/163* (2013.01); *G02F 1/155* (2013.01); *G02F 1/1506* (2013.01); *G02F 1/161* (2013.01); *G02F 1/1508* (2013.01); *G02F 1/1533* (2013.01); *G02F 1/15165* (2019.01); *Y10T 29/49155* (2015.01)

(58) Field of Classification Search
CPC . G02F 1/155; G02F 1/163; G02F 1/15; G02F 2001/1515; G02F 1/1525; G02F 1/167; G02F 1/0018; G02F 1/133305; G02F 2001/133374; G02F 1/1514; G02F 2001/15145
USPC ......................................... 359/245, 265–275
See application file for complete search history.

(56) References Cited

U.S. PATENT DOCUMENTS

| | | | |
|---|---|---|---|
| 5,673,028 A * | 9/1997 | Levy ....................... | G01D 7/005 116/209 |
| 2003/0179432 A1* | 9/2003 | Vincent ................... | G02F 1/155 359/265 |

(Continued)

*Primary Examiner* — Jordan M Schwartz

(57) ABSTRACT

This invention discloses how EC devices can be fabricated as tags or labels; and further the materials used, device structures and how these can be processed by printing technologies. In addition, systems using displays of such EC devices and their integration with other components are described for forming labels and tags, etc, that may be actuated wirelessly or powered with low voltage and low capacity batteries.

34 Claims, 26 Drawing Sheets

(56) References Cited

U.S. PATENT DOCUMENTS

| | | | | |
|---|---|---|---|---|
| 2003/0227664 A1* | 12/2003 | Agrawal | ............... | G02F 1/1523 359/269 |
| 2007/0139756 A1* | 6/2007 | Agrawal | ................... | G02F 1/15 359/265 |
| 2007/0140072 A1* | 6/2007 | Agrawal | ................... | G02F 1/15 369/14 |

* cited by examiner

Display area

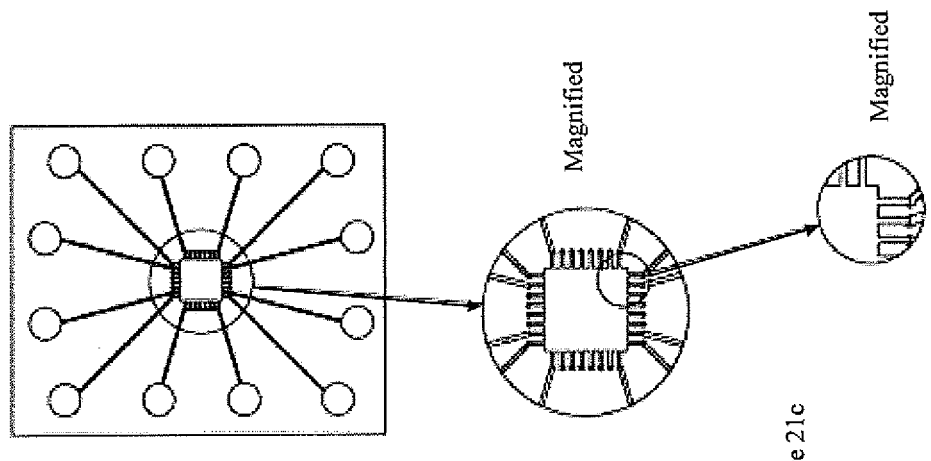
Figure 21c
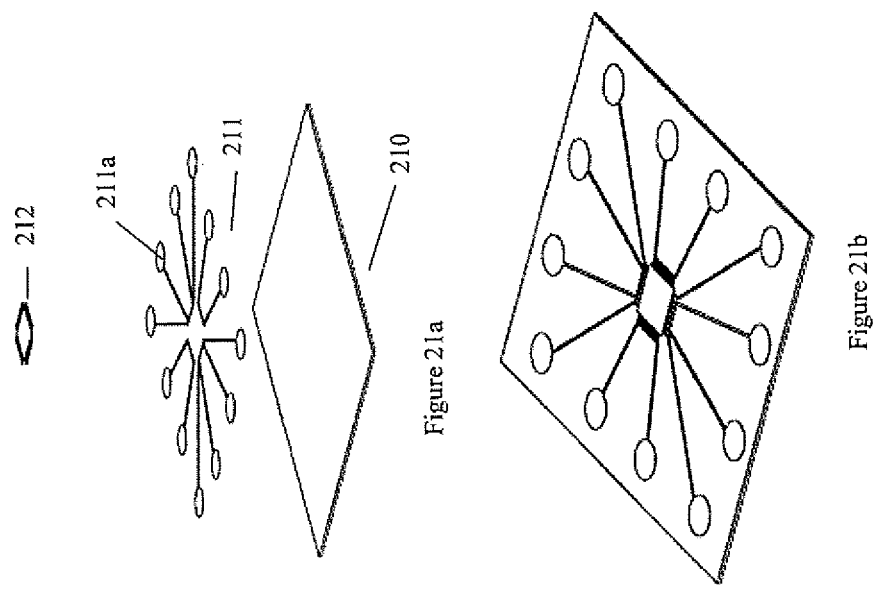
Figure 21a
Figure 21b

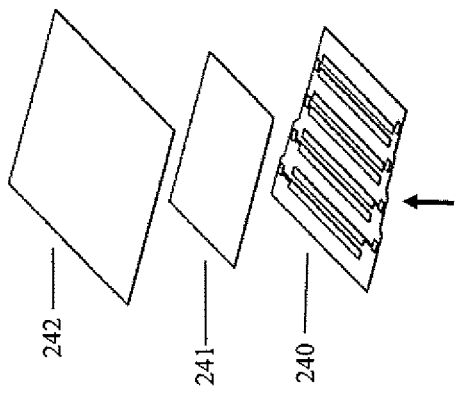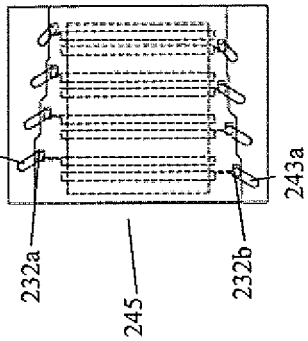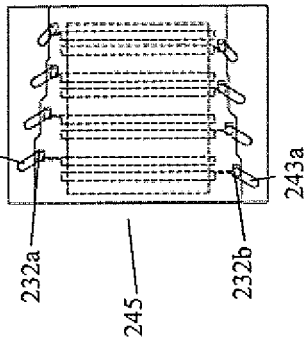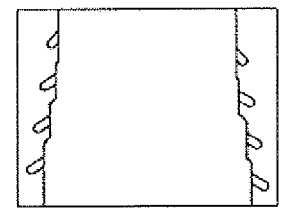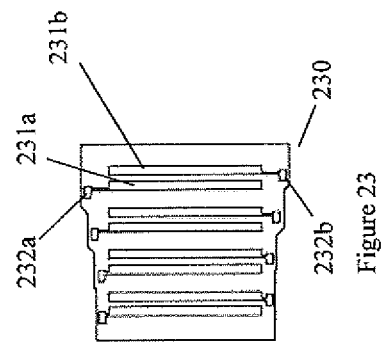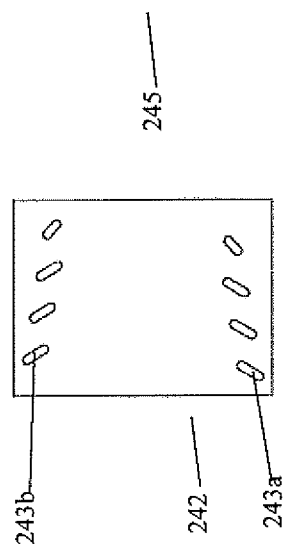

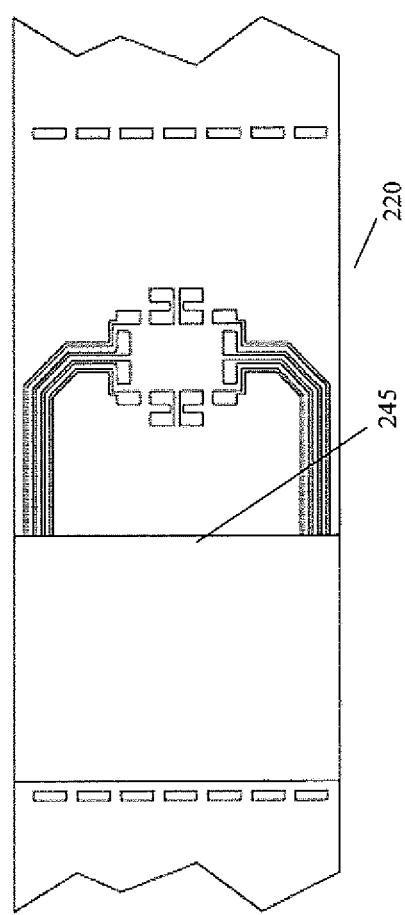
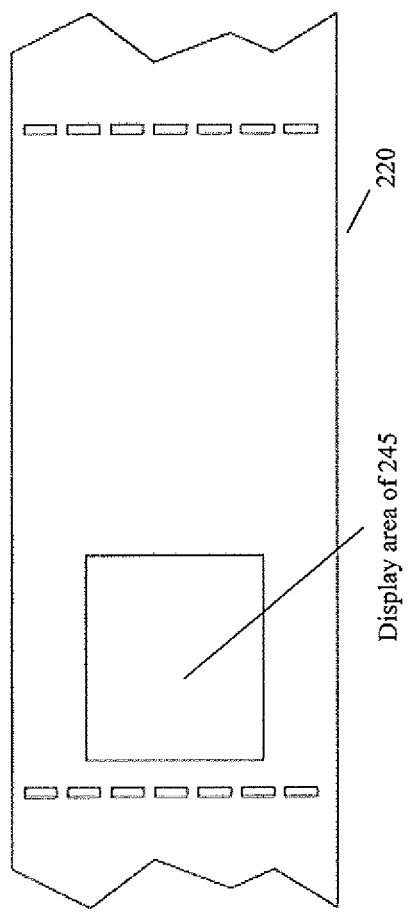

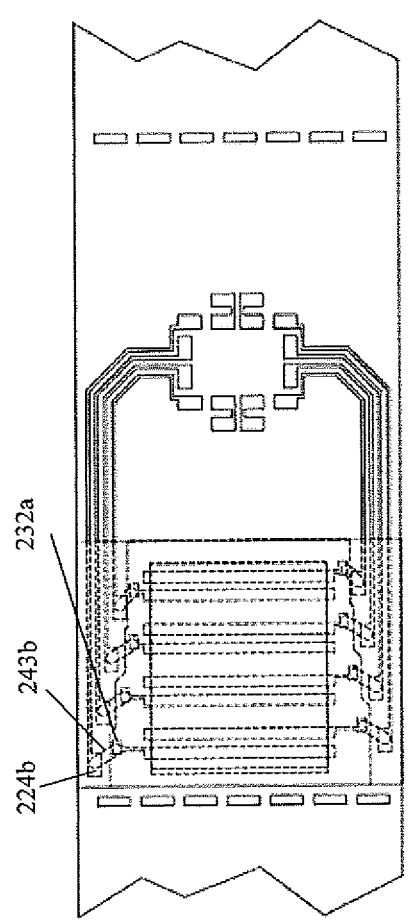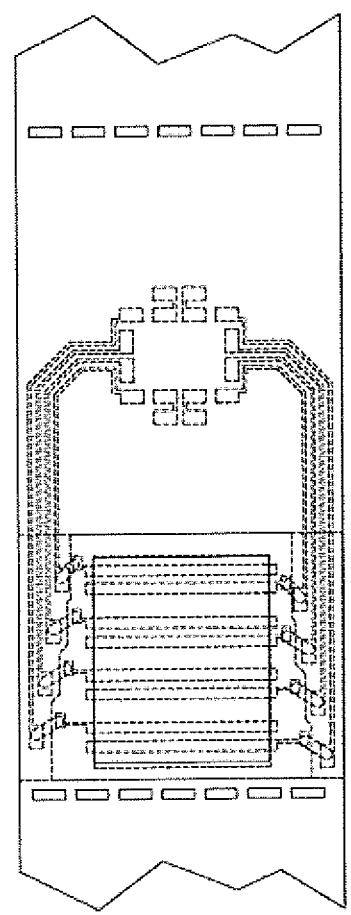

ELECTROCHROMIC MATERIALS, DEVICES AND APPLICATIONS OF THE SAME

RELATED APPLICATION/CLAIM OF PRIORITY

This application is a divisional application of U.S. patent application Ser. No. 13/002,275, entitled "Flexible and printable electrooptic devices," filed Dec. 30, 2010, now U.S. Pat. No 9,030,724, issued May 12, 2015, which is a national phase 371 filing of PCT US/09/49644, filed Jul. 2, 2009, which claims priority to provisional applications serial Nos. (1) 61/187,619 filed Jun. 16, 2009; (2) 61/168,421 filed Apr. 10, 2009; (3) 61/156,932, filed Mar. 3, 2009; (4) 61/109,691, filed Oct. 30, 2008; (5) 61/087,796, filed Aug. 11, 2008; and (6) 61/078,328, filed Jul. 3, 2008; all of which applications are incorporated by reference herein.

FIELD OF THE INVENTION

The present invention relates to novel electrochromic materials, and devices formed by these materials and the applications of these electrochromic devices. Particularly preferred applications of these devices, are in the area of flexible displays and/or those where these are processed by printing methods. These displays are usually assembled or processed so that these are part of other electronic flexible and/or printed products such as electronic labels and tags. This invention also discloses electronic biodegradable labels and tags.

BACKGROUND OF THE INVENTION

Electrooptic devices which change their optical state/displayed information upon application of voltage, such as electrochromic (EC) devices, can be used for a variety of applications, for example automotive mirrors, energy efficient glazing, displays, eye-wear and optical filters, to name a few. The device construction and the materials used have to be adapted to each application so that the device performance is most suitable for the intended application. An emerging area for EC applications are displays with wide ranging attributes and cost structures. As an example for use in displays, this technology is being developed for those applications where the tablet or the screen is refreshed at video speeds or able to exhibit color images. In such applications, reversibility and rapid change of color is required. An advantage of EC displays is their wide viewing angle and the visibility is not impaired under bright lights. On the other side of the spectrum, highly inexpensive displays and indicators are required that may be produced for product labels and tags which are disposable or replaced periodically. These displays may require irreversible information to be displayed or have limited cyclability. Irreversible means that the display or the indicator change the state or show the information when they are activated the first time. Limited cyclability is usually about 10,000 cycles or less. This information may fade away after a few seconds or may last a long time giving permanence to the image (bistable state). Further, many of the tags and labels for such uses may not have an onboard power source and thus may have to be activated by power derived from other components located on the same tag or the label. Such power may be derived from a radio frequency coupling of an antenna on the tag, an optical coupling with a source or ambient light, mechanical coupling to a motion or vibration, or a sonar source, etc. In all cases the power to activate the display is limited. Since EC devices are able to react at low potentials (typically less than 3V), power is not lost in upconverting the voltage. To meet a demand for many of the emerging display applications, new materials, or new ways of using the existing materials is required. In addition, these displays and their integration into labels and tags should be done so that they can be produced at low cost. Some of the low cost processing methods are use of printing processes, particularly high speed processes such as roll to roll processes for flexible substrates or continuous process to print on rigid substrates. The materials and concepts discussed here may be used for any EC application, but as demonstrated in several examples these would be particularly suitable for low cost displays. Since these displays comprise several layers of different materials, printing means that at least one of the layers is deposited using printing methods. Typically at least one of the electrodes or an electrolyte is printed. In particular, materials and material combinations that change their optical state by polymerization and their use in the EC devices will be disclosed. In addition, the metal layers when formed or removed also result in high contrast. Use of these materials will also be disclosed. EC device structures, processes to fabricate these devices and their integration with other components at a systems level for manufacturing of complete labels and tags along with their applications will be disclosed.

SUMMARY OF THE PRESENT INVENTION

In accordance with the purposes of the present invention, as embodied and broadly described herein, the invention provides materials, methods of forming and applications of electrochromic devices. These methods can be advantageously used to form displays which can be made at low cost for many applications such as labels and tags.

BRIEF DESCRIPTION OF THE DRAWINGS

FIG. 21a-c: Schematics of the electronics component used for the assembly in FIG. 18;

FIG. 23: Schematics of the electrode and partial connection scheme for an electrooptic device to be connected to the tag shown in FIG. 22.

FIG. 24a-d: Schematics of formation of the electrooptic device to be connected to the tag shown in FIG. 22.

FIG. 25a,b: Schematics of an overview of the display element from FIG. 24 integrated with the tag substrate of FIG. 22, top and bottom views.

FIG. 26a,b: Schematics showing details of connections and components of the display element from FIG. 24 integrated with the tag substrate of FIG. 22, top and bottom views

DETAILED DESCRIPTION

Figure 1:
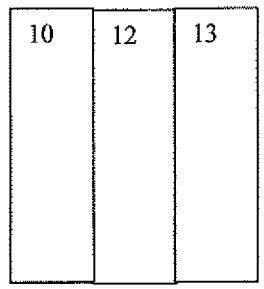
FIG. 1: Shows the schematic of the structure of an EC device formed using this invention.

This invention discloses fabrication of low cost, low power electrochromic displays and their applications in integrating them in a variety of ways. Although the invention illustrates most of the novelty using EC materials and devices, however, in some cases other electrooptic materials and technologies, such as liquid crystals, electrophoretic and others may also be used. In particular, the applications targeted are tickets (for events, games, transportation, lotteries etc.), tags, labels, etc. that can be used as product labels, supermarket shelf price labels, security labels, cards (e.g., gift cards, other limited use greeting cards, credit and debit cards), medical applications such as status of a patch or a wound, etc. These labels may be used for office products such as to label documents, folders, binders, etc. One may activate these products wirelessly, and depending on the user selectivity, displays on specific office products may be activated which may be easy to identify visually for the task at hand. All of these applications are collectively called as "tags and labels". These labels may comprise of integrated sensors, or a sensor feed may be provided to them. These sensors may be looking at/for changes in type or value of pH, color, optical absorption, fluorescence, weight, permeability, moisture, electrical resistance, capacitance, impedance, mechanical modulus, magnetic susceptibility, volume, time, temperature, pressure, gas, enzymes, other chemicals, etc. These displays may be irreversible, that is, once activated they can form an image which stays there for a period of time, which may be considered permanent relative to the product life. As an example, for inventory control, an area on the label applied to the product package may change color via a stimulus when it is close to expiration. Such a product can then be easily identified by the store personnel and removed. In some cases, the label should be reversible so that the image can be updated periodically and some may even require holding the image without further power consumption. An example of this may be a price label on the supermarket shelf. Applications such as cards (bus or train passes, school lunch cards, store gift cards, etc.) may have a display that is periodically updated when one takes them near an emitting source, and then the image needs to be retained without power until the card is used next or for any desired time. Thus there are many examples where wireless communication such as by optical, sonar or radio frequency communication, will energize these displays and the associated electronics. The power may also come from onboard sources such as a battery or solar cell. Although the preferred mode is wireless activation, this invention may also be used with wired displays. Examples of these applications and some of the devices suggested for these may be found in U.S. Pat. No. 7,286,061 (conditional access for antitheft of optical media) and patent applications UA20080111675 (observable properties triggered upon interrogation of RFIDs for tracking systems); UA20080100455 (a tag with an antenna and a chip showing a persistent image after interrogation for inventory control); UA20080170287 (a security device to provide a visual alert); UA20070114621 (wirelessly powered flexible tag); UA20070114365 (antitheft optical shutter activated by RF); PCT applications WO08022972 (EC indicator for product authentication) and WO08022966 (EC indicator). Printing of several components on flexible substrates including displays or indicators along with connectors, sensors, logic and power electronics on a substrate to reduce cost is commonly known theme as included in many publications, e.g. a few examples are Aperturen 2005 publication from Acreo AB (located in Krista, Sweden) (http://www.acreo.se/upload/Publications/Aperturen/Aperturen2005-02.pdf), US patent applications UA2007/0143774, UA2007/0128760 and PCT application WO08/115591. All of these also anticipate a common layer or material that is common to several components. However, none of these address the issue of biodegradation or matching the mechanical properties of the various layers so that flexible devices with high durability can be obtained. Flexibility usually refers to products made on stock (or substrate) that is processed in a roll to roll configuration where the stock has to be flexed around the rollers in the processing equipment, or where flexibility or bending is needed from the product during its use.

Specifically, in a variety of consumer and industrial products/processes that are using radio frequency (RF) wireless technology to read information on tags or labels on product packaging, passports, payment cards, inventory control, product tracking, animal control, etc. These tags comprise of an antenna coupled to a radio frequency chip. When this tag is wirelessly coupled by radio frequency via an authorized source, the chip on the tag is energized and the information stored on this chip may be read. The emitter or the source is usually a part of the network and can wirelessly communicate with the chip. In the emerging applications the RF chips may have an added functionality where the chips are further connected to additional devices to activate an action from the power derived from the antenna energization. This could be a display, a sound buzzer, or a mechanical lock, etc. Many such applications have been described in the patent literature, such as US patent applications 2007/0,114,621; 2008/0,100,455; and U.S. Pat. Nos. 7,227,445; 7,273,181. The wireless coupling to the chip via the antenna on the tag can also provide power to turn on the display (passive). Alternatively, a battery on the tag (active) may be used to accomplish this. However, in some cases the latter approach may make the product more expensive and disposal may be an issue, thus passive approach is preferred. Alternatively wireless energy harvesting devices, such as a solar cell may be located on the tag which may also be formed by a printing process. Other wireless power devices that can be used harvest power from vibrations, sound, RF power, etc. Some of the emerging devices based on these principles are from Adaptive Energy (Hampton, Va.) that uses a piezoelectric sensor to convert power from vibrations, or from Powercast (Pittsburgh, Pa.) that uses a sensor for power harvesting from RF radiation. These devices may interface with batteries to recharge them, or charge a capacitor. One may be print specific components, such as the capacitor, battery or even the entire power harvesting system. Depending upon a desired response based on the dialogue between the chip and the interrogating source, the display may be energized. Since this coupling may last for a few seconds, in some cases it is desired for the display to be persistent or show the information for a long time without consuming power. As an example, cafeteria food card, store gift card, train or bus card may show the amount remaining when one swipes the card in a reader or walks by a booth with an emitting source for wirelessly coupling to the card (i.e., the antenna and the chip on the card). This information may have to remain displayed for a few seconds for some applications while for others it should be displayed for several days or weeks. This action may also require erasure or updating of any past information that is being displayed. A label on a package at a store checkout can interact wirelessly with the terminal, which can then communicate through a network to verify the product authenticity, and turn on an EC indicator permanently. In another application on inventory control, a wireless communication system in a supermarket can interact with any of the desired or all of the product labels on the product package, and then turn an indicator on the package label if it is expired, or is recalled, or needs to go on sale, etc. The information on the display has to remain on for sufficiently long so that the store employees are able to get to them and take proper action. Thus, these labels have to be low cost so as not to excessively increase the cost of products, tags, etc. Further, the display materials and processes used have to be compatible with packaging materials and systems and be non-toxic to the environment when disposed. Many of the preferred electrolytic compositions comprising ionic liquids do not interact with common packaging materials such as paper, polyvinyl chloride, polystyrene, polycarbonate, polyester, acrylic and polyolefins and do not vaporize. It is also preferred that one is able to use polymeric materials as coatings or substrates or as part of active devices that decompose in the landfills or in an industrial compostable facility. This is important as such products will be made and disposed in large numbers. The materials that biodegrade in soils are those that show substantial degradation within 180 days in a land fill. Example of the materials (for clear or opaque substrates or other layers as described in this disclosure) that are biodegradable are conventional polymers with additives that make these biodegradable (e.g., see Eco-Pure™ additives that promote biodegradability in polymers when added in a concentration of about 1%, available from Biotech Environmental LLC in Albuquerque, N. Mex.) or those polymers that biodegrade themselves. Polymers for the former category are polyethylene, polypropylene, polyester, polystyrene, polycarbonate, and many others including addition to any layer in the device. Examples of the latter category are polylactic acid based polymers which includes various crystallinity grades varied by changing the proportion of D and L lactic acid units (e.g. sold by Natureworks LLC, Minnetonka, Minn.), polyhydroxyalkanoate, poly-ecaprolactone, and polyesters such as poly(butylene adipate terephthalate) (sold as Ecoflex from BASF, Germany). Examples of additives to promote biodegradation in a variety of polymers are provided in published US patent application 20080103232, which is included herein by reference. More on biodegradability requirements and regulatory standards is contained in many standards such as ASTM D5338, ASTM D6400, ISO 14855, ISO 16929, ISO 17088, ISO 20200 and EN 13432 (European Norm). Biodegradability for the purposes of this disclosure is defined as a material meeting any of the above regulatory standards. It is preferred that the biodegradable materials meet at least one of these standards. In some cases the self biodegradable polymers may have high permeability to moisture. These may be coated with polyolefins, wherein these polyolefins may comprise biodegradation promoting additives. Those polymers derived from bio feed stock may also be used (e.g., polyols used in polyesters and urethanes which are derived from plants and seeds such as corn, soyabean, castor, linseed), however, the preferred materials are those that biodegrade regardless of their source. Paper includes cardboard, fabrics, or other paper-like structures such as mats, non-woven webs, etc which includes natural and manmade polymers including those that biodegrade. Even these materials could be made to biodegrade faster in specific landfill environments when additives such as those described above are added.

It is important to realize that the substrates used for printed and flexible displays, not only house the display but also the electronics including antennas if used. Thus the biodegradation is an important topic for the entire flexible and/or printed electronic labels and tags which would be made in large numbers and disposed. These include electronic RFID tags and labels. If flexible and/or printed electronics is going to be produced in large quantities and then disposed, then the entire product or most of it needs to be biodegradable. As an example flexible solar cells and many products need to be stable to photodegradation but then biodegrade when disposed. One can use the above principles of making biodegradable products for any printed and/or flexible electronics product even if it does not have a display. Also encapsulation layers, connectors, antennas, sealing adhesives, all of the layers that use polymers can be made of biodegradable matrices or additives added to do so. This can be done for both thermosets and thermoplastics. There may be minor components and coatings that may not degrade readily, but preferably more than 50% weight of the product and more preferably more than 80% weight of the product and most preferably greater than 98% of the product weight of flexible and/or printed electronics can be designed to biodegrade. This would be a better option as compared to recyclability due to the difficulty of disassembly of various materials as many of these are present as coatings and adhesives. Since biodegradation usually kicks in landfills where there are microbes present, some of the materials may be optionally recycled if they are not disposed in the landfill. One may use these principles of using additives for substrates and other layers for electrooptic (EO) devices that may use polymeric substrates and polymeric layers including electrolytes, adhesives and conductors. Some examples of products that can be made biodegradable are EC windows and EC automotive mirrors (see PCT application serial number PCT/US09/32491 filed on Jan. 29, 2009, which is included herein by reference), non-emissive polymeric displays for electronic books and readers, electronic billboards, light emitting diodes for lighting and displays, flexible solar cells, electroluminescent displays, etc.

Since the indicators and displays of this invention may be printed, they may also be printed on the surface of any product whether it is conductive or nonconductive without making a separate label. They can be used for labels and indicators for a wide variety of consumer products and packages and are durable in performance. Further, for those labels where the power source is only RF activation, the displays have to function under low power environments where both the voltage and the current output of the chips on the tags are limited. These displays should be preferably energized at lower than 5V, preferably lower than 2.5V. The average current consumed should be less than 20 mA, preferably lower than 3 mA during the period in which the displays are powered. Further, it is also preferred that the displays be powered in less than 10 s, and preferably in less than 2 s. The persistence time (i.e., the time for which the information is displayed after the power is removed) may be tunable based on the composition of the electrolyte or the electrode from about a few seconds to forever. Forever or permanent is always relative to the product/package life. Typically, this is from weeks to several years. If electrochromic displays are used that are part of an active matrix pixel system, then it is preferred that the threshold voltage be below 1.5V, so that power can be transmitted below this voltage to the pixels without activating the connectors.

Display Materials and Devices

The EC display devices may comprise of several layers, sometimes the EC material (or electrooptic material) is located on an electrode as a separate layer from the electrolyte, and sometimes EC material may be both in the electrolyte and in additional layers, and yet in other cases it may solely reside in the electrolyte. Since one of the primary objective of the invention is low cost products, it is preferred to reduce the number of layers in an EC device, thus those EC devices where the EC material is resident only in electrolytes and additional electrochemically active layers are not used and are most preferred device constructions. Redox materials/species are those that undergo electrochemical oxidation and reduction upon device activation, and these may be reversible or irreversible. Cathodic redox undergo reduction at the cathode and the anodic redox undergo oxidation at the anode. In addition, it is preferred that all of the layers are printed sequentially until the device is complete.

The electrolytes that are deposited by printing should become solid after deposition. This may be due to the removal of a solvent, cooling or by further reaction (e.g. polymerization and/or crosslinking). The electrolytes may be hydrophilic or hydrophobic (latter are preferred). For hydrophilic electrolytes those systems are preferred where the device performance is not dependent too much on water content, otherwise the performance of this device will change when subjected to different environmental conditions.

One method to create the EC displays with long persistence or permanent image is by using those materials as redox agents that become colored upon polymerization. These are particularly suitable for those applications where only a single activation or a permanent change is required. Many polymers are conjugated and hence deeply colored, where as their monomers are not. The literature is replete with examples where such polymer coatings are formed on conductive electrodes by electrochemical or chemical methods. These coatings are then used in EC devices which are reduced and oxidized reversibly to change their color. However, those EC devices are not described where such polymer is formed only when the device is activated. This results in coloration (or an image if the electrode is patterned such as in a display or an indicator) when the device is powered. The device is assembled with monomer in the electrolyte and, upon powering, the monomer polymerizes (electropolymerization) at one of the electrodes resulting in a colored species. If this coating has a reasonably good adhesion to the electrode, the image does not smudge with time due to the migration of the colored species. PCT application WO 2006/008776 describes addition of oligomers (all polymerizable materials are considered as monomers in this patent application) of conductive polymers and polymers to the electrolyte for faster transport of electronic charges, but do not contemplate a redox activity where polymerization at an electrode is involved. Persistent or stable EC devices are also described in US patent applications 2008/0204850 and 2007/0139756. However, these devices predominantly use a vapor deposited metal layer that is oxidized upon device activation which were deposited on optical media (e.g., CDs and DVDs) as shutters. This disclosure does not discuss how the technology can be used for labels and tags. These used both physical vapor deposition (PVD) and wet chemical processing to form the devices. Such technologies are difficult to practice on low cost flexible substrates which need to be processed in a roll to roll fashion. In addition, all of these devices changed from a dark to a clear state, and were sensitive to moisture. The devices of the current disclosure avoid these limitations, i.e., they can be formed without using PVD at the convertors facility, can be deposited on flexible substrates, roll to roll processes may be used, can change from clear to dark, and also hydrophobic electrochromic materials and electrolytes may be used to make these less sensitive to moisture. For all these reasons the current disclosures here are more suitable for use in displays particularly to make tags and labels.

There are many materials that can be electro-polymerized from colorless or faintly colored monomers to deeply colored polymers that absorb all or part of the visible radiation. Some of these electrochemically active polymers useful in the instant invention include (which can be polymerized from their monomers present in the electrolyte), without limitation, polyphenylene vinylenes, polythienylene vinylenes, polyalkoxythienylene vinylenes, polyfurylene vinylenes, polythiophenes, polyisothianaphthenes, polyanilines, polyarylamines, polyindoles, polypyrroles, polyalkoxyphenylenes, polyphenylenes, polyperinaphthalenes, polynaphthylamines, polyvinylmetalocenes, polymers of heteroaryls linked to metals (e.g. see US patent application 2007/0191576), carbon cluster (fullerenes) and carbon cluster containing polymers, polyimides, polyviologens. Other electrochemically active polymeric materials which may be employed in the present invention include, without limitation, derivatives of the aforementioned polymers, such as those prepared by sulfonation or substitution, copolymers (from a mixture of monomers), blends and composites, where the matrix may be organic or inorganic but at least one of the components is from the polymers or their derivatives described above. Further, depending on the specific monomer one can obtain different colors. Thus multicolored images and displays may be formed. A simplified device schematic is shown in FIG. 1. An electrolyte 12 is placed touching two conductors 10 and 13. The conductors are usually coatings on substrates, or one of them may be a metal foil. The electrolyte comprises of a monomer as a redox agent, e.g., thiophene derivatives such as 3,4-Ethylenedioxythiophene, 2-2'bithiophene, 2-3'bithiophene, 3 butylthiophene, 3-4 dimethylthiophene, terthiophene. It is preferred that the monomer be a salt or have a boiling point above 100° C., preferably above 150° C. so that its loss by evaporation with time (or during processing) is low in order to keep the device performance. Examples of monomers with salt like structures that result in conductive polymers are several that can be electrochemically polymerized. For example, anionic salts of thiophene can be used for this purpose (see Giumanini, A. G. et al, J. Organic Chemistry, vol 41(12), p-2187-2193 (1976)). In this example, the cation is an ammonium moiety to which the thiophenes are attached. The anions can be halide groups, or the ones described for the ionic liquids in this invention and are the same as the anion of the ionic liquid in the formulation. A specific example is ammoniumtrimethyl-3-thenyliodide as shown below. Various derivatives such as different alkyl groups on the thiophene or on the nitrogen may be attached to change the redox and or coloration properties.

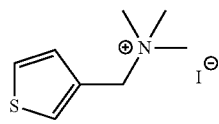

The electrolyte may also comprise of other materials such as solubilizing medium and addition of ion conductive salt. One may also use an ionic liquid which fulfills the role of both a solubilizing medium and a salt. When power is applied across the two conductors, bithiophene (a colorless material) polymerizes at the anode due to the oxidation into a reddish colored material. This material is usually not soluble in the electrolytic medium and adheres to the anode. With time this layer may further oxidize or reduce and may again change color. Changing the type of redox species or using a mixture of redox species, e.g., more than one anodically polymerizing monomers and/or more than one cathodic material may be used in the same device to control color. The color may be imparted due to the two or more different colors of polymers or copolymers produced when the device is activated, or at one voltage first color film is deposited and at other voltages a second or third color film is deposited and this composite film comprising of various color films exhibits different color as compared to the component films. As an example, polymerization of 3-methyl thiophene results in a red colored polymer, polymerization of 3,4-ethylenedioxythiophene results in a blue colored polymer and polymerization of 2,3-di(thien-3-yl)-5,7-di(thien-2-yl)thieno[3,4-b]pyrazine results in a green colored polymer (Gursel Sonmez, Clifton K. F. Shen, Yves Rubin, and Fred Wudl, Angewandte Chemie (2004), vol 116, p-1524-1528). These materials may be used to form the EC devices of this invention, in the examples provided later a few additional thiophenes are examined that provide other colors. The electrolyte may have other ingredients which are discussed in more detail later.

We have also discovered that for these devices to work rapidly at lower potentials the electrolyte, in addition to the electrochemically polymerizable monomer (or redox material 1), should preferably also comprise of a material (redox material 2) that can simultaneously undergo redox activity at the other (opposing) electrode within the potential range of the device (complimentary redox material). This material may or may not possess EC properties. In those displays where one is viewing the display from the side of 10 (anode), and the electrolyte is highly opaque, it does not matter if the reaction of the cathode (13) produces color. As an example, with bithiophene (which polymerizes at the anode) one can use a viologen salt or anthraquinone in the electrolyte as a cathodic material. Alternatively, if the polymerization is cathodic, e.g., polymerization of another thiophene derivative 2,5-dibromo-3,4-ethylenedioxythiophene (DBEDT), then one can use anodic redox material in the electrolyte. Some examples of anodic redox materials are ferrocene, phenothiazine, phenazine, tetrathiafulvalene and aromatic amines to name a few. There are hundreds of variations and derivatives of the anodic and the cathodic redox materials. More examples of these may be found in US patent application 2002/0012155, U.S. Pat. Nos. 6,016,215; 6,496,294; 5,239,405; 5,140,455; 7,064,212; 6,961,168. The electrolyte may comprise of more than one monomer or/and more than one redox material for varying the color or the reactivity. The cathodic material may also be monomeric that results in a conducting polymer formation at the anode. An example of anodically polymerizing thiophene is bis[cis-1,2-di(4-bromophenyl)-1,2-ethenedithiolene]nickel.

As will be discussed later, for reversible devices, one can use reversible dyes in the electrolyte rather than monomers that polymerize on device activation, e.g., combinations of anodic and cathodic dyes. Several examples of these were described above. One may also add bridged dyes where the anodic and cathodic dyes are covalently bonded to give a single molecule. In this case it is preferred that either the cathodic dyes or the bridged dyes comprise of viologen (bipyridinium) moiety, since the viologens have high coloring efficiencies and result in intense coloration for a small amount of power that they consume.

Figure 2:
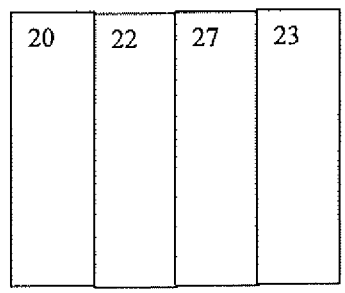
FIG. 2: Shows the schematics of the structure of another EC device formed using this invention.

Another way to construct such devices is shown in FIG. 2. Here if a polymer is formed anodically, then rather than using a cathodic material in the electrolyte one may use a cathodic layer on the opposing electrode. The conductive electrodes are 20 and 23, and the electrolyte is 22. The cathodic layer is 27. Cathodic layers may or may not have EC properties, as long as they are capable of undergoing reduction or store the appropriate ions (e.g., charge storage carbon layers as counterelectrodes (opposing electrodes) are described in EC devices are described in U.S. Pat. No. 6,118,573). Capacitive or redox counterelectrodes layers may be used in this or any other type of EC devices described herein, if that function is not provided by a species in the electrolyte.

The cathodic layer does not have to be electrochromic, but it has to either provide reactivity or provide a mechanism to store the cations, at least temporarily. Some examples are coatings comprising tungsten oxide, molybdenum oxide, PEDOT, e.g. Clevios™ available from HC Starck (Newton, Mass.), etc. Similarly, if the polymerization is cathodic, then one may use anodic layers. After the device is activated once, this device may be repeatedly cycled by powering and shorting or applying a low bleach potential so as to color and bleach the EC layer that is formed in the first cycle. This assumes that the polymerization potential is higher than the coloring and bleaching potential. This will prevent the same monomer to polymerize on the counterelectrode during repeated cycling, unless that is desired.

Displays may also be formed where the metals are either deposited to form the contrast, or the metals are selectively removed from the areas to generate contrast with the surroundings. The former is preferred, as it does not require a pre-deposition of the metal. Methods to remove metal in devices are provided in US patent applications 2007/0139756, provisional US applications with Ser. No. 60/947,366 and 61/025,069 filed respectively on Jun. 29, 2007 and Jan. 31, 2008, which are all included herein by reference. In this case a metal layer is deposited on one of the electrodes before assembling the device. The electrolyte comprises of a redox or an ion conductive material that can either oxidize the metal to a different optical state or remove the metal as ions and transport then through the electrolyte for redeposition on the other electrode. In the first case the reaction is largely irreversible, and in the second case depending on the ingredients used in the electrolyte and the metal choice it may be reversed. Deposition of metals is known for reversible display and other EC devices, some examples are U.S. Pat. Nos. 5,056,899; 6,552,843; 6,111,685. An advantage of metal deposition is their stability towards UV. Thus an image formed in this way can be quite stable to outdoor exposure.

There are several ways of forming devices with metal deposition, and particularly suitable for printed displays and also those where the image may be permanent or reversible. As an example one may form this device as schematically outlined in FIG. 1, with an electrolyte 12 sandwiched between the two conductors 10 and 13. Preferred electrolytes are hydrophobic so that these are not impacted by ambient conditions. An example of this is provided in U.S. Pat. No. 6,862,125, where a hydrophobic ionic liquid such as N-butyl-N-methylpyrrolidinium bis(trifluoromethylsulfonyl)imide (BMPNTF) is used with EC materials which are metal salt and an anodic compound. For example, the preferred metal salts are those that have the same anion as the ionic liquid. Preferred metals are aluminum, silicon, germanium, selenium, indium, tin, antimony, tellurium, bismuth, titanium, vanadium, chromium, manganese, iron, cobalt, nickel, copper, zinc, silver, gold, tungsten, lanthanum, cerium, praseodymium, neodymium, samarium, europium, gadolinium, terbium, dysprosium, holmium, erbium, yttrium, magnesium, calcium and mixtures thereof. For example, some of salts of these compatible with BMPNTF are bismuth (III) bis(trifluoromethylsulfonyl)imide, zinc (II) bis(trifluoromethylsulfonyl)imide, iron (II) bis(trifluoromethylsulfonyl)imide. It is preferred that the electrolyte also comprise of an anodic material. Anodic materials are the same as described above, i.e., ferrocene, phenothiazine, phenazine, tetrathiafulvalene and aromatic amines to name a few. However, one may also use an anodic material (monomer) that polymerizes for an irreversible system. For example, one may use bithiophene as anodic material. In this case the metal plates on one electrode and bithiophene polymerizes on the other. If the metal part of the display faces the user, it will have high stability to UV in the activated or the colored state, as metals tend to have better UV resistance as compared to polymers.

Another example uses hydrophilic ionic liquids, such as those where the anion is chosen from halides (Cl, F, Br), nitrates, sulfates, thiocyanates and carboxylates. As an example one could use 1-Methyl-3-octyl-imidazolium chloride and solubilize chloride metal salts along with anodic species. One can also use ionic liquids with high melting points (50 to 150 C), but when these are mixed with metal salts and/or other ionic liquids, their melting point is lowered to below room temperature. Two or more ionic liquids mixed together may also form eutectics with melting points lower than the components (the mixtures may have different cations and anions, or one of these may be the same). For example 51 mole % of 1 ethyl-3-methylimidazolium chloride, 6 mole % of N-methylpyrrolidinium chloride and 43 mole % of silver chloride is a liquid at room temperature (e.g., see U.S. Pat. No. 6,552,843). Environmental friendly cations, such as choline, may also be used which form ionic liquids with a number of anions, e.g., acesulfamates, thiocyanates, chlorides and bis(trifluoromethylsulfonyl)imide (NTF). Another example of environmentally friendly ionic liquid is ethyl, methyl imidazolium thiocyanate. The importance of using ionic liquids in these applications is to ensure that the mobile phase is always present and is not lost to the environment. Since ionic liquids have negligible vapor pressure, these are not prone to evaporative losses as compared to non-ionic fluids. Further, use of aqueous based systems is also helpful during processing where one does not have to use solvents which may be more toxic. A preferred embodiment is where all the solvents and the redox materials in the printable electrolyte are salts so that none of these materials have a tendency to leave the device upon long term storage.

One may produce an EC system which uses several electrolytes which have different degrees of solubility of different electrochromic materials (e.g. varying hydropillicity to hydrophobic character). As an example if these EC materials have different colors, then the various electrolytes may be printed in close proximity but without the fear of an EC material diffusion from one electrolyte to the other due to their limited solubility of the EC materials in adjacent areas or pixels. This means the electrolyte layer in a device is replaced by a number of discrete areas of various electrolytes.

Another type of device that may be formed by metal deposition is shown in FIG. 2. The metal deposition electrolyte 22 as described earlier may also be combined with an anodic layer 27 rather than an anodic material added to the electrolyte.

The electrolytes discussed for all of the devices above may have other ingredients such as UV stabilizers, inert salts, viscosity modifiers, surfactants, antifoaming agents, tackifiers, flowability modifiers, binders, opacifiers, adhesion promoters, fillers, colorants etc. Some of these additives will be described in more detail below. One may also add additives to make the electrolyte biodegradable, so that it degrades rapidly once it is put in a landfill. The electrolyte may also have monomers with or without catalysts that can be polymerized (including crosslinked) to solidify the layer. The layer may also be solidified by removal of a solvent and or cooling (if deposited from a hot melt). Some of the preferred polymers that are used in the electrolyte matrix and do not participate in electrochemical activity when the EC device is powered to generate color are polyurethanes, acrylics, epoxies, fluoropolymers, mixtures of these or monomers along with catalysts and initiators used to form these polymers. Typically if formed polymers are used then solvents are used in the composition to deposit the electrolyte layer then this solvent is then removed after deposition, and if monomers are used they are polymerized after the layer is deposited. The nature of all these ingredients will depend on their compatibility with the basic electrolyte composition. The electrolyte composition where the EC activity is within the electrolyte comprises EC materials (i.e., redox species) along with a solubilizing medium which is typically a liquid plasticizer with a boiling point in excess of 200 C (which may be ionic liquid). High boiling point ensures that the plasticizer does not vaporize readily over time. Ionic liquids are preferred as these have negligible vapor pressure. The solvent that is removed from the electrolyte composition after it is deposited, typically has a boiling point greater than 90° C. and preferably greater than 95° C. This is so that these compositions are not too unstable during processing, i.e., if the solvent evaporates then the viscosity of the composition will change leading to process conditions which will not be too stable. Some of the preferred solvents are propyl acetate, butyl acetate, methyl sulfoxide, dimethylformamide, 1-methoxy-2-propanol and diethyleneglycol monoethyl ether acetate.

Although many materials known to absorb ultraviolet radiation may be employed herein, preferred ultraviolet stabilizing agents in electrolytes and other EC layers include "UVINUL" 400 [2,4-dihydroxy-benzophenone (manufactured by BASF Corp., Wyandotte, Mich.)], "UVINUL" D 49 [2,2'-dihydroxy-4,4'-dimethoxybenzophenone (BASF Corp.)], "UVINUL" N 35 [ethyl-2-cyano-3,3'-diphenylacrylate (BASF Corp.)], "UVINUL" N 539 [2-ethylhexyl-2-cyano-3,3'-diphenylacrylate (BASF Corp.)], "UVINUL" M 40 [2-hydroxy-4-methoxybenzophenone (BASF Corp.)], "UVINUL" M 408 [2-hydroxy-4-octoxybenzophenone (BASF Corp.)], "TINUVIN" P [2-(2'-hydroxy-5'-methylphenyl)-triazole](Ciba Corporation, Tarrytown, N.Y.,)], "TINUVIN" 327 [2-(3',5'-di-t-butyl-2'-hydroxyphenyl)-5-chloro-benzotriazole (Ciba Geigy Corp.)], "TINUVIN" 328 [2-(3',5'-di-n-pentyl-2'-hydroxyphenyl)-benzotriazole (Ciba Geigy Corp.)] and "CYASORB UV" 24 [2,2'-dihydroxy-4-methoxy-benzophenone (manufactured by American Cyanamid Co., Wayne, N.J.)], with "UVINUL" M 40, "UVINUL M" 408, "UVINUL" N 35 and "UVINUL" N 539, Bisbenzotriazoles such as 2,2'-methylene-bis[4-tert-octyl-6-(2H-benzotriazolyl-2-yl)phenol], TINUVIN™. 360; Asymmetrical bisbenzotriazoles substituted by a perfluoroalkyl moiety, e.g., 5-Trifluoromethyl-2-(2-hydroxy-3-(di-n-butylaminomethyl-5-tert-octylphenyl)-2H—; Tinuvin 928, CGL777 and CGL139 (all from Ciba). The ultraviolet stabilizing agents when used in a by-weight range of about 0.1% to about 15%, with about 2% to about 10% being preferred.

Solidification by polymerization or by multiphase process are well described in U.S. Pat. Nos. 7,300,166 and 6,002,511 which are included herein by reference. Electrolyte formulations may also comprise of solvent(s) that are removed by evaporation during processing. If monomers are used for solidification, then these are different from the ones present in the electrolyte that electropolymerize in the device to generate color when electrically activated. These monomers are called non-electroactive. The non-electroactive monomer amount (for solidification) in these layers is typically less than 50% by weight of the total composition and more preferably less than 10% by weight. An example may be use of 2-hydroxy ethyl methacrylate (polyHEMA) with ethylene glycol methacrylate as the crosslinker and an appropriate catalyst, such as benzoyl peroxide, which are all dissolved in the electrolyte (if curing by light such as UV is used, then one may employ an appropriate photoinitiator, a number of these are available from Ciba Specialty Chemicals, White Plains N.Y.). If silicones are used one may use the platinum based chemistry for cross-linking these materials. This polymerization is conducted by heating after the electrolyte deposition. Polymers for the hydrophobic ionic liquids with fluorination may be more compatible with fluorinated monomers such as tetrafluoromethylacrylate; 1H, 1H, 7H, dodecaflurohepptyl methacrylate; and a variety of fluorinated polyethers. Functionalized fluoroethers are available from Solvay Solexis (Thorofare, N.J.) under the tradename of Fluorolink™. Another example of a material is 8155 electroluminescent medium (from Dupont Microcircuit Materials (DMM), Research Triangle Park, N.C.) that may also be used as the electrolytic matrix. The advantage of using such a medium is its compatibility with screen printing technology and other materials from DMM to make a complete device. For example with conductive carbon black pastes such as 7152, conductive silver paste 9145 and an encapsulation coating such as 7165 EL. All of these materials are compatible and processed using compatible technologies. Functionalized fluoropolyethers may be crosslinked using various chemistries such by using co-monomers so that reactions with epoxy and isocyanates groups result in polymer formation. The co-monomers may be non-fluorinated. The monomers for solidification may polymerize by addition or condensation polymerization. Those condensation polymerizations are preferred which do not release any new small molecules, such as water and gases. Some of the preferred mechanisms are reactions between amines and epoxies, mercaptans and epoxies, amines and isocyanates, isocyanates and hydroxyl groups, Addition reactions may be ring opening polymerizations or through the opening of unsaturated bonds and rings. To form a polymer which will solidify at low concentrations, those systems are preferred which form a three dimensional network. This means that for condensation systems there should at least be one monomer which is trifunctional or of higher functionality. For polymers forming networks by addition polymerization, use of polyfunctional monomers (those monomers which have at least two polymerizable unsaturations) is required. As discussed below, for high speed printing methods high functionality monomers are desirable for rapid cure. Thus, other than the monomers, appropriate catalyst may also be required in the formulation. The details of materials, chemistry and reactions are well known and may be found in a standard polymer chemistry book (e.g., see Polymer Chemistry: An Introduction, by M. P. Stevens, Oxford University Press, 1998). For low shrinkage it is preferred that those monomers be used which have high molecular weight (e.g., functionalized pre-polymers and oligomers), typically greater than 2,500, and preferably greater than 5,000. Since a preferred method to deposit the electrolyte is by printing, and in printed processes the layers are thin from submicron to several tens of microns, and further these are fast processes, it is required that these are solidified fast and compatible with high speed web processes as needed. One preferred way is by radiation such as UV polymerization and the other by heat. For rapid solidification it is important that the gel point of the formulation is reached quickly, even if further polymerization continues over time (e.g., shadow cure), or only part of the monomer is converted to the crosslinked polymer in the final product. Depending on the curing system used, the curing rate of the coating may be reduced by ambient oxygen (e.g., free radical polymerization) or by atmospheric water (e.g., cationic polymerization). For this it is preferred that high functionality monomers be used so that they will form the network even at low conversions. Thus preferably, at least one of the monomers should have a functionality of five or greater. A source of high functionality acrylic monomers is Sartomer (Exton, Pa.) such as dipentaerythritol pentaacrylate ester and pentaacrylate ester which have ten functionalities each (five bifunctional groups).

Inert salts (e.g. lithium and sodium salts with preferably the same anion as the ionic liquid if used) and acids may be used to promote ion conductivity. The cations from these can also be used to intercalate into anodic and cathodic layers if used in devices. Viscosity modifiers are usually polymeric or fumed metal oxides, such as silica, titania and alumina. The fumed inorganic oxides in small percentage additions (typically less than 5% weight) can result in thixotropic formulations, so that the printed area is not prone to flow before it is solidified. These materials are available as hydrophobic and hydrophilic varieties, and either can be used depending on their compatibility with other electrolyte ingredients. Further, these are nano-sized particles and available in a variety of surface areas, and any of these can be used which suit the processing and the properties. Some examples of fumed silicas are Cab-O-Sil® M5 and H5 TS 720 and TS 500 from Cabot Corp (Billerica, Mass.). The first two are untreated fumed silicas, i.e. they are hydrophilic and the last two are treated fumed silicas to impart hydrophobicity. Examples of other nanoparticles from Evonik (Parsippany, N.J.) are VP zirconium oxide 3-YSZ, VP zirconium Oxide pH, Aero Alu C and Aeroxide® $TiO_2$ series such as NK960, T805, W2730X,W740X; and from Ishihara Corp USA (San Francisco, Calif.) TTO-55 series, TTO-51(A), TTO-51(C), and Titania Sol TSK-5. TSK-5 titania is coated with silica nano-particles (including fumed silicas, silsesquioxanes and titania) to provide viscosity and/or UV shielding characteristics. The nano-particles of titania may be doped with other metal oxides or be coated with amorphous titania or another oxide such as (aluminum oxide, silicon oxide and zirconium oxide) to reduce its catalytic activity when exposed to UV radiation. Many of the products from Ishihara in TTO-55 and TTO-51 series are coated with aluminum oxide or aluminum and zirconium oxide mixture. Opacifying additives with high refractive index (i.e., particles with refractive index greater than about 1.8 e.g., silica coated titania, titania, barium sulfate, zirconia). Titanium dioxide opacifiers may be purchased from Dupont (Wilmington, Del.), such as Ti-Pure® R-101 R-102, R-103, R-104, R-105, R-450, R-706 and R-960. Preferred grades for use in the electrolytes are R-105, R-350, R-706 and R-960 as these are silica and or alumina coated (core shell structure) and reduce the interaction of titania with the electrolyte under illumination. To control permeability one may also use disc shaped silicates which are generally clays that have thicknesses in the nanometer range. An example of these are montmorillonites and are available from Southern Clay Products (Gonzales, Tex.) (use of these are described in U.S. patent application Ser. No. 12/468,719 (filed on May 19, 2009) which is included herein by reference). Fillers may be selected to reduce cost or to impart other properties, such as thermal expansion coefficient to match the other layers, enhancing specific mechanical properties, etc. Many of these are inorganic oxides, such as silica and silicates and also fibers (or nano-fibers) made of these materials. The fillers and opacifiers may be surface treated with coupling agents to improve their compatibility with the electrolyte matrices. Surfactants may be ionic or non-ionic. A variety of surfactants are available from 3M (Saint Paul, Minn.) under the tradename of Fluorads™ and Triton™ from Dow Chemical Company (Midland, Mich.). Adhesion promoters included coupling agents such as those based on silicon, titanium and zirconium. Many of adhesion promoters are based on silanes are available from Dow Chemical company, and those based on others from Hubron Specialty Limited (Manchester, UK) under the trade name of Kenreact™. Many of the other additives, the tackifiers are matrix dependent and also dependent on the carrier solvent used to deposit the electrolyte layer. For example, Eastman (Kingsport, Tenn.) sells Tacolyn™ for aqueous systems, Foralyn™ for solvent systems, Foral™ for radiation cured systems. For example an additive called Eco-Pure is available from Biotec Environmental LLC in Albuquerque, N. Mex. which may be useful for biodegradable polymers. This may also be used with a broader range of formulations with polymers such as substrates, electrolytes and other layers, conductors, binders and adhesives to make them biodegradable. Many of these additives are synergistic with each other and may fulfill multiple roles, i.e. surfactant may also help in reducing foam, filler may also be used to control viscosity and may also provide a background color to the display, and a tackifier may be used without coupling agents to promote good adhesion, etc. The purpose of this was only to show that the scope of the invention is not reduced by incorporating these additives. Biodegradability is an important issue, as many of the products made from this innovation (e.g., inexpensive and disposable labels and tags) will end up in landfills in large numbers. Thus use of such materials and additives is important not just for the display but for the entire tag and other components including other electronic components.

Figure 3A:
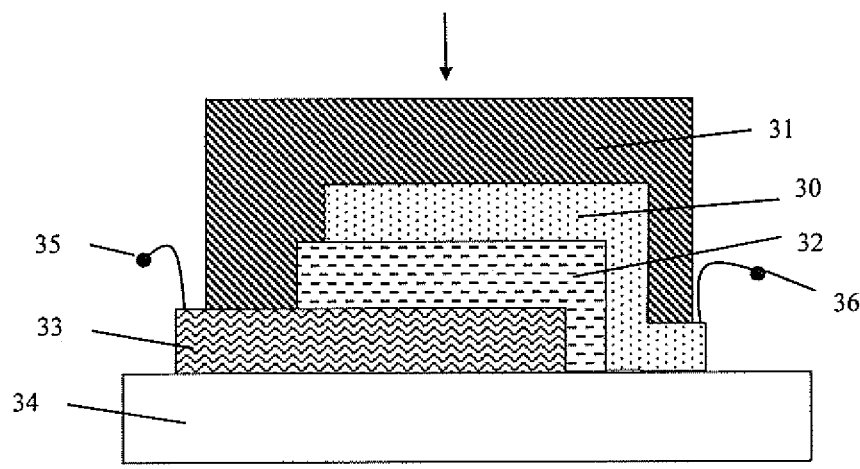
FIG. 3a: Shows schematics of an EC device fabricated by the inventive method.

FIG. 3a shows a schematic of an EC display device that is formed on paper or fabric using printing processes or other processes. Printing or printability in this disclosure means use of any printing or wet coating deposition method to deposit one or more layers in the device. This figure shows a single pixel of the display that is formed by an EC layer 32. The substrate (paper, fabric or a metal coated polymer or a metal coated polymer film) is 34, the first conductive electrode 33, and the second conductive electrode 30, and an encapsulation layer 31 (one may also use conductive metal foil that acts both as a substrate and as a conductor. At least one of the two electrodes, i.e., 33 or 30 is patterned. The two powering terminals are shown as 35 and 36. The display is viewed from the side of the arrow. EC formulations and layers using hydrophobic materials are preferred although hydrophilic materials may also be used as described above. One has to be careful in applying the powering voltage to hydrophilic systems to ensure that unnecessary power is not wasted by electrolyzing water rather than to activate the display. For aqueous systems, it is preferred that the applied voltage is below 1.8V, and for hydrophobic system one may use up to 3V.

However, a preferred embodiment is where the entire device is made by printing process. Here, one starts with a substrate 34, and all of the following layers, i.e. the back conductor (33), the electrolyte (32), transparent electrode (30) and the encapsulant 31 are sequentially printed on top of each other. Alternatively one may start with a substrate 34 pre-printed with back conductor 33 and then print all of the other layers so that the complete device is printable and alignment of one layer against the next is easy. This allows one to manufacture devices at extremely low cost without mixing and matching other processes such as lamination, edge sealing, etc. If this was a label stock one can additionally print an adhesive layer (e.g., a pressure sensitive adhesive) and then combine this with a release layer. The adhesive layer may also work as an encapsulation layer. As discussed later when this is used, then during processing and after processing there should be no adverse reaction between the layers (e.g., a non desirable reaction, migration of a liquid or a molecular component from one layer to the other, or solubilization of the underlying layer during processing), but still have good adhesion. This issue of complete printability, especially amongst these layers will be discussed later in more detail. These devices are also connected to the other electronic components (which are also preferably printed) by printed conductive lines.

Figure 3B:
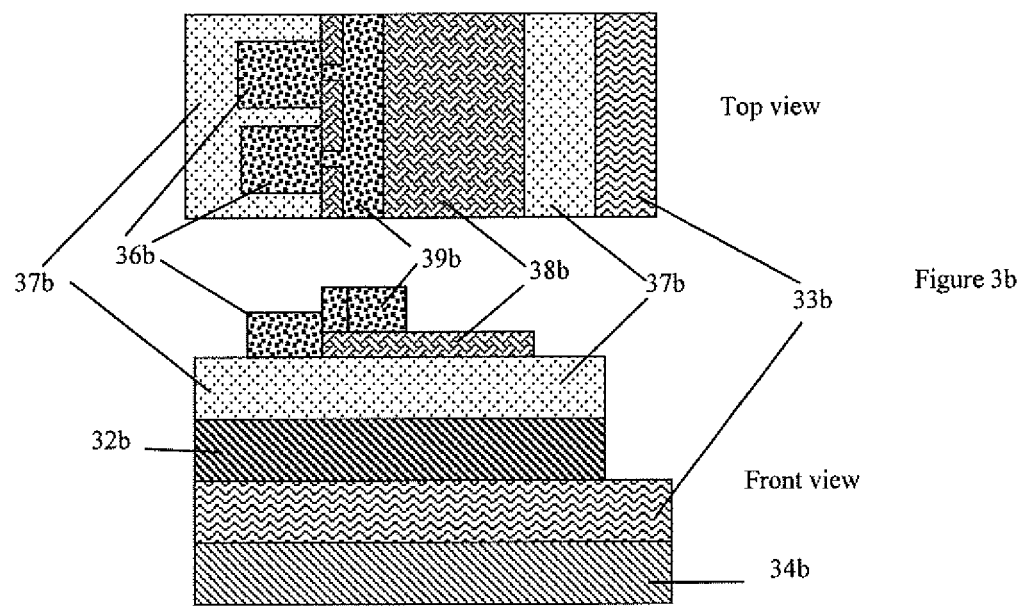
FIG. 3b: Shows schematics of an EC device (top and front view) fabricated by the inventive method.

Although this display may be processed by any method, the description here is particularly aimed to where all of the layers are deposited by a printing technology. In addition, since different layers have different compositions, and may have different thickness requirements, it is likely that these are formulated differently, where more than one printing technique is used. Before coating the substrate with 33, it may be optionally coated with a barrier layer (not shown) to prevent ingress of moisture and air or any of the chemicals from the paper or fabric to permeate into the device or any of the ingredients from the electrolyte to be transported away by wicking action. In addition, the barrier layer may also act as a planarization layer so that when other components such as chips are assembled, then they form reliable contacts. The barrier layers may be any of the polymers (including polymeric blends and alloys) that may be chosen from a wide variety of materials, e.g., acrylates, fluorinated polymers, epoxies, polyurethanes, silicones, polyesters, alkyds, polyamides and biodegradable polymers such as polylactic acid. It is generally preferred that hydrophobic or water resistant materials be used. Materials with hydrophilic character may also be considered, particularly biodegradable polymers may be used to formulate barrier or other layers in the device (including electrolyte) so that disposal of these displays is not as serious an issue. The thickness of this may be several microns and deposited by a printing or a coating process. Layer 33 may be a conductive paste or an ink that may be patterned (e.g., printed) in a fashion to form electrodes (pixels) and the connectors. The thickness of this layer may be from about a micron to several 10 s microns. This may be a carbon comprising paste or an ink or this may be formed using the nanoparticles or coated nano or other particles as described in the concurrently filed non-provisional application Ser. No. 12/497,535 entitled "Metal coatings, conductive nanoparticles and applications of the same", which application is incorporated by reference herein. The transparency of this layer is only needed if one needs to see through the device. The opaque conductive inks may comprise of two layers if one of the layers may react with the electrode or the electrolyte. These two layers may be formed using non-conductive polymers but filled with different types of conductive particles. As an example, printable conductive silver pastes offer higher conductivity as compared to carbon pastes, but carbon pastes may be more inert. Thus one can place a carbon coating or a pattern that touches the sensitive electrolyte or the electrode and then the silver on top, i.e. a conductive non-reactive layer may be inserted between the high conductivity, reactive layer, and the electrolyte or the EC electrode (both are being collectively called EC layers). Other conductive non interacting pastes may comprise of particles of inert metals, conductive oxides and nitrides (like gold, rhodium, aluminum nitride, indium tin oxide, antimony-tin oxide, zinc-aluminum oxide, etc.). This can be used for any of the examples where there is a fear of reaction between conductive electrode and the EC layers. One may even use an inert conductive electrode that would cover the electrolyte uniformly (applied as a tape or as a layer that is hardened). This material could be an anisotropic conductive adhesive (i.e. electrically conducts through the thickness and not laterally also called "Z" conductive adhesive) or can be an isotropic conductor with low conductivity (typically greater than about 500 ohms/square or preferably greater than 2,000 ohms/square). The conductive pixels can then be formed using printing on top of this carbon electrode using highly conductive adhesive or material. This material is typically less than 100 ohms/square, and preferably less than about 25 ohms/square. A display formed using this concept is shown in FIG. 3b that upon powering displays two solid squares 36b when one looks at these through the clear substrate 34b. The transparent conductor is shown as 33b and the electrolyte as 32b. The non-reactive low conductivity or the z-conductivity material is shown as 37b. 38b is an insulating material and 39b is the top conductor which is of high conductivity. Where the top conductor touches layer 37b, the device colors when powered by attaching a lead to the top conductor and another to layer 33b. One can start with a substrate coated with transparent conductor and then sequentially print the electrolyte layer, low conductivity layer, insulating layer and the top electrode layer. One could print a pattern of insulating layer and the top conductor so that any desirable message, picture may be created that can be displayed as if there is one pixel or there may be several pixels. Also, it is not shown in the figure, but one may extend the insulating layer so that it comes down on to the sides of the lower conductivity material and the electrolyte and covers part of the transparent conductor 33b. When the top electrode material is put down the pattern is such that part of the electrode material touches 33b (transparent conductor and then snakes on top of the insulator without touching the pattern connected to that part which is forming the top electrode. This way both the bottom and the top electrodes are in the same plane and it is easier to electrically connect to the rest of the system. One can screen print all of the layers or for example some of these may be deposited using different printing methods. Typically the thickness of the electrolyte layer (32b) in such devices will vary from about 10 microns to about 300 microns. The thickness of low conductivity inert material will vary from about 1 to 50 microns. The insulating layer 38b is usually in the range of about 5 to 100 microns and the thickness of the conductive layer 39b can vary widely from about 0.1 to 50 microns.

The electrolyte layer should have good adhesion to the substrate and must also present a surface on which other layers can be printed with good adhesion. One way of forming this type of a layer is by using an electrolyte which can be processed to a solid layer with a matrix with micro or nano-pores that is filled with the electrolytic material (like channels, also see FIG. 10 and description). The matrix provides good adhesion to the underlying substrate (or electrode), supports the electrolyte which may be liquid or soft solid, and also provides a top surface that can adhere to the electrode that may be printed or deposited on top (e.g., printable carbon black or metal filled polymers, or conductive polymers, such as PEDOT). To form this layer the printing formulation typically comprises of a solvent that solubilizes the matrix polymer and also the electrolytic components (dissociable salts (including ionic liquids), redox dyes, non-removable solvents, other polymers that is compatible with the electrolytic components, etc). However, the matrix polymer is not compatible (does not solubilize) with the electrolytic components. The electrolyte formulation may have other ingredients and fillers to control opacity, viscosity, adhesion, surface tension, etc. When such a material is printed, and the solvent removed, the matrix polymer phase separates from the electrolytic components, resulting in a porous matrix filled with electrolytic components. The volume fraction of various components, layer thickness, processing conditions (e.g., solvent evaporation rate), matrix polymer properties and its molecular weight and other ingredients will determine the kinetics and thermodynamics of phase separation that will then determine the microstructure of the pores. A preferred range of these channels size (average diameter or cross-section dimension) that connect the bottom electrode to the top are preferably in a range of about 10 to 5,000 nm. Such types of electrolytes may be used for other types of electrochemical devices which in addition to the displays include sensors, batteries and supercapacitors. Another method to provide the same effect is to substitute a monomeric system instead of the matrix polymer in the formulation, that is compatible with the electrolytic ingredients (may also include a removable solvent for improving processability), and upon polymerization (initiated by radiation or thermally) phase separates. The monomeric system may comprise of one or more monomers along with reaction promoters and initiators.

The electrochromic layer (also electrolyte in this case) may comprise of an electrochemically polymerizable monomer or a metal plating salt or both as discussed earlier. Other materials including a complimentary redox agent and other additives are also added. Polar materials, such as polyvinylpyrrrolidone, may be used in the electrolyte. Hydrophobic matrices with ion conductive properties are preferred, e.g., copolymers of fluorinated materials used in the lithium battery industry (e.g., Solef® and Kynar® materials respectively from Solvay (Thorofare, N.J.) and Arkema (Philadelphia, Pa., some of the preferred Solef® grades are 21216, 31508 and 11008) (see U.S. Pat. No. 7,300,166, which is incorporated herein by reference). Plasticizers are usually high dielectric liquids that are able to solubilize the dyes and monomers, such as propylene carbonate, polypropylene glycol, polyethylene glycol, esters, phosphates and ionic liquids. Several of the preferred plasticizers are those that would not migrate to the substrates or other layers, thus the preferred ones are ionic liquids, particularly the ones that are hydrophobic. The ionic liquids may have anions such as $ClO_4^-$, $BF_4^-$, $CF_3SO_3^-$, $N(CF_3SO_2)_2^-$ (NTF or imide), $CHF_2CF_2SO_3^-$, $(CF_3CF_2SO_2)_2N^-$, $(CF_3SO_2)_3C^-$, $AsF_6^-$, $PF_6^-$, $Cl^-$, $Br^-$, tris pentafluoroethyl-trifluoro phosphate (FAP or $PF_3(C_2H_5)_3$). alkyl sulfate (e.g. $C_2H_5SO_4^-$) and tetracyanoborate, The preferred anions are those that result in hydrophobic ionic liquids, which from the above list are NTF, $(CF_3CF_2SO_2)_2N^-$; $(CF_3SO_2)_3C^-$, FAP, alkyl sulfate and tetracyanoborate. The preferred cations are chosen from one of the following: pyridinium, pyridazinium, pyrrolidinium, pyrimidinium, pyrazinium, imidazolium, pyrazolium, thiazolium, oxazolium, triazolium and tetraalkylammonium. More details are found in the several patents and applications that are already included herein by reference. One preferred hydrophobic ionic liquid is NTF salt of 1-butyl-3-methyl-pyrrolidinium It is preferred that if an EC dye with a salt structure is used, one of its anion or cation be similar to the anion or the cation of the ionic liquid respectively. Opacifying additives hide the bottom electrode 33 so that it is not visible, and further when powered, a high contrast is obtained. Thickness of electrolyte layer may be from about 0.5 to 30 microns. The titania comprising particles provide a white color appearance due to the scattering of light between the particles and the media that they are dispersed in. However, one can also use inert pigments and dyes that may be added to with or without the white pigments described above to change the electrolyte/background color. When this is done we have to ensure that when the electrochromic display is activated, the contrast is still there, and that this dye/pigment is inert, i.e., it does not adversely affect the EC phenomenon and is preferably UV stable and stable at the redox potentials used to activate the EC display. For example, for most viologens that color to blue, blue-green, addition of yellow or red pigments (e.g., red iron oxide or a red organic dye) will still keep a high contrast. For molybdenum doped tungsten oxide EC material which colors to a neutral color, any color may be added to the background to blend it with the desired product aesthetics or design. Thus any complimentary color of the background to the coloration color of the EC material would be acceptable. This allows one to fabricate printed displays in a variety of background colors by adding inert dyes and pigments. These pigments may also be used in formulations to hide electrodes as discussed for the other devices below.

Figure 3C:
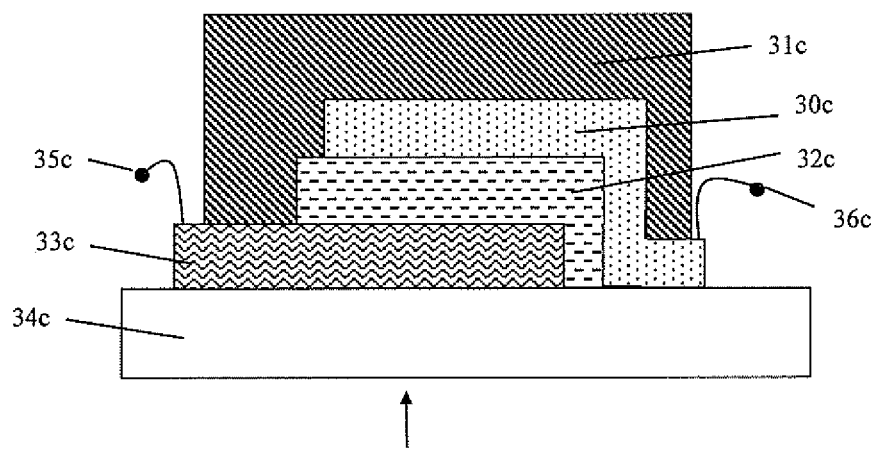
FIG. 3c: Shows schematics of an EC device fabricated by the inventive method.

Layer 30 in FIG. 3 is a transparent conductor that is preferably formed by printing and comprises of conductive nanoparticles and/or larger sized conductive fibers, as discussed in non-provisional U.S. patent application Ser. No. 12/468,719. As discussed earlier, this may have a matrix material, or may just be a non-woven transparent mesh. After deposition (coating or printing process) this layer may be pressed into the EC layer 32 to form a good contact. The thickness of this layer may be about 0.2 to 20 microns. To show characters, images, etc, at least one of the conductive electrodes is patterned (this is not shown in the figure). Another way to pattern may be to pattern the electrolyte, particularly for passive matrix displays. The electrolyte may be patterned as it is deposited, while filling the areas without electrolyte with inert material but matched in color and thickness to the electrolyte. One may also subject the electrolyte after printing to UV or other radiation beam which selectively crosslinks the matrix or deactivates the EC dyes so that that area is not electrochromically active. One may also employ photosensitizers or photoinitiators and additional monomers to promote these reactions. As an example, a variety of photosensitizers and photoinitiators are available from Ciba Specialty Chemicals (Tarrytown, N.Y.). It is also possible to make complete devices that are generic, and then expose them to UV through masks or writing by a beam to customize the message. As an example, rolls of generic devices may be made and stored, and when specific orders are received these are taken out of the inventory and the message written and shipped.

Encapsulation layer 31 is a polymeric material that protects the EC material and other components from water and air, and is transparent. It may be again chosen from several of materials, e.g., acrylates, fluorinated polymers, epoxies, polyurethanes, silicones, polyesters, alkyds, polyamides and biodegradable polymers. The biodegradable polymers usually degrade to a substantial degree when these are put in a landfill or an industrial compostable facility. As an example, in one type of system, lactic acid based polymers and copolymers are typically used for these purposes. Some of the main companies making these are BASF of Germany, Proctor & Gamble (Cincinnati, Ohio) Nature-works LLC (Minnetonka, Minn.), Novamont of Italy, and Rodenburg Biopolymers of the Netherlands. This layer may be a single layer or several layers with different materials. For example this may be a three layered material with polyvinyl alcohol (a good oxygen barrier) in between two hydrophobic materials. This layer may also be printed, or even be formed separately and then laminated to the substrate. Another method is to deposit this from a melt which can develop good adhesion with the underlying layers. An example of a preferred encapsulation layer to be put on underlying urethane layers is made out of polyolefins where it is modified to have good adhesion with urethanes (see Laura Weaver, Functionalized urethanes that deliver room temperature adhesion to polyurethanes", presented at the Annual Technical Conference (ANTEC) of the Society of Plastics Engineers, Chicago meeting, 2009).

The contacts for the terminals for the display may be exposed so as to connect to other circuitry.

An advantage of depositing most or all of the layers in a display by printing is to integrate the display making process with other electronic elements that may be optionally printed, e.g., connectors, RF antennas, power sources (e.g., solar cells, capacitors) and integrated chips. For example PolyIC (Furth, Germany) and Kovio Inc (Milpitas, Calif.) is able to print transistors and other circuitry, whereas Nanosolar (San Jose, Calif.) and Konarka Technologies (Lowell, Mass.) have demonstrated printed solar cells. This can result in low cost products such as tags or displays for a variety of applications in packaging industry for inventory control, product authentication, anti-theft, tickets, gift cards, security control, product status, etc. as discussed in non-provisional application Ser. No. 12/468,719, published US Patent applications 20070114621A; 20080100455; 20040022542A1 and Published PCT patent application WO08022972A1.

An alternate way of making the display is to deposit the conductive electrode on two different substrates and then use the electrolyte layer as the glue or the integration medium for these two with the conductive layers facing the inside of the sandwich and touching the two conductive layers.

Figure 4:
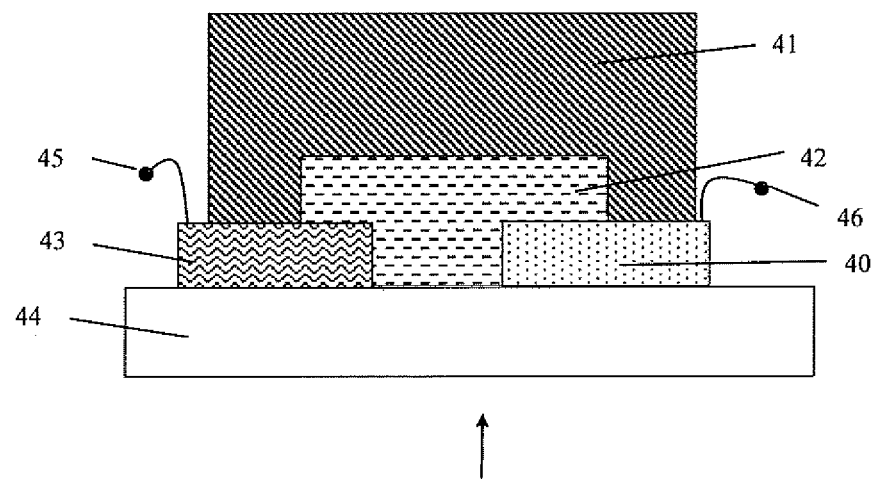
FIG. 4: Shows schematics of an EC device fabricated by the inventive method.

FIG. 4 shows another example of an EC device that is formed on a transparent sheet 44 (e.g., a polymeric film). The two opposing electrodes 43 and 40 are deposited by a printing process and are formed using the TC materials described above. Instead of printing, one may start out with a transparent conductor (such as indium tin oxide (ITO) or thin layer of gold) coated on a plastic sheet from many suppliers, which can be patterned by standard etch techniques. ITO, silver and gold metal coated transparent substrates are available and one supplier is CP films (Martinsville, Va.) which has substrates available in a conductivity range of about 4.5 ohms/square to about 300 ohms/square. As compared to FIG. 3, the two opposing electrodes are in a side by side (interdigited) relationship, rather than stacked on top of each other. These figures are only to show the principles of layer configuration, as any of the devices described in this invention may be made in either configuration (interdigited or stacked layers), on substrates which are transparent or opaque. For some applications it is preferred that those substrates be used where one side has a mat (or textured) finish and the other side has a smooth finish. The display is built on the smooth side and the display is viewed from the textured side so that specular reflections that give a glossy appearance can be avoided and some of the faint visibility of the electrode patterning through the substrate can be reduced. One may even adhesively bond a matt finished film on top of the surface through which the display is viewed to achieve similar effects. The electrolyte 42 comprises of the ingredients discussed above. The device is encapsulated by layer 41 and powered via terminals 45 and 46 (in all the figures these terminals are shown to be coming out of the substrate, but these may also be connected to a power source on the substrate, such as a battery, antenna, a chip, solar cell, etc). The display is viewed from the side of the arrow. As an example when a polymerizable monomer that changes color upon polymerization (e.g., bithiophene) and a complimentary redox couple (such as viologen) is used and the terminal 46 is negative, the region in the electrolyte 42 that is touching or close to the electrode 40 turns deep blue, whereas the electrolyte area touching or close to the opposing electrode 43 will deposit the polymer. The viologen will fade as it oxidizes by loosing a proton to the polymerized coating, and the colored area in the vicinity of the electrode 43 will stand out providing high contrast. This color of polymerized material may change with time, if the oxidation of the polymer changes which may occur by any one or more of the following reasons; applying a reverse potential, shorting the two terminals, leakage of current through the electrolyte, or diffusion of oxygen into the device. Alternatively (not shown in the figure) one could have deposited a patterned inert and opaque layer (preferably similar in color to layer 42 which may also be opaque) before depositing electrode 40, so that any coloration in this area would not be visible. In fact the opaque layer should also cover any gaps between the pixels, so that only the desired pixelated areas are viewed. In this case the electrode (40) does not have to be transparent (this could be a black colored paste made out of conductive carbon particles and a binder). Another way to make the display, is by lamination process (e.g., see U.S. patent application Ser. No. 12/140, 054 for lamination procedures), where two substrates coated with conducting materials (one of which is transparent) are used. Typically on at least one of these the conductive path is patterned. The EC material is deposited on one of them uniformly or in a pattern and then the two substrates are laminated where EC material is sandwiched between two conducting surfaces. When the device is powered, the EC material changes color to display information, depending on the electrode pattern. The EC layer may be deposited by a printing process. In this application one of the substrates may also be a conductive metal foil and selective areas may be masked with non-conductive layers as necessary.

Figure 5:
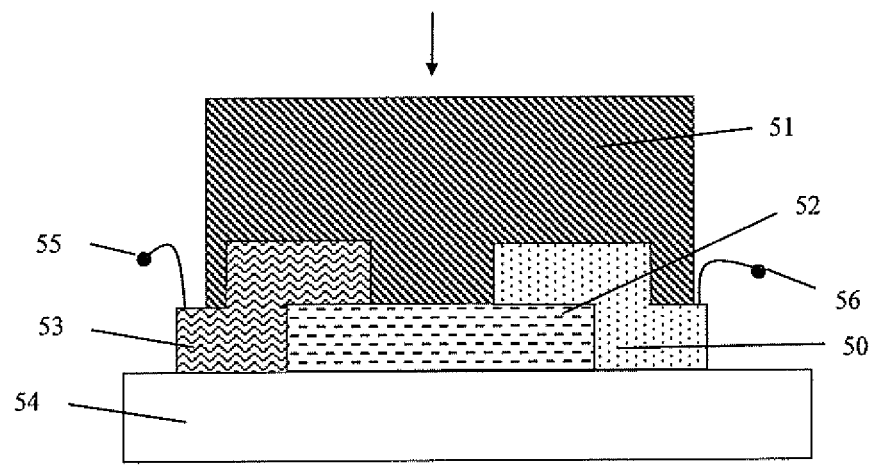
FIG. 5: Shows schematics of an EC device fabricated by the inventive method.

FIG. 5 shows yet another variation where an opaque substrate 54 is used. The EC properties are in electrolyte 52 as described in FIG. 4. The two opposing electrodes are formed as 50 and 53. Layer 51 is an encapsulation layer, and the arrow shows the direction of viewing. Essentially the electrolyte layer is deposited first and then the electrodes are deposited (which was the opposite for FIG. 4). If terminal 56 is powered positive compared to terminal 55, the electrolyte region close to the electrode 50 colors by polymerization and is visible. Again as earlier, the electrode 53 can be masked and need not be transparent. If one uses an electrolyte with a platable metal salt and a polymerization monomer, then the metal will plate on 53 in the area touching the electrolyte and polymerization on 50 in the area touching the electrolyte. One could mask one of these depending upon the desired color, or even leave both unmasked in the color differential between the two is desired.

Figure 6:
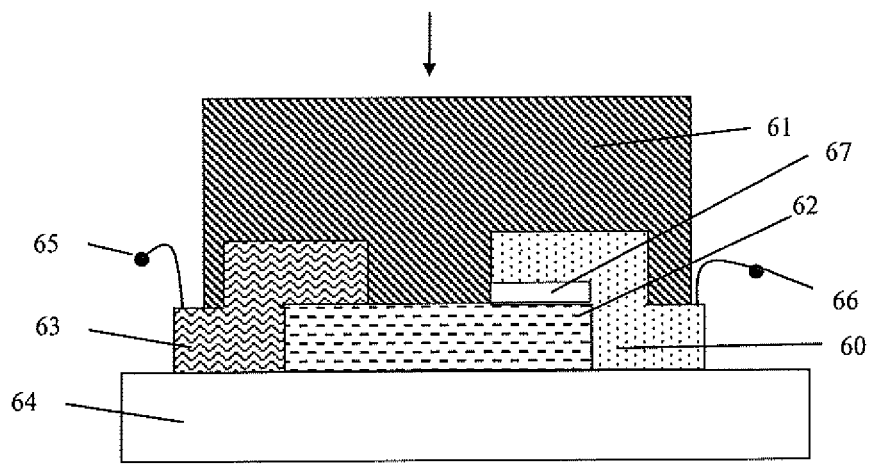
FIG. 6a Shows schematics of an EC device fabricated by the inventive method.
FIG. 6b Shows schematics of an EC device fabricated by the inventive method.
Figure 6:
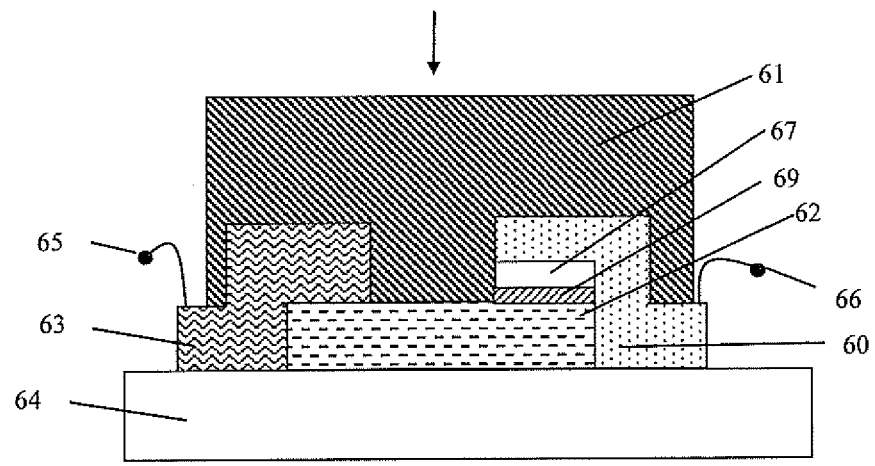

FIG. 6a shows another type of device in which an ion storage layer (this layer may also have electrochromic properties) is added to the device. The ion-storage layer is shown as 67 that is placed between the transparent conductor 60 and the electrolyte is 62. The encapsulation layer is 61 and the device is powered from terminals 65 and 66. The substrate 64 is opaque and this viewed from the side as shown by the arrow. If the ion-storage layer is a cathodic type comprising of tungsten oxide, PEDOT, etc., then an anodic material polymerization material (e.g., bithiophene) is added to the electrolyte.

Again the electrode 63 may be masked and need not be transparent. When the device is powered with electrode 66 being negative, the ion storage layer colors by reduction if it is electrochromic. The ion-storage layer may be formed in several ways as described in the in the concurrently filed non-provisional application Ser. No. 12/497,535 entitled "Metal coatings, conductive nanoparticles and applications of the same", which application is incorporated by reference herein. A particularly novel way that is described in that application is to make a printable formulation of EC materials that combines an EC material (or an ion storage material) in a matrix with electronically conductive nanoparticles. EC materials, such as inorganic oxides (e.g., tungsten oxide), may be coated on particles that are conductive or non conductive and then incorporated in the EC layer formulation. Another way is to make these as nanoparticles (these oxides should have at least one dimension smaller than 500 nm, preferably less than 100 nm) and then incorporate them in the formulation. The matrix composition for this electrode layer, other than the presence of electronically conductive particles and the EC dye may be similar to the electrolyte. If the color is desired from the electro-polymerization product at the other electrode, the ion-storage electrode may be masked and the other one made visible. Another combination of materials that may be used to form an EC device is combining an ion-storage material that oxidizes by taking in anions, or by releasing the cations, and the electrolyte comprising of a metal platable salt. As a specific example, the EC layer may be reduced polyaniline (e.g. see U.S. Pat. No. 6,327,069 which is deposited by mixing an electrochemically inert reducing additive to a electrochemically active material, where the latter is polyaniline), nickel oxide, iridium oxide, cobalt oxide, etc, to name a few. When the device is activated, the metal plates on the negative electrode, and the above layer is oxidized. Another type of ion-storage electrode that may be used is capacitive. For example, U.S. Pat. No. 6,118,573 (which is included herein by reference) describes such electrodes. These generally comprise of activated carbon and graphites. Powders of these materials are mixed in a matrix (e.g., polymeric or a solvent) and then deposited. These electrodes may also serve as conductive electrodes. To enhance their conductivity, one may add carbon nanotubes to these.

The encapsulation layer in EC devices, e.g. such as component 31, 41, 51 and 61 in FIGS. 3, 4, 5, 6a and 6b respectively or in other embodiments may also be an adhesive tape with a pressure sensitive adhesive or one that will cure later with radiation or heat or with moisture or by expelling oxygen (anaerobic). The backing in these tapes may be a polymeric film (e.g., polyester, polyimide, polystyrene and polyolefins), cloth, metal (e.g., aluminum, copper, steel) or metalized polymer foils (e.g., used routinely in food and other packaging industry). The adhesive tape may or may not have good adhesion to the layer underneath, but there may be other layers or substrate that may be exposed around the perimeter of the non-adhering layer to which the tape is bonded to.

For those reversible displays and indicators, when power is removed one would like to control the persistence of the indicator or the display, one may also make use of selective ion conduction layers (SITL) which may be inserted between the ion storage layer and the electrolyte (SITL is shown in FIG. 6b as layer 69). These are described in U.S. Pat. No. 6,178,034. SITL layer retards the ionic flow and may only allow one type of ion (e.g., cation vs anion) to go through. As a specific example, the electrolyte may comprise of platable metal salt and the ion-storage layer may be reduced polyaniline as described above. SITL layer in this case will be a chloride anion conductor (e.g., an anionic polymer, e.g., see PCT patent application WO2007/084155). These layers are usually put down as thin coatings from solutions in a thickness preferably less than 2 microns thick. When the device colors by metal plating the anion is retained by the ion-storage layer. Depending on the permeability of this layer, once power is removed, the ions can percolate through this layer into the electrolyte and recombine with the metal to erase the information. Using SITL layers (type and thickness) can change the memory (or image retention) of a device from several seconds to several days and longer.

Figure 7:
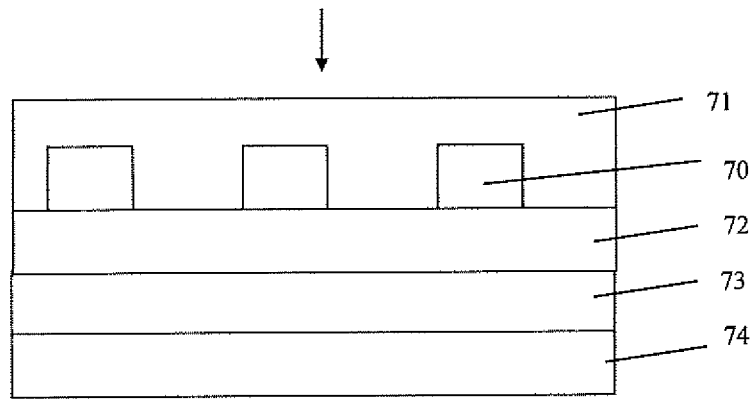
FIG. 7 Shows schematics of an EC device fabricated by the inventive method.

FIG. 7 shows a device where the contrast is produced by a platable metal. Substrate 74 is coated with a conductive material 73 and then with an electrolyte 72. The top TC is patterned as shown by 70 and then encapsulated by 71. For a device that needs to be only viewed from the top side, one or both of 73 and 72 are opaque. For example 73 may be a carbon electrode and 72 is transparent. When power is applied with the top electrode being negative, metal deposits at the interface of 70 and 72 and gives a reflective contrast against carbon black. The electrolyte may have white opacifiers resulting in contrast against a white background. The electrolyte may comprise of 1-methyl-3-octyl imidazolium chloride as ionic liquid and silver chloride as basic electrolyte with other ingredients added as discussed earlier. One may also add a compatible anodic redox material to the electrolyte, or the electrode 73 may comprise of activated carbon which would result in capacitive ion-storage layer. An alternative method of patterning the conductive layer in this example or any other example (not shown) is by using a combination of a conducting and an insulating layer. This is particularly useful where the processes do not allow an easy or an inexpensive way to pattern by selective removal of the conductive coating. As an example an insulating material in a pattern may be deposited on layer 72, which may be patterned in a desired way, so that when the conducting layer 70 is deposited uniformly so that it only comes in contact with layer 72 where the insulating layer is absent.

Figure 8:
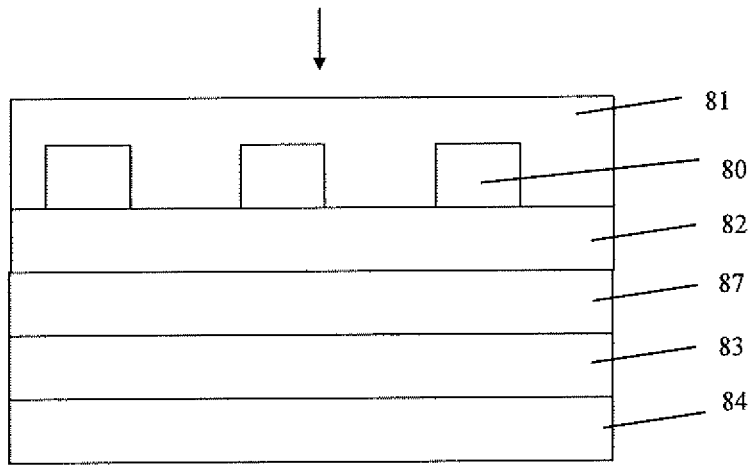
FIG. 8 Shows schematics of an EC device fabricated by the inventive method.

FIG. 8 shows another type of device which functions on removing or oxidizing a metal to create a contrast. Substrate 84 is coated with a conductor 83, which is further coated with a metal 87 which would be selectively removed or oxidized when the device is powered to create the contrast. The thickness of the removable metal is usually in the range of 10-40 nm. 82 is the electrolyte, 80 is patterned TC and 81 is the encapsulation layer. As an example if layer 87 is vanadium, one may use vanadyl sulfate as the redox species in electrolyte 82. When the device is activated with 80 being held at a negative potential, the areas below 80 are oxidized to a colorless state and result in a contrast with the surrounding area. In this case electrolyte 82 is clear. Another alternative may be that 87 is a silver layer, and the electrolyte a silver ion conductor, which could comprise of powders of inorganic silver ion conductor (e.g., silver β alumina, $RbAg_4I_5$, $Ag_{19}I_{15}P_2O_7$) along with 1methyl3octyl imidazolium chloride as ionic liquid and silver chloride as basic electrolyte. The electrolyte may have additional opacifiers if the opacity provided by the above powders is not enough. When a negative voltage is applied to 80 relative to 83, silver from layer 87 is stripped off and deposited at the interface of 82 and 80 resulting in high contrast. In this case it is not necessary to remove the silver through the entire thickness of layer 87, and it is possible that if this layer is thick enough it can work both as conducting layer and as metal provider, thus layer 83 is not needed. In this device any appropriate thickness of silver layer may be used.

Figure 9:
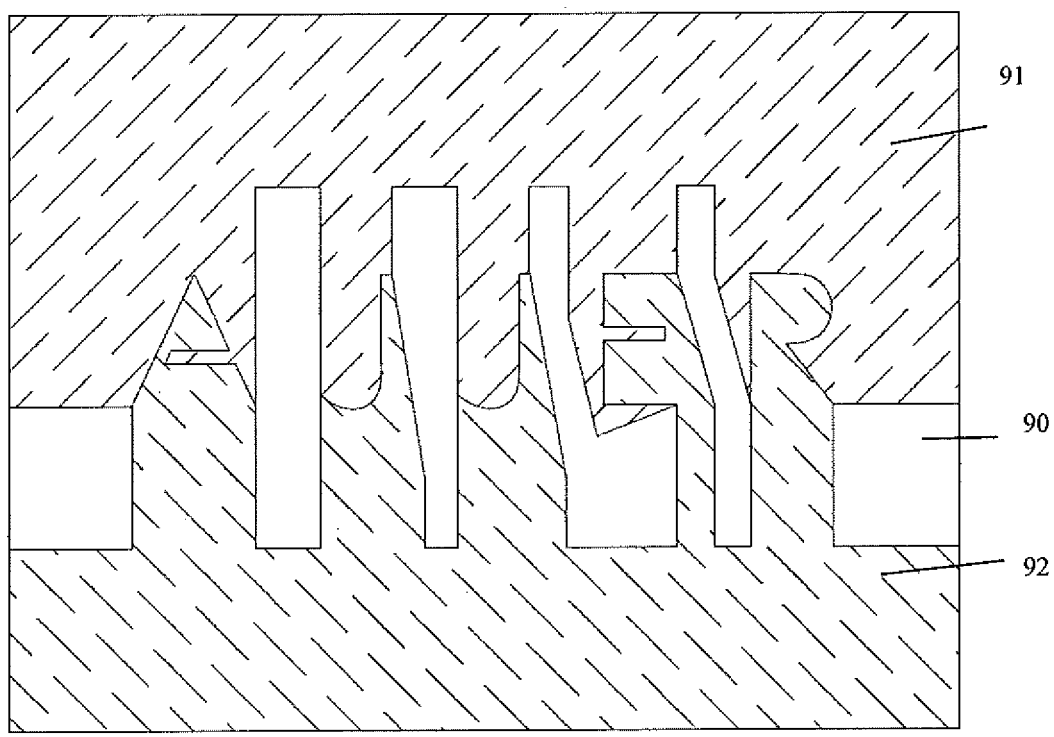
FIG. 9 Schematics of a two electrode interdigited display pattern showing characters.

Although some of the above examples are provided using interdigited arrangement (for example FIGS. 4, 5, 6a and 6b) and some parallel arrangement (FIGS. 3, 7 and 8), it should be noted that any of these devices may be made in any of these arrangements. If the electrodes are on two different substrates, then one may form these devices by lamination, where either the electrolyte or one of the other layers may be used as a medium to bind the two substrates. Interdigited electrodes may also be formed for display system, which allows all electrodes to be located in the same plane as discussed in FIGS. 4, 5, 6*a* and 6*b*. FIG. 9 shows a method to form characters using two connections with both the electrodes on the same substrate. In this case, the characters are formed by a close separation of the two electrodes 91 and 92, and then a large separation of the two electrodes creates boundaries that do not color such as in several areas (only one of these is indicated by 90). The closeness of separation that allows one to color is dependent on the electrolyte conductivity, but it is generally preferred that this be less than about 1 cm. A most preferred range is that which can be accommodated in the label or tag and conveniently formed by a processing technique used. If a laser etch is used to make these lines then a convenient range is 10 to 100 µm, and if printing is used so that the transparent conductor is not printed in those areas, then it may be more in the range of about 0.1 to 1 mm. Another way to use high conductivity electrolytes (to allow faster coloration) but also allow closer character spacing is to use patterning of the electrolyte so that the electrolyte while touching both the electrodes, is separated for each character. Since the electrolyte may be easily visible (e.g., milky white appearance), one may use color matched insulating separator paints or layers. As an example, one may print these separators on the substrates first (say in regions 90, or even extending them vertically (or making them in other shapes) and then print the electrolyte. The electrolyte pattern may overlap the insulating layer edges, but preferably not touch each other if the characters are too close. If they touch, their appearance in the covered areas can still be masked by the insulator, but unnecessary power will be consumed. In this example only two electrodes are used to form the characters, but may form several leads coming in to power each segment of the character differentially from the controller, so that any message at will can be displayed by selectively powering these segments.

Printing processes may be used to deposit any one of the layers in the device including electrodes, electrolytes, masking, barrier and encapsulation layers. Printing processes include individual or web based processes such as offset lithography, engraving, thermography, reprographics, letterpress, screen printing, flexography, gravure, pad printing, ink-jet printing and laser printing. Printing methods allow one to pattern the electrodes, electrolytes and other layers inexpensively, particularly for display and indicator applications that have to be prepared in large numbers at an attractive cost.

Transparent conductors are required to form these devices, and a preferred option is to deposit these layers by printing. Many of the devices are being developed so that the various layers comprising these could be deposited by a solution coating or a printing method. Conventional TC's, such as indium tin oxide, fluorine doped tin oxide, and aluminum doped zinc oxide are usually deposited by physical vapor deposition. To make the devices of this invention one may use such TCs. As an example, one may obtain polymeric films with predeposited TC's which may then be patterned by removing or etching the TC. For some types of devices and applications it is economically desirable that all layers including TCs be deposited using printing processes. For most applications the transmission of the printed TCs should be as high as possible. For solution deposited or printed TCs, transparency should be in the wavelength range of 400 to 700 nm. Many times, the transparency of these conductors is characterized in photopic range or at 550 nm which is for maximum eye sensitivity in the daytime. For applications involving colors, transparency in a broad range of 400 to 700 nm is preferred. A transmission in excess of 30% is acceptable for some applications. A transmission in excess of 80% at the desired wavelength on a substrate is most desirable. In terms of surface resistivity these values should be less than about 10,000 ohms/square, and more preferably lower than about 200 ohms/square, and most preferably lower than about 100 ohms/square:

Thus a substrate with most preferred transparent conductor deposited by solution or a printing process will have a transparency greater than 80% and a surface resistivity lower than 100 ohms/square. If a colored or a hazy substrate is used, that will naturally lower the transmission, however, to evaluate the relative merit of a transparent conductor, the substrate should be clear.

Printable TCs using randomly dispersed conductive nanowires (made out of metals, such as silver, silver alloys, noble metals, and semiconductors such as indium tin oxide doped zinc oxide and carbon nanotubes) have been suggested for use as transparent conductors and electrical connectors (for example see published US patent application 2007/0074316 by Alden et al and in the concurrently filed non-provisional application Ser. No. 12/497,535 entitled "Metal coatings, conductive nanoparticles and applications of the same", which application is incorporated by reference herein. Specifically, conductive nanowires made out of ITO are discussed by Limmer, S. J., et al., (Applied Physics A: Materials Science and Processing 79 (3), pp. 421-424 (2004)) and for carbon nanotubes by Trottier, C. M. et al., (*Journal of the Society for Information Display* 13 (9), pp. 759-763 (2005)). The contents of these patent applications and articles are included herein by reference. A low temperature processable, screen printable conductive transparent layer with non-silver is available from Creative Materials Inc. (Tyngsboro, Mass.) as 124-31, which may also be used. Since an important focus of this invention is printability of the materials, it must be understood that other than the nanowires, additives including a matrix material will be required to form a complete ink formulation for printing TCs depending on the print process used. This includes agents to control viscosity (including thixotropy), surface tension, drying control, antifoaming agents and others. Any printing methods may be used that are suitable for the product and conforms to the layer thickness requirements. For those layers where high deposition uniformity is required in a pattern with thicknesses generally lower than 2 microns, one of the preferred methods of print deposition is by Maskless Mesoscale Materials Deposition by Optomec (Albuquerque, N. Mex.). This printing/spray method may be used to deposit conducting and or other layers in the device. Corrosion inhibitors are added to these silver nano-fiber materials, which may be the same as the UV stabilizers discussed above. Further, one may use the same UV stabilizer to reduce corrosion of the silver nanowires as the one used in the electrolyte. Some examples of corrosion inhibitors are aromatic triazoles, imidazoles and thiazoles, cysteine, and synthetic peptides and protein scaffolds with affinity towards the metals, dithiothiadiazole, alkyl dithiothiadiazoles and alkylthiols, anti-tarnish varnishes. Coating with gold, and alloying with other elements have also been suggested to reduce corrosion (a more exhaustive description of alloying elements and coatings to reduce corrosion are described in the concurrently filed non-provisional application Ser. No. 12/497,535 entitled "Metal coatings, conductive nanoparticles and applications of the same", which application is incorporated by reference herein. Further one may also use metal coated organic fibers to form transparent conductors as described in this invention. In some cases conductive polymers may also be used which can be easily deposited by printing. One may take advantage of the redox properties of these polymers and save on adding a redox dye to the electrolyte, but one has to ensure that the redox properties do not adversely affect the device performance when the device is activated. Conductive thiophene solutions (e.g., Baytron P) are available from HC Starck (Newton, Mass.) and as Orgacon from Agfa Gevaert (Belgium, or from ITO America Corporation, Tempe, Ariz.), and conductive polyaniline solutions (e.g., Panipol T, M, X, W and L) from Panipol Oy (Finland). Agfa-Gevaert also supplies polymeric films coated with thiophenes. It is preferred that the printable TC be deposited on top of the electrolyte so that the conductors form a good contact (they may even be pressed into the electrolyte surface) and then these could be covered with a layer of inert polymer for encapsulation of the device. Several inert polymers are described in this invention, some of them are acrylates, fluorinated polymers, epoxies, polyurethanes, silicones, polyesters, alkyds, polyamides, polyxylene (e.g., Paralyene™ C, D or N polymers) and biodegradable polymers such as polylactic acid, etc. These polymers may also be polymerized (and/or crosslinked) in situ after they are deposited.

Usually the nano-wire dispersions are prepared in aqueous systems. If hydrophobic electrolytes are used, then such dispersions will be difficult to print on top of these electrolytes. One may use surfactants or partially or fully replace the solvents to those that may be more compatible with the underlying layers and also tailor their surface tension and viscosity in a range that is acceptable by the choice of printing method. Patterning of the printable TCs may be done by printing masks or printing selectively (e.g., by inkjet printing)

Figure 10:
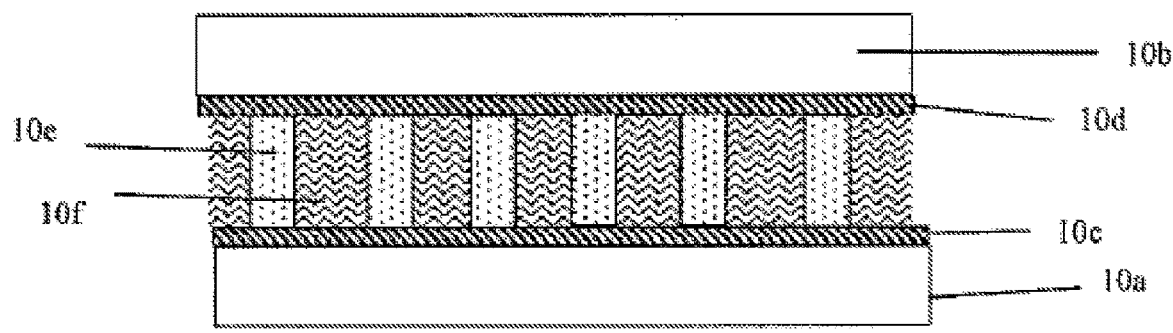
FIG. 10 Shows schematics of a device with electrolyte in channels.

The devices may also be made in another way, wherein the electrolyte is incorporated in a porous medium, which is then assembled so that the electrodes touch different areas of the porous medium. The porous medium may be continuously impregnated by an electrolyte by a printing process and then laminated between two electrodes. The porous medium may have cylindrical channels perpendicular to the electrodes so that the electrolyte does not permeate sideways, or these may have interconnected pores where the electrolyte migrates all over the place. Further, these membranes are typically prepared in advance of impregnating them with the electrolyte. In another embodiment, the electrolyte is mixed with a monomer and assembled in the device. The monomer is later cured which then results in phase separation of the electrolyte from the polymer in a way that the polymer forms reticulated structures, or polymeric channels with liquid electrolyte are formed due to this phase separation. Some examples of porous media are papers, glass fiber or polymeric fiber filters, open cell foams, polymeric membranes with perforations, etc. Some specific examples of filters are Whatman 541, mixed cellulose ester membranes, nylon and PTFE membranes (available from Fisher Scientific, Pittsburgh, Pa.). Preferred membranes have a pore size of less than about 30 µm and preferably less than about 10 µm. Some membranes that have non-interconnected holes perpendicular to the surface of these membranes are Millipore Isopore® polycarbonate (Millipore, Billerica, Mass.) and Whatman Anopore aluminium oxide membranes (Whatman Inc, Florham Park, N.J.). Phase separation of polymers with liquid crystal systems is well known (polymer dispersed liquid crystals (PDLC), such as polymerization induced phase separation in U.S. Pat. Nos. 6,061,107; 5,691,795). Usually acrylics, epoxies and urethanes are utilized for these purposes. In PDLC systems the liquid crystals are encapsulated in a droplet, whereas here open channels are needed so that the liquid electrolyte is able to touch the electrodes. FIG. 10 shows an schematic diagram of such a system where two substrates are shown as 10a and 10b that have conductive coatings 10c and 10d respectively. The electrolyte is shown to have two components, a solid phase that forms the channels, shown as 16f, and the channels filled with the electrolyte as 10e. Although these channels are not shown to be interconnected, they may also be interconnected as discussed earlier.

A novel electrolyte formulation may be formed in another way that utilizes a porous structure. These may be formed using environmental friendly methods using water as solvent. As an example, an anodically polymerizable monomer (e.g., thiophene) as described earlier and a cathodic material may be solubilized in a water soluble ionic liquid. An example of water soluble ionic liquid is 1-Ethyl-3-methylimidazolium ethylsulfate available as LQ1 from BASF (Florham Park, N.J.). If a viologen based cathodic dye is used, it is preferred that its anion be also ethyl sulfate. Since this ionic liquid is water soluble, this can be mixed with polymeric based water based latex or a colloidal formulation (e.g., latex, acrylic (including polyvinyl chloride, acetates, butadienes and isoprenes), urethane, epoxy, silicone and fluoropolymer latex or emulsions) which may optionally include other additives as described earlier. This may also be made in a aqueous paste which is screenable for printing. The print is then dried by typically heating from 80 to 110° C. for a few minutes. The drying process leads to the emulsion or the latex particles to coalesce and/or crosslink to form a water resistant coating with good adhesion to a variety of substrates, while leaving interconnected pores filled with electrolyte comprising predominantly of the ionic liquid with redox materials. However, it is important that the drying or processing conditions be chosen (including the eventual conditions that the device is subjected to) so that the particles do not flow completely and result in non-porous film formation. Some ways to avoid this are to include particles which have a glass transition temperature higher than processing or use conditions, or use particles that are already crosslinked. For those devices where one of the redox is in one or more coatings, the electrolyte may be modified with appropriate redox materials, salts or compositions. This allows one to form an environmentally friendly, printable electrolyte composition which uses no solvents other than water.

Preferred materials to form a solid matrix (or sometimes called a binder) of various layers using multi-phase materials, particularly polyurethanes is discussed. Polyurethanes in this disclosure include polyurea linkages where instead of a polyol linking with isocyanate a linkage between an amine and an isocyanate is formed. A polymer may have both urethane and urea linkages. This aspect is described with reference to FIG. 3c, but the principles are applicable to other devices as well. The arrow in this figure is the direction of viewing of the display. 34c is a transparent substrate, 33c is a transparent conductor, 32c is an electrolyte layer with redox dyes, layer 30c is the back electrode and layer 31c is the encapsulation layer where all of these are deposited by printing followed by a drying or a curing step in between. Additional insulating layers other than encapsulants when used refer to those layers that are not electronically or ionically conductive. Polyurethanes are chosen so that we can use its multi-phase microstructure to a great advantage. In addition it offers a very versatile platform to change its chemical, morphological and physical properties. Polyurethanes form hard and soft domains, where hard domains are inter-dispersed within a matrix of soft domains on a nanometer scale (e.g. see, Eisenbach, C. D., Ribbe, A., Gunter, C., Macromolecular Rapid Communications, 15 (1994) p 395-403). The hard domains may be crystalline or form an amorphous area with high glass transition temperature. Similarly, other polymers with multiphase structures (e.g., with crystalline and amorphous phases) may also be used. In these materials the electrolytic or the EC components are restricted to the soft domains while the hard domains provide good adhesion and mechanical properties. We prefer to use aliphatic urethanes to ensure good inherent electrochemical and UV stability. Thermoplastic urethanes are abbreviated as TPU. The size and density of the domains can be tailored by altering the monomer ratio. The size and density of the domains controls the mechanical properties, electrolyte uptake (when used for the electrolyte layer) and adhesion.

TPUs of different properties are typically synthesized using varying stoichiometries from three bifunctional monomers and a catalyst. The monomers are a diisocyanate (ISO), a low molecular weight chain extender diol (CE) and a higher molecular weight flexible diol (FD). The ISO reacts with a hydroxyl group of the CE or FD. The sequences that form from the reaction of ISO and CE are called rigid segments and the sequences formed from ISO and FD are called the flexible segments. Sequences are also formed that are mixtures of ISO, CE, and FD. Sometimes ISO is reacted with CE so that an isocyanate terminated prepolymer is formed, which is then reacted with FD. This provides more tailored rigid segments that form hard domains. Once the urethane is synthesized, the rigid segments separate into hard domains that act similar to crosslinks and the soft segments provide the flexibility. This provides rubber like elasticity to these materials which can be reversibly stretched. Typically the soft segments form a continuous matrix in which the hard segments are embedded as discrete entities that separate on tens of nanometer scale.

One can synthesize a TPU so that the electrolytic components (e.g. the ionic liquid and the dye in this case) are contained in the soft segments, i.e., the electrolytic components can swell the TPU but cannot solubilize it. Additional processing solvent is required to solubilize the TPU so as to solvate the hard domains. This allows one to form a paste or a solution for processing, such as for screen printing or for any other method. After printing this layer, the solvent evaporates (or is extracted), and the hard domains are formed by phase separation that results in the solidification while the soft segments retain the electrolytic components, which form continuous pathways within the electrolyte layer for ionic conduction. The compatibility of the soft segments can be tested before hand by seeing if the FD monomer dissolves in the electrolytic liquid (or even the dominant liquid phase which may be just the ionic liquid or any other liquid medium used for the electrolyte). A polymer between ISO and CE may be also formed and tested for its inertness towards the electrolytic components and its solubility in a desired solvent.

For an electrolyte formed from an ionic liquid (1-butyl-3-methyl-pyrrolidium bis(trifluoromethylsulfonyl) imide, also called BMP-NTF), we found that TPU (called TPU1) formed using hexamethylene diisocyanate as ISO, butanediol as CE and a polyester polyol as FD, could be swelled and gained 40% weight when immersed in this ionic liquid. This swollen mixture dissolved when dimethylsulfoxide (DMSO) as processing solvent was added. Another hydrophobic urethane was selected called TPU2 with a polyether FD. TPU2 had a very different interaction with the electrolyte even though TPU2 contained the same isocyanate and chain extender as TPU1. This is because TPU2 used a hydrophobic polyether for flexible segments (FD); where as TPU1 used a polyester. Both TPU1 and TPU2 have similar mechanical properties (100% tensile modulus for TPU2 was 250 psi vs 300 psi for TPU1). When TPU2 was soaked in BMP-NTF ionic liquid, no change in weight was seen, i.e. there was no swelling, indicating that there was no interaction between the BMP-NTF and the TPU2, thus our electrolyte would not migrate into any of the layers made of TPU2. TPU2 was also not soluble in DMSO. Further, when a pellet of TPU1 and TPU2 were pressed together under heat, they developed excellent adhesion and the overlapping regions could only be pulled apart by tearing one of the polymers. This shows that the two polymers bonded well due to similarity of the hard segments. Thus a layer made out of TPU can be processed using another solvent, and will not dissolve the underlying electrolyte layer, will not soak the electrolytic components and will develop good adhesion. TPU2 can be used to develop a matrix for conductive formulation for layer 30c in FIG. 3c that can be deposited on top of the electrolyte layer 32C formed by TPU1. If the mechanical properties of both the layers are matched in the temperature range of interest, then upon flexing a device with these layers the interfacial stress would be low, thus avoiding failures. Similarly for the encapsulation layer for this system, one can pick a third urethane say TPU3 which has similar ISO, CE, but a different hydrophobic ED based on another polyether that is not compatible with the ionic liquid (meaning does not absorb) and also different from the one used in TPU2. This can then be used as an encapsulant layer 31c in FIG. 3c, and yet a third solvent could be used. Thus, printable devices with high durability can be obtained where these use hydrophobic moisture resistant matrices. Again it is preferred to use a TPU3 which has similar mechanical properties when compared to TPU1 or TPU2. Mechanical properties similarity mainly refers to a modulus value of the polymers which needs to be within a factor of 2 of the different layers in the temperature of interest and particularly at room temperature (25° C.). One may also measure the mechanical properties of the finished material with fillers and similarly match their mechanical properties. The mechanical properties of the thick layers (for those layers where the thickness is greater than about 1 micron and preferably greater than about 10 microns) can be tailored in another way to have low interfacial stress. They are chosen so that they can have high plastic flow under stress to mitigate bending stresses or their elongation is high without failure compared to the deformation stresses introduced on bending.

Polymer blends with multiple polymers may also be used for the electrolyte layer. One of these polymers may be biodegradable to allow easier degradation of the electrolyte when disposed. The materials that are chosen should have at least one phase (if they are multiphase polymers) that is soluble or compatible with the liquid phase of the electrolyte, which could be the ionic liquid. Further, from a processing perspective, it is preferable that all polymers used are solubilized in the processing solvent or in the mixture of the processing solvent and the liquid phase of the electrolyte. As an example, some of the polymers that can be used with the BMP-NTF liquid phase and are compatible with it are the polyurethanes described above, polyvinylpyrrolidone and polypropylene carbonate. It is preferred that the polymers used are not electroactive (i.e., they are inert) and that the liquid phase of the electrolyte comprise of electroactive materials, if used. In the US patent application 20090078917, the electrolyte comprise of two polymers, one of which is electrochromic (or electroactive, i.e., undergo redox reaction when the device is activated). Since the electrochromic properties of electrochromic materials in the electrolyte comes from their mobility, using an electrochromic polymer places severe restrictions on their mobility and hence device kinetics. Such devices are not useful for displays that need to be powered quickly in less than 30 s, and more preferably in less then 10 s and most preferably in less than 2 s. The disclosure in this referenced patent application also comprises of polymers that are hydrophilic and meant for lamination with rigid substrates, however, their use in printed or flexible devices leads to poor device storage characteristics.

The encapsulation layer does not have to be opaque, this can also be a radiation or thermally cured polyurethane. In case this choice is exercised it is preferred that the ISO and the CE be similar to the underlying TPU2. Thermally crosslinkable polyurethanes have a crosslinker present in the formulation (isocyanate or polyol) with a functionality greater than 2. For those that are crosslinked by radiation, low molecular weight urethane prepolymers are formed which are terminated by acrylates or methacrylates and mixed with various UV sensitizers and absorbers. When subjected to radiation, the acrylic groups form links by addition polymerization.

In the description of the device in FIG. 3, it was mentioned that the electrolyte layer could be patterned so that the image looks sharp and that the rest of the area is filled in by a color matched inert material. This inert material can be formulated from TPU2, so that the electrolytic components do not migrate from the patterned electrolyte layer to the adjacent inert layer.

Thus, by engineering the correct TPU chemistry it is possible to develop matrices for various layers, e.g., electrolyte, conductive layers (made by filling the polymer with conductive particles), and insulating layers using various TPU chemistries. These materials can be processed from different solvents so that there is no interaction during processing and electrolytic components can be prevented from migrating between layers, have good adhesion between the layers, and have similar mechanical properties so that in bending extra interlayer stress is not introduced. The modulus and the soaking capacity of the TPU (where FD is compatible with the electrolytic components) can be tailored for a given ISO, CE and FD by changing the proportion of CE to FD (as both are polyols) while still maintaining a stoichiometric balance with the ISO, and also by changing the molecular weight of the FD while keeping the same chemistry. A preferred ratio for CE:FD for urethanes to be used in printed and/or flexible displays is generally between 1:1 to 1:3, and a preferred molecular weight of the FD is between 600 to 10,000.

A non exhaustive list of aliphatic isocyanates is 1,6-hexamethylene diisocyanate (HDI), 1-isocyanato-3-isocyanatomethyl-3,5,5-trimethyl-cyclohexane (isophorone diisocyanate, IPDI), and 4,4'-diisocyanato dicyclohexylmethane (H12MDI) cyclohexane diisocyanate (CHDI), tetramethyl-xylene diisocyanate (TMXDI), and 1,3-bis(isocyanatomethyl)cyclohexane (H6XDI). As many of these isocyanates are toxic when inhaled, these are converted to larger molecules, such as biurets, dimers, and trimers, etc., and then used to make the urethanes. Although aromatic isocyanates are not preferred due to their poor UV and electrochemical stability, they may be used in some layers (such as insulators and encapsulants) with appropriate UV additives. Some aromatic isocyanates are toluene diisocyanate (TDI), diphenylmethane diisocyanate (MDI), p-phenylene diisocyante (PPDI), naphthalene diisocyanate (NDI), and o-tolidine diisocyanate (TODI). Some of the popular hydrophobic polyols for FD that are based on ethers are propylene oxide polyol, polybutyleneoxide polyol, and poly(tetramethylene ether) polyol. Ester based polyols for this purpose are too numerous to list as these are made by reacting a number of diacids and diols. Some of these diacids are adipic, glutaric, pentaoic and azeloic acids and some of the diols are ethylene glycol, diethylene glycol, propylene glycol, tetramethylene glycol and neopentyl glycol. Polycaprolactone diols are also popular for good hydrolytic stability. Some of the other polyols for FD are polycarbonate polyols and polybutadiene polyols. Some of the chain extenders are ethylene glycol, propylene glycol, triethylene glycol, tetraethylene glycol, propylene glycol, dipropylene glycol, tripropylene glycol, 1,3-propanediol, 1,3-butanediol, 1,4-butanediol, neopentyl glycol, 1,6-hexanedioletanolamine, diethanolamine, methyldiethanolamine and phenyldiethanolamine. Some of the higher functionality polyols (greater than 2 from crosslinking) are glycerol, trimethylolpropane, 1,2,6-hexanetriol, triethanolamine, pentaerythritol, N,N,N',N'-tetrakis (2-hydroxypropyl) ethylenediamine, diethyltoluenediamine, dimethylthiotoluenediamine. Some of these polyols may also be replaced by polyols from renewable sources such as soyabeans and castor oils. These polyols are available in a wide variety of functionalities and characteristics. Dow Chemical Company (Midland, Mich.) amongst many others produces polyols from renewable sources. Although in most cases preformed urethanes with the above components are used for the various layers, if these are to be formed, then some of the preferred catalysts are organometallic compounds based on, tin (dibutyltin dilaurate), bismuth (bismuth octanoate), and zinc. It is always preferred to use catalysts in the lowest concentrations particularly for TPU1 as these may show electrochemical interference. A preferred range is about or below 1% of the polymer and more preferably below 0.1%. For more information on reactivity, concentrations and sources of materials and prepolymers reference standard books (e.g., Szycher's Handbook of Polyurethanes by M. Szycher, CRC Press, N Y, 1999) or literature from the materials manufacturers can be used.

Conductive paste can be made by adding conductive carbon black (usually about 15-25%), dispersant or surfactant (<0.1%)), and a thixotrope such as fumed silica (~2%) to the polymer. These are mixed along with a solvent in a high shear mixer at our laboratory to get a uniform paste. One may also add conductive carbon nanotubes along with the conductive carbon black or just use the nanotubes. As an example, Cabot Corporation in Billerica, Mass. is a supplier of conductive carbon blacks, and Nanocyl in Belgium is a supplier of single and multiwalled carbon nanotubes. The carbon blacks and the carbon nanotubes may be surface treated to increase compatibility with the urethane. These companies offer several choices of surface treatments, some of which are amines and carboxyl groups. Typical concentrations of carbon nanotubes are 1-3% and of carbon particulates about 20% to get the conductivity properties in a range of 80 to 150 ohms/square in a thickness of about 25 µm.

Some of the preferred solvents for forming processable pastes and solutions are diethylene glycol monoethyl ether acetate, diacetone alcohol, dimethyl sulfoxide, 2-butoxyethyl acetate, 1-chloro-4-trifluoromethylbenzene, ethyl lactate) and d-limonene, dibasic ester (includes all compositions available from Invista Inc, Wilmington, Del.), tripropylene glycol methyl ether, butyl acetate and propyl acetate or their mixtures.

For completely printable EC devices there are several variations that can be adopted as has been discussed in various device constructions. Some of the interesting ones are described below. Many of these use one EC layer that also serves as the electrolyte. Some of the EC layers are not electrochemical, but their chromogenic properties are activated by the application of electric field. For electrochemical electrochromic devices, the electrochromic layer may comprise of additional layers, e.g., an electrolyte layer which is mainly used for ion conduction and one or two redox layers (i.e., those layers that undergo oxidation and reduction and may also be electrochromic). If these layers are used in addition to the electrolyte layer these are simply inserted as additional layers by introducing additional processing steps before depositing the electrolyte layer and after it is deposited. Any of these layers may be patterned even though it is not mentioned.

Patterning is only mentioned for those layers where a pattern is a must. If a substrate is used with a preprinted transparent or another conductor then the first step of printing the conductive layer can be eliminated. Optional layer(s) are indicated, as sometimes the previous layer can provide a dual functionality, e.g., a layer can act as an electrode and as an encapsulation layer. If a porous substrate is used (e.g., porous fabric or a porous paper), then it may need an optional blocking layer to block the pores, unless the first functional layer going on this also blocks the pores. Back and front refers to the layer sequencing as they appear from the viewing direction. The drying or curing steps between each layer is needed and assumed and is not mentioned below in the various print sequences. Some examples of print sequences for printable devices with an electrolyte and the EC layer combined in a single layer are given below. In the examples below it is assumed that when one starts with a transparent substrate as the first layer then the device is viewed through this substrate, and when an opaque substrate is used then it is viewed from the top. The substrate or the other coatings may also be given an optional surface treatment to enhance the wettability and the adhesion of the next layer. Some of these treatments are corona discharge, flame and plasma treatment (e.g., see processes and equipment from Lectro Engineering, St. Louis, Mo.). Another surface treatment uses UV-ozone, e.g., OAI Inc (San Jose, Calif.) supplies equipment and processes for such a treatment.

Printable device 1 on a transparent substrate: (a) print transparent conductor, (b) print EC layer, (c) print back electrode and (d) print optional encapsulation layer.

Printable device 2 on a transparent substrate: (a) print transparent conductor, (b) print patterned insulator, (c) print EC layer, (d) print back electrode and (e) print optional encapsulation layer.

Printable device 3 on a transparent substrate: (a) print transparent conductor, (b) print patterned insulator, (c) print EC layer, (d) print patterned insulator (e) print back electrode and (f) print optional encapsulation layer.

Printable device 4 on a transparent substrate: (a) print transparent conductor, (b) print EC layer, (c) print patterned insulator (d) print back electrode and (e) print optional encapsulation layer.

Printable device 5 on an opaque substrate: (a) print back conductor, (b) print EC layer, (c) print transparent electrode and (d) print optional encapsulation layer.

Printable device 6 on a opaque substrate: (a) print back conductor, (b) print EC layer, (c) print patterned insulator (d) print front transparent electrode and (e) print optional encapsulation layer.

Printable device 7 on an opaque substrate: (a) print back conductor, (b) print patterned insulator, (c) print EC layer, (d) print patterned insulator (e) print transparent electrode and (f) print optional encapsulation layer.

Printable device 8 on an opaque substrate: (a) print back conductor, (b) print EC layer, (c) print patterned insulator (d) print transparent electrode and (e) print optional encapsulation layer.

In all of these devices, there is a common thread, which is that the electrolyte layer which is also the electrochromic layer is printed i.e., it is printable on electrodes and in addition, the other layers including electrodes can be printed on this electrolyte or the electrochromic layer. This allows one to form devices with opposing electrodes on different planes rather than being only printable when an interdigited device with both electrodes on the same plane is made. Interdigited devices have limitations in terms of the types of displays and the information that can be displayed. An important reason in the past for making interdigited electrode has been the difficulty in depositing the top electrode on top of the electrolyte layer. However, this invention discloses solid electrolytes that have good mechanical properties, form good adhesion and can be formulated with electrolytic components as processable materials. This allows other layers to be printed on such layers. Further, the processability of the electrolytic or the EC layer is not different from the processability of the other layers with similar viscosity. This is not true for the other EC devices in the market today that use the opposing electrodes in a different plane. These devices require sandwiching of the electrochromic and/or the electrolyte layer in between two distinct substrates, even though these are called printable devices because some of the layers are printed, but the final assembly then requires lamination. Field devices such as liquid crystal and electrophoretic devices either require an electrochromic layer to be fabricated with high precision which is then laminated, or require special lines to process displays where the material is embedded between two substrates. This leads to expensive manufacturing due to the need for bringing electrodes from both substrates into a common plane to interface with the electronics, and also the need for edge sealing. In other EC devices either the electrolytes or the EC layers are gelatinous or have properties that they also require a lamination with another substrate, even though the specific layers are printable (e.g., see PCT application WO09000547 and U.S. Pat. No. 6,879, 424). The mechanical properties of the electrolyte layer are often poor and to keep the device intact, edge sealing is needed. The devices of this invention can be made so that all layers are assembled by a sequential printing process using continuous standard equipment (roll to roll or on discrete substrates, rigid or flexible substrates). Further, since hydrophobic materials are used in the electrolyte and/or the electrochromic layers, these do not require expensive containment in an inert atmosphere during processing. The selection of the material for the electrolyte (or ion conduction layer) is the key in being able to print this layer and be able to print other layers on top of it. Some EC devices may comprise redox layers in addition to the electrolyte layer (or ion conduction layer) and electronically conductive electrodes, which can all be printed sequentially to make a completely printable device without the use of a lamination step. Printing processes are those that are commonly used by the industry including offset lithography, engraving, ink-jet, thermography, printing with molten liquids (including laser printing that uses solid toner that is fused on to the substrate by heating), reprographics, digital printing, letterpress flexography, gravure and pad printing. There may be other methods employed which are extensions and modifications and combinations of these. In addition, the different layers of a device may use the same or different printing methods or heads on a device manufacturing line.

Example 1

TABLE 1

Electrolyte formulation

| Material | Quantity |
|---|---|
| BMP-NTF | 1.5 ml |
| SOLEF 21216/1001 | 0.20 g |
| SOLEF 11008/1001 | 0.17 g |
| Acetone | 4 ml |
| $TiO_2$ (TiPure DuPont R960W28) | 0.4 g |
| 2,2'-Bithiophene | 0.166 g |
| Diethylviologen NTF | 0.158 g |

The electrolyte was prepared by adding the two fluorinated polymers (Solefpolymers from Solvay Solexis, Thorofare, N.J.) to a sure seal bottle fitted with stir bar. To this was added the acetone (ACS grade) and the bottle sealed and stirred rapidly at room temperature for approximately two hours until a slightly hazy clear mixture was obtained. The ionic liquid (NTF salt of 1-butyl-3-methyl-pyrrolidium, also called BMP-NTF) addition was then followed by 2-2'bithiophene. The solution was stirred for approximately 30 minutes and then the viologen added. The mixture was stirred for 15 minutes and then the $TiO_2$ added and again stirred for 15 minutes. If the stirring is stopped the $TiO_2$ powder settles to the bottom of the flask and can be redispersed by stirring. Thixotropic additives such as fumed silica may be also added.

The electrolyte was spin coated onto half wave ITO at 400 rpm for 60 seconds and then at 1000 rpm for 60 seconds. This resulted in an off white thin film approximately 11 microns thick. The electrolyte coated ITO substrate was left to solidify at room temperature under slight vacuum (4" Hg) for 2 hours (solidification occurred by crystallization of the Solef polymers). Then a second ITO substrate was placed on top of the electrolyte and the two substrates held together with binder clips. The cell was activated at 2.0 volts and immediately went from white to a dark blue color and when shorted turn pink-brown in color. The blue color faded with time, and pink-brown color was permanent due to the formation of a polymeric film at the anode. The color coordinates (X,Y,Z) of the cell at various stages is given below (measured at an incident angle of 10 degrees)

TABLE 2

| Sample State | X | Y | Z |
|---|---|---|---|
| Clear | 50.4 | 54.1 | 52.2 |
| Shorted (immediately) | 10.8 | 10.5 | 10.5 |
| Steady state | 29.7 | 26.0 | 15.5 |

Example 2

TABLE 3

Electrolyte formulation

| Material | Quantity |
|---|---|
| BMP-NTF | 1.5 ml |
| SOLEF 21216/1001 | 0.274 g |
| SOLEF 11008/1001 | 0.17 g |
| Acetone | 4.8 ml |
| $TiO_2$ (TiPure DuPont R960W28) | 0.8 g |
| 3,4 Dimethoxythiophene | 0.144 g |
| Diethylviologen NTF | 0.155 g |

The above electrolyte was prepared using the same ionic liquid as in Example 1. A coating was deposited using a doctor blade in a thickness of about 80 microns (wet thickness) on an ITO coated glass substrate. After drying at room temperature for about 5 minutes it was subjected to vacuum for a similar period for further drying. A gold coated polyester film about 10 microns in thickness (14 ohms/square and visible transmission of 74%) was placed on its back and pressed to form the other electrode. After 2V was applied for 10 seconds followed by shorting of the two electrodes for about a second, the device turned deep blue, and after the color of the viologen faded away, the film that formed was light blue in color.

Example 3

TABLE 4

Electrolyte formulation

| Material | Quantity |
|---|---|
| BMP-NTF | 1.5 ml |
| SOLEF 21216/1001 | 0.444 g |
| Acetone | 4 ml |
| $TiO_2$ (TiPure DuPont R960W28) | 0.8 g |
| 2,2'-Bithiophene | 0.166 g |
| Diethylviologen NTF | 0.155 g |

The above electrolyte was prepared using the same ionic liquid as in Example 1. A coating was deposited using a doctor blade in a thickness of about 80 microns (wet thickness) on an ITO coated glass substrate. After drying at room temperature for about 5 minutes it was subjected to vacuum for a similar period for further drying. A gold coated polyester (14 ohms/square and visible transmission of 74%) film was placed on its back and pressed to form the other electrode. The thickness of the gold film was ten microns. 2V was applied for 10 seconds and then shorted for a second, the device turned the same color as in example 1, and after the color of the viologen faded away, the film that formed was similar to the one in Example 1 in color.

TABLE 5

Electrolyte formulation

| Material | Quantity |
|---|---|
| BMP-NTF | 1.5 ml |
| SOLEF 21216/1001 | 0.444 g |
| Dimethylformamide | 4.8 ml |
| $TiO_2$ (TiPure DuPont R960W28) | 0.8 g |

TABLE 5-continued

Electrolyte formulation

| Material | Quantity |
|---|---|
| 2,2'-Bithiophene | 0.166 g |
| Diethylviologen NTF | 0.155 g |

The above electrolyte was prepared using the same ionic liquid as in Example 1. A coating was deposited using a doctor blade in a thickness of about 80 microns (wet thickness) on an ITO coated glass substrate (about 15 ohms/square). After drying in an oven at 90° C. for 15 minutes, the coating was subjected to a vacuum for 5 minutes to remove the solvent. A gold coated polyester (14 ohms/square and visible transmission of 74%) was placed on its back and pressed to form the other electrode. 2V was applied for 10 seconds and then the electrodes were shorted, the device turned the same color as in example 1, and after the color of the viologen faded away, the film that formed was similar to the one in Example 1 in color.

Example 5

TABLE 6

Electrolyte formulation

| Material | Quantity |
|---|---|
| BMP-NTF | 1.5 ml |
| SOLEF 21216/1001 | 0.444 g |
| Acetone | 4.8 ml |
| $TiO_2$ (TiPure DuPont R960W28) | 0.8 g |
| 2,3'-Bithiophene | 0.166 g |
| 3,4 Dimethoxythiophene | 0.144 |
| Dimethylviologen NTF | 0.155 g |

The above electrolyte was prepared using the same ionic liquid as in Example 1. The electrolyte coating was deposited using a doctor blade in a thickness of about 80 microns (wet thickness) on an ITO coated glass substrate (about 15 ohms/square). After drying in an oven at 90° C. for 15 minutes, the coating was subjected to a vacuum for 5 minutes to remove the solvent. A gold coated polyester (14 ohms/square and visible transmission of 74%) was placed on its back and pressed to form the other electrode. 2.5V was applied for 5 seconds and then shorted for a few seconds, the device initially appeared green, however when the viologen color faded away in a few minutes only yellow color remained.

Example 6

TABLE 7

Electrolyte formulation

| Material | Quantity |
|---|---|
| BMP-NTF | 1.5 ml |
| SOLEF 21216/1001 | 0.444 g |
| Acetone | 4.8 ml |
| $TiO_2$ (TiPure DuPont R960W28) | 0.8 g |
| 3,4 Ethylenedioxythiophene | 0.142 |
| Diethylviologen NTF | 0.155 g |

The above electrolyte was prepared using the same ionic liquid as in Example 1. The electrolyte coating was deposited using a doctor blade in a thickness of about 80 microns (wet thickness) on an ITO coated glass substrate (about 15 ohms/square). After drying in an oven at 90° C. for 15 minutes, the coating was subjected to a vacuum for 5 minutes to remove the solvent. A gold coated polyester (14 ohms/square and visible transmission of 74%) was placed on its back and pressed to form the other electrode. 2.5V was applied for 5 seconds and then shorted for a few seconds, once the viologen color faded away in a few minutes only blue color remained.

Example 7

A display device was prepared where one REDOX couple was a solid thin film of poly(3,4-ethylenedioxythiophenepolystyrenesulfonate) (PEDOT) and the other a solution of the monomer 2,2'-bithiophene.

The device was composed of two electrodes of 12'Ω/sq ITO on glass. One electrode was coated with a coating of 3,4-PEDOT by spin depositing at 500 rpm from a solution of "Baytron P" supplied by H. C. Starck Inc, Newton, Mass. After deposition, the coating was dried at 130° C. for 15 minutes and had a thickness of 285 nm. This electrode had a slight blue tint. The electrolyte was prepared by dissolving 0.5 molar 2,2'-bithiophene in 1-butyl-1-methylpyrrolidium bis(trifluoromethylsulfonyl)imide. This electrolyte was placed between the "Baytron P" coated electrode which formed the anode and an ITO coated electrode which formed the cathode. The electrolyte thickness or cell gap was 75 μm. The cell was powered by applying a known potential across the cell (negative to the "Baytron P" electrode) and by shorting the electrodes. This cell had three states. The first state with a clear state of 75% transmission at 650 nm when no power is applied, the second state is when power is applied and the 2,2'-biothophene monomer polymerized at the cathode forming a coating and the PEDOT was reduced giving a blue color, the third state was when the cell was shorted (the opposing electrodes are shorted) the PEDOT oxidized and the polythiophene coating (reduced) to give a cell with an orange brown color. After the cell was taken through the three stages described above, the cell after having been shorted was subjected to 2V, with the PEDOT side of the electrode being negative. The active area of the cell was 1.1 square inches and the time to change transmission from 73 to 55% T was 0.4 seconds. Then the cell was again shorted and then varying potentials in incremental steps were applied as shown Table 1 (PEDOT side being negative). The color and transmission at 650 nm at each step are also shown in this table. This would correspond to stage 2 for each potential, where various stages are described in Example 8.

TABLE 8

% transmission and color of device at different potentials

| Potential (volts) | % Transmission at (650 nm) | Color of display |
|---|---|---|
| 0.0 | 73 | Orange Brown |
| 0.5 | 72 | Orange Brown |
| 1.0 | 66 | Purple/Orange |
| 1.5 | 58 | Blue |
| 2.0 | 55 | Blue |
| 2.4 | 51 | Blue |

Example 8

Figure 11:
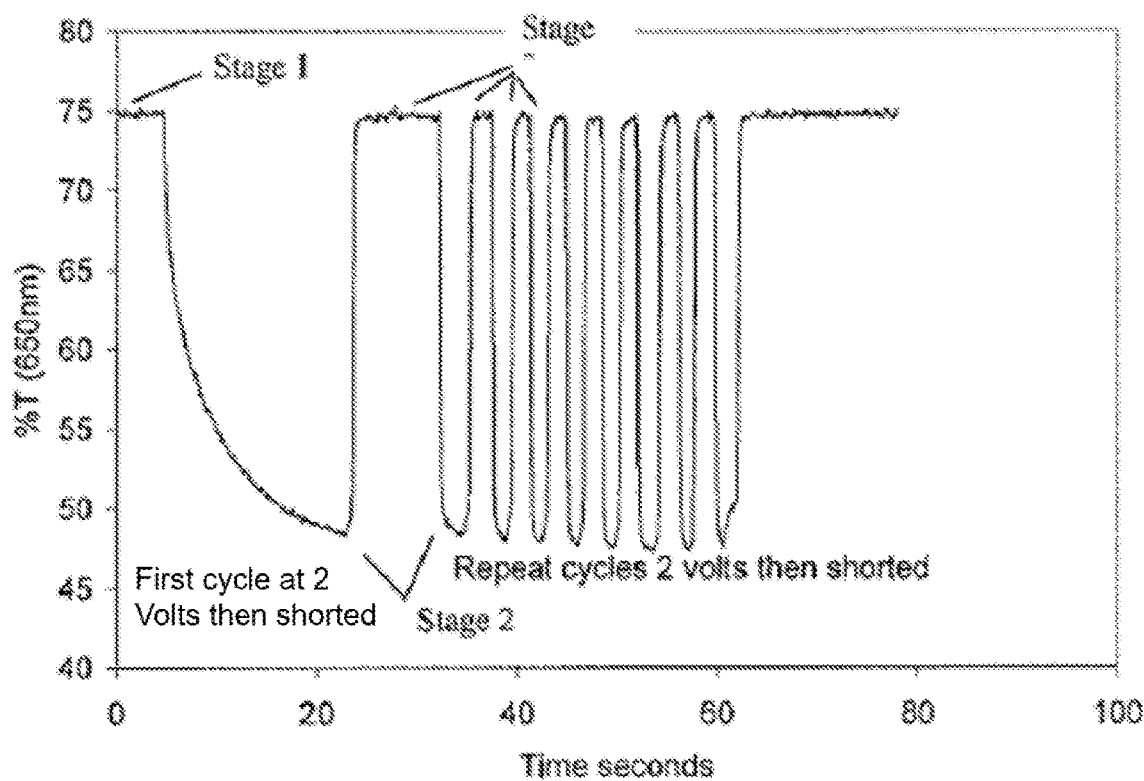
FIG. 11 Shows a transmission change of an EC device when colored and bleached

A transparent cell was prepared exactly as described in Example 7 above with an active area of 1.0 square inches (the active area was almost in a shape of a square). The cell was first activated at 2.0 volts for 20 seconds (PEDOT side being negative) and then shorted and again activated at 2.0 volts (PEDOT being negative) the kinetic trace for this activation at 650 nm is shown in the FIG. 11. At 650 nm the cell had an initial % T of 75 and applying 2.0 volts for 20 seconds the transmission dropped to 48%. It can be seen that for each activation after the first time, the change is rapid.

The color coordinates of the cell were recorded in the initial stage (stage one) and after applying potential (2.0 volts) stage two (most of the color comes from PEDOT coating) and when shorted stage three (most of the color comes from polybithiophene coating). The data is shown in Table 9.

TABLE 9

Color Coordinates of Display

| Display State | XYZ coordinates at 10° using D65 lamp | | |
|---|---|---|---|
| | X | Y | Z |
| Stage 1 | 74.35 | 80.25 | 83.32 |
| Stage 2, colored 2.0 volts (blue to eye) | 56.47 | 60.98 | 66.99 |
| Stage 3, shorted (red-brown to eye) | 64.75 | 66.63 | 64.84 |

A similar cell was prepared as above, however, the electrolyte was loaded with titanium dioxide powder (Dupont's R960) to make the electrolyte opaque in order to see the reflected coloration on each side without interference from the other side. In the powered state, the PEDOT side was deep blue and the other side was colorless. In the shorted state, the PEDOT side was faint blue, and the other side was red-brown.

Example 9

A cell was prepared as described in example 1 with the exception that a thin film of tungsten oxide ($WO_3$) was used instead of 3,4-polyethylenedioxythiophenepolystyrenesulfonate. The tungsten oxide coating was deposited onto ITO, from a solution of peroxotungstic ester in ethanol, by spin coating at 1000 rpm. The peroxotungstic ester solution was prepared as given in example 1 of U.S. Pat. No. 5,457,218. The coating was cured at 130° C. for 15 minutes and had a thickness of 230 nm. This curing condition was chosen as this may be used to heat treat an ITO coated, heat stabilized polyester film to make this device on plastic substrate. The resulting electrode was colorless.

A cell was prepared using the $WO_3$ electrode as described in example 1 and activated at 2.0 volts with the negative charge to the $WO_3$ electrode and shorted to result in a color change.

The cell was clear after preparation and when activated at 2.0 volts it turned deep blue and when shorted turned purple. The color coordinates of the cell at the different stages is shown in Table 10.

TABLE 10

Color coordinates of tungsten oxide cell with 2,2'-bithiophene in IL

| | XYZ 10°/D65 | | | |
|---|---|---|---|---|
| Comments | X | Y | Z | Color |
| Cell in clear state (as prepared) | 74.61 | 78.62 | 81.08 | Clear and Colorless |
| Cell in blue state ($WO_3$ colored) | 24.44 | 26.12 | 34.25 | Blue |
| Cell in purple state (polymer film deposited) | 21.49 | 20.48 | 28.29 | Purple |

Example 10

A cell was prepared using a transparent electrolyte as described in Example 7 except that a thin film of polyaniline was used as the oxidant. The polyaniline was deposited onto ITO by spin coating at 5000 rpm. The coating solution was composed of 0.6012 g of polyaniline emeraldine base in 20 ml of formic acid. The coating was light blue/green in color. The cell was activated at 2.0 volts such that the polyaniline is reduced and the bithiophene is oxidized. At 550 nm the cell changed color from blue/gray at 2.0 volts to brown/orange when shorted. Going from blue/gray to brown/orange resulted in an optical modulation of 13% T at 550 nm. The time to change color was 0.5 seconds. If instead of a transparent electrolyte an opaque electrolyte (e.g., those comprising titania) is used, only the colors of each electrodes are visible from the side the cell is observed, as would be the case in most display cells.

Example 11: Device Using PEDOT as the Transparent Conductor

A display device was prepared as shown in FIG. 4. The transparent conductor (43 and 40) was a coating of 3,4-polyethylenedioxythiophenepolystyrenesulfonate (Baytron P or PEDOT) supplied by H. C. Starck Inc, Newton, Mass. This was deposited onto a thin polyester substrate (44) by spin coating initially at 200 rpm and then accelerating to 1000 rpm in a period of 30 seconds and then keeping the spin speed to 1000 rpm for 30 seconds. The coating was then heated at 90° C. for 10 minutes. This procedure was repeated once more to give a conductive coating of approximately 1000'Ω/sq. This coating was scribed with a blade down the center to give two distinct conductive regions 43 and 40 on the polyester substrate. The separation between the two conductive regions was approximately 0.04 mm. This substrate was coated using a doctor blade with an electrolyte (42) composed of 0.5M 2,2'-bithiophene, 0.1M diethyl viologen bis(trifluoromethylsulfonyl)imide, 28 wt % 1-butyl-1-methylpyrrolidium bis(trifluoromethylsulfonyl)imide, 6 wt % of a fluorinated copolymer (Solef PVDF 21216 supplied by Solvat Solexis USA) 11 wt % $TiO_2$ particles (Ti-Pure R960 W28 supplied by DuPont USA) and 51 wt % acetone. The deposited electrolyte was dried at room temperature for approximately 15 minutes. This was then covered (41) with a white adhesive backing tape (Venture Tape supplied by Rockland, Mass. USA).

The display was powered by applying two volts across the planar transparent conductors via terminals 45 and 46. This resulted in a well defined red/orange line about 0.1 mm in width down the center of the device (adjacent to the scribed line on the positive side) due to the electrochemical polymerization of 2,2'-bithiophene at the negative electrode.

Simultaneously on the other side (cathode or the negative side) a blue color line was formed due to the reduction of viologen that faded with time, however the orange blue line remained permanently. The formation of temporary blue line provided additional contrast. By switching the potential the width of the red/orange line could be increased due to polymerization of 2,2'-bithiophene on the other side of the scribed line as the above process was repeated in reverse. For a strip (scribe) length of 2.3 cm the polymerization time at 2 volts was between 0.5 and 3 seconds. Once the cell is activated the red/orange strip is permanent and is non reversible. In this example PEDOT may be removed chemically or by abrasion. Also PEDOT may be printed so that the deletion line is part of the print pattern.

Example 12: Device where PEDOT is Used as TC and Redox Couple

A device was prepared as described in example 11 except that the 3,4-polyethylenedioxythiophenepolystyrenesulfonate conductive electrode was also used as the Redox couple for the 2,2'-bithiophene polymerization. In this case the electrolyte was prepared without the addition of diethyl viologen bis(trifluoromethylsulfonyl)imide. At an applied potential of 2.0 volts the 2,2'-bithiophene polymerized on the negative electrode at the junction between the two planar transparent conductors. The time to deposit red/orange polymeric coating was between 5 and 10 seconds.

Example 13: Device where PEDOT is Used as Redox Couple and ITO as TC

A device was prepared as described in example 12 except that the 3,4-polyethylenedioxythiophenepolystyrenesulfonate was deposited on to polyester coated with ITO with a sheet resistance of 50'S/sq. For this device the role of 3,4-polyethylenedioxythiophenepolystyrenesulfonate (PEDOT) was to act as a Redox couple to the polymerization of 2,2'-bithiophene and not a transparent conductor. When 2.0V volts were applied to this device the polymerization was within 0.5 to 3 seconds with a well defined red/orange strip down the center of the device.

Examples 14

Device without PEDOT and Using ITO as TC

A device was prepared as described in example 11 where 50'Ω/sq. ITO on polyester film was used as the transparent conductor instead of 3,4-polyethylenedioxythiophenepolystyrenesulfonate (PEDOT). The device was activated at 2.4 volts for 5 seconds and had a peak current of 94 µA to color a line which was 2.3 cm long (or 4 mA/cm² based on the colored area). The peak current decreased to about 80% of its peak value in about 5 seconds. It was also observed that with increasing powering time, the width of the colored regions increased (almost 1 mm wide polymerized thiophene in 60 seconds). This electrolyte had high conductivity, and in some cases even if the width of the etched line was 1 cm wide, both side of the etched regions colored rapidly (one side permanently due to 2,2'-bithiophene and the other side temporarily due to viologen).

Example 15: Information Printed Using Insulating Material

A device was prepared where the transparent conductors were 125/sq. ITO on glass. On the first substrate with ITO coating (the cathode) numbers and letters were placed by a contact adhesive method in order to mask the conductive areas. These letters and numbers along with the adhesive were electrically insulating.

An electrolyte was prepared consisting of 0.5M 2,2'-bithiophene, 0.1M diethyl viologen bis(trifluoromethylsulfonyl)imide, 1-butyl-1-methylpyrrolidium bis(trifluoromethylsulfonyl)imide and 16.5 wt % TiO2. Then a second ITO conductive glass substrate was placed on top of the electrolyte in order to sandwich the electrolyte between the two conductive sides. The electrolyte thickness was 75 µm. The letters and numbers (masked areas on the first ITO) were not visible as one looked into the sample through the second substrate. This means that in the off state the device was white with no visible numbers or letters. A potential of 2.0 volts was applied across the cell such that the cathode was the ITO electrode with the numbers and letters. On application of the potential within 0.5 to 3 seconds the device turned from white to an orange/red background with the numbers and letters appearing in contrasting white, i.e., the electrolyte in these areas did not change color. A similar device was made where the letters were printed using a laser printer using a black toner on the ITO coated polyester thus masking the ITO locally. This device functioned in the same fashion.

Example 16: Writing Letters with Electrochemically Active Material

A device was prepared where the transparent conductors were 12'Ω/sq. ITO on glass. On first ITO surface (the cathode) letters were painted using a solution of 3,4-polyethylenedioxythiophenepolystyrenesulfonate (Baytron P or PEDOT) supplied by H. C. Starck Inc, Newton, Mass. An electrolyte was made using 0.5M 2,2'-bithiophene in 1-butyl-1-methylpyrrolidium bis(trifluoromethylsulfonyl)imide and 16.5 wt % TiO2. For this device the printed 3,4-polyethylenedioxythiophenepolystyrenesulfonate on the cathode electrode acts as a redox couple to the polymerization of 2,2'-bithiophene at the anode. The electrolyte was deposited on the first electrode and then a second ITO coated substrate was lowered to sandwich the electrolyte which had a thickness of 75 µm. In the off state the device was white with no visible letters, when viewed from the second substrate. On application of a potential of 2.0 volts immediately (within 0.5 to 3 seconds) the device turned color with the letters appearing as orange/red. The letters only appeared in the regions of the anode which were directly above the printed 3,4-polyethylenedioxythiophenepolystyrenesulfonate letters.

Example 17: Example of a Reversible Display

A display device was prepared using 50'Ω/sq. ITO on polyester. Using a blade a ridge was cut down the center of the substrate isolating the conductive ITO into two planar electrodes. The ridge was approximately 30 µm wide and 2.5 cm long. An electrolyte was prepared which was composed of an electrochromic bridged dye and had the following composition; 28 wt % 1-butyl-1-methylpyrrolidium bis(trifluoromethylsulfonyl)imide, 0.5M of bridged dye, i.e., 1-(4 ferrocenylbutyl)-1'-methyl-4,4' bipyridinium 1,1,1-trifluoro-N-[(trifluoromethyl)sulfonyl]methanesulfonamide] salt, 6 wt % of a fluorinated copolymer (Solef PVDF 21216 supplied by Solvay Solexis USA), 11 wt % TiO₂ particles (Ti-Pure R960 W28 supplied by DuPont USA) and 51 wt % acetone. The electrolyte was coated on the ITO scribed substrate using a doctor blade and dried at room temperature. The device was powered by applying 2.0 volts across the two planar ITO electrodes. Immediately (1 to 3 seconds) a deep blue line appeared across the scribed line dividing the ITO electrodes. The power was removed and the line remained visible for 60 seconds. This was repeated many times and each time the same performance was seen giving a reversible display. The onset voltage was 0.7 volts.

Example 18: Formation of Characters Using Two Interdigited Electrodes

FIG. 9 shows the schematics of a display formed using interdigited principles. When powered this display will reveal "AJJER". This shows a substrate with a conductive transparent coating, say ITO. All the lines (excepting the hashed lines) are etched. One way to do that is by laser etching and the lines may be about 10 to 100 microns wide. Laser etching can be done by standard procedures by commercial vendors (e.g., Laserod of Torrance Calif.). When the laser etching along the solid lines as shown in this figure are done, the pattern is divided in three regions 90, 91 and 92. One side of all of the letters are contiguously connected to 91 and the other side of the etched letters to 92, which form the two electrodes. The areas 90 are bounded by the contiguous ITO regions 91 and 92 but the physical separation between the two electrodes is much larger then those regions which are only separated by the width of the laser etched lines. To make a device all of this is coated with a layer of the electrolyte leaving small areas of uncoated 91 and 92 (not shown) which can be connected to the powering leads. When the leads are powered, the two sides of the etched ITO start to color along the etched line where the separation between the electrodes is smaller. The boundaries of area 90 do not color as the opposite polarity electrodes are too far apart. If the electrolyte conductivity is high and the boundaries of the large regions also color, one can optimize the electrolyte conductivity so that only the desired areas color. Another method to only color specific areas is to coat part of the device with the electrolyte pattern, and fill in the gaps within this pattern using a color matched non-electrolytic layer. The electrolyte layer will be put down in a pattern so that it touches both the electrodes where they are separated by the narrow distance, and the rest is occupied by the color matched layer. The electrolyte coating over the characters (or narrow lines just touches the inert insulating layers or even slightly overlaps them. This allows the electrolyte continuity to be broken. When the electrolyte composition is as in Example 11 then the display is irreversible due to the polymerization of the thiophene, and if it is similar to Example 17 then it is reversible.

Since the coloration starts at the etched lines and proceeds inwards (meaning towards the region having the transparent conductor) with time, one can control their width with time, i.e., at short powering times, power consumption is less and the line width is also small.

Example 19: Electrolyte with Improved Adhesion

An Electrolyte was prepared as follows in a sure seal bottle. Solef 21216/1001 (1.0 g), a polyvinylidene fluoride polymer, was mixed with polymethylmethacrylate, (mw=15,000) (1.0 g) in 4.8 ml propyl acetate by slowly stirring (max. speed of 280 RPM) on a magnetic stirrer at room temperature for at least 2 hours or until well mixed. Then the following were added: 2.92 ml of the ionic liquid 1-butyl-1-methylpyrrolidinium bis(trifluoromethylsulfonyl)imide (2.92 ml), 0.2M Ferrocene Viologen Imide Dye (0.5680 g) and $TiO_2$ (Ti-pure R960 from Dupont, coated with alumina and silica) (1.8 g). These were mixed in by slowly stirring (max. speed of 280 RPM) on a magnetic stirrer at room temperature for at least 1 hour or until well mixed. Finally, fumed silica (0.2 g) (from Sigma-Aldrich, Milwaukee, Wis., product 38,126-8) was added and the solution was again stirred slowly (max. speed of 280 RPM) on a magnetic stirrer at room temperature for at least 30 minutes or until well mixed. This electrolyte was an opaque, off-white liquid. The viscosity was determined to be 48.5 cP at 27.8° C. using a Brookfield model DV-III+ viscometer with a cone and plate attachment. PMMA is not compatible with the ionic liquid, however, Solef polymer is compatible.

This electrolyte was used to make an EC device using interdigited ITO electrodes as follows. ITO (about 60 ohms/square) was obtained on flexible 250 micron thick polyester (PET). An image of an "X" was formed on the ITO by scoring with a razor blade which cut the ITO coating in four segments without cutting through the substrate. The size of each of the four arms of the "X" was about 1.1 cm. The electrolyte was doctor bladed onto the ITO to give a wet thickness of ~260 µm. This coating was then dried at 50° C. for 15 minutes to give a tacky, off-white coating of ~90 µm thickness. This coating was then covered with white adhesive tape for encapsulation. The cell was powered at 2 volts with each adjacent quadrant being of opposite polarity, and the image of the "X" appeared (along the score lines on the negative side) in about 1 second in a deep blue color. This device was left at room temperature for 72 hours after which no significant change in performance was seen.

Another device was made with the same electrolyte by sandwiching the electrolyte between two conductive ITO coated polyesters with the substrate characteristics described above. The electrolyte was doctor bladed onto the ITO on first substrate to give a wet thickness of ~260 µm. This coating was then dried at 50° C. for 15 minutes to give a tacky, off-white coating of ~90 µm thickness. The electrolyte coating was sprinkled with a small amount of 88 µm spacer beads, was covered with a second piece of ITO on PET, such that the electrodes were slightly offset, and was then pressed together to give a cell that was about 1.25"×1.25". The cell was powered at 2 volts and the negative electrode changed from off-white to deep blue in about 2 seconds. This cell was not encapsulated. It was left at 80° C. for 22 hours and then at 50° C. and 75% relative humidity for 17 hours. After this time, no significant change in performance was noted.

Another device was made using glass substrates coated with ITO (12Ω/□). The electrolyte was doctor bladed onto the ITO to give a wet thickness of ~260 µm. This coating was then dried at 50° C. for 15 minutes to give a tacky, off-white coating of ~90 µm thickness. The electrolyte coating was sprinkled with a small amount of 88 µm spacer beads, was covered with a second piece of ITO on glass and was then pressed together to give a cell that was about ⅞"×⅞". This cell was encapsulated by applying a UV cured acrylic adhesive at the perimeter. The cell was powered at 2 volts and changed from off-white to deep blue in about 2 seconds. It was left at 80° C. for 22 hours and then at 50° C. and 75% relative humidity for 17 hours. After this time, no significant changes in performance or cosmetics were seen.

Example 20: Electrolyte and Devices Incorporating Polyurethane Matrix

A polyurethane comprising electrolyte was prepared as follows in a sure seal bottle. A thermoplastic polyurethane (PUL446-107, from Huntsman Chemical, The Woodlands, Tex.). This urethane is based on an aliphatic isocyanate and a polyether glycol. 0.5 g polyurethane (PU) was dissolved in 6 ml tetrahydrofuran (THF) by stirring on a magnetic stirrer at room temperature for several hours or until well dissolved. Then ionic liquid (IL), 1-butyl-1-methylpyrrolidinium bis(trifluoromethylsulfonyl)imide, (0.73 ml), 0.2M Ferrocene Viologen Imide Dye (0.142 g) and $TiO_2$ (Ti-pure R960 from Dupont,) (0.45 g) were also mixed in by stirring on a magnetic stirrer at room temperature for at least 1 hour or until well mixed. THF solubilizes both the urethane and the electrolytic materials, but the urethane polymer is not compatible with the electrolyte. Finally, fumed silica (0.05 g, same material as in Example 19) was added and the solution was again stirred on a magnetic stirrer at room temperature for at least 30 minutes or until well mixed. This electrolyte was an opaque, off-white liquid. The electrolyte was made into two different electrochromic cells, one with an interdigited structure and the second where the back electrode was a printed carbon electrode.

The interdigited construction is similar to the one described in Example 19. The surface of ITO coated PET was scored using a razor blade in a shape of "X". The ITO was 60Ω/□ on PET. The electrolyte was doctor bladed onto the ITO to give a wet thickness of ~260 μm. This coating was then dried at 50° C. for 15 minutes to give a dry, off-white coating of ~90 μm thickness. This coating was then covered with white adhesive backing tape for encapsulation. The cell was then powered at 2 volts and the image of the "X" was such that it divided the planar ITO into two halves forming an anode and cathode. After one second of applied potential the white surface changed from one with a dark blue "X" image with a white background. Upon shorting the device the dark blue "X" image immediately disappeared to give a white surface. This device was left at 85° C. for 24 hours upon which no significant change in performance was noted.

The electrolyte was made into an EC device by sandwiching the electrolyte between a glass/ITO electrode and an electrode formed by carbon paste. The ITO resistivity was 12Ω/□ on Glass. The electrolyte was doctor bladed onto the ITO to give a wet thickness of ~260 μm. This coating was then dried at 50° C. for 15 minutes to give a dry, off-white coating of ~90 μm thickness. On this electrolyte coating was then doctor bladed a conductive carbon paste (Product #5065) from SPI (West Chester, Pa.) with a wet thickness of ~160 μm as seen through the glass substrate. The cell was then dried at 50° C. for 10 minutes. The cell was powered at 2 volts and changed from off-white to deep blue in about 2 seconds.

Example 21: Electrolyte with Both PU and Acrylic Polymer

A polymer blend electrolyte was prepared as follows in a sure seal bottle. Polyurethane (PUL446-107) (0.4 g) was mixed with 0.1 g polymethylmethacrylate (PMMA, mw=15,000) in 6 ml tetrahydrofuran (THF) by stirring on a magnetic stirrer at room temperature for several hours or until well dissolved. Then ionic liquid (IL), 1-butyl-1-methylpyrrolidinium bis(trifluoromethylsulfonyl)imide (0.73 ml), 0.2M Ferrocene Viologen Imide Dye (0.142 g) and $TiO_2$ (Ti-pure R960 from Dupont) (0.45 g) were also mixed in by stirring on a magnetic stirrer at room temperature for at least 1 hour or until well mixed. In this system the acrylic polymer is not soluble in the ionic liquid. Finally, fumed silica (0.05 g) was added and the solution was again stirred on a magnetic stirrer at room temperature for at least 30 minutes or until well mixed. This electrolyte was an opaque, off-white liquid. The electrolyte was used to make a interdigited electrochromic device as described in Example 20. After drying the electrolyte appeared tacky. The cell when powered at 2 volts displayed a dark blue "X" in about one second with a white background and when shorted immediately bleached to a plain white background.

Example 22: Electrolyte and Devices Incorporating Polyurethane Matrix

A polyurethane electrolyte was prepared as follows in a sure seal bottle. Polyurethane (see Example 20) (0.5 g) was dissolved in 4 ml methyl sulfoxide (99.9% from Sigma Aldrich Chemical CO.) by stirring on a magnetic stirrer at room temperature for several hours or until well dissolved. Then ionic liquid (IL), 1-butyl-1-methylpyrrolidinium bis (trifluoromethylsulfonyl)imide, (0.73 ml), 0.2M Ferrocene Viologen Imide Dye (0.142 g) and $TiO_2$ (Ti-pure R960 from Dupont,) (0.45 g) were also mixed in by stirring on a magnetic stirrer at room temperature for at least 1 hour or until well mixed. Finally, fumed silica (0.05 g) was added and the solution was again stirred on a magnetic stirrer at room temperature for at least 30 minutes or until well mixed. Methyl sulfoxide solubilizes both the urethane and the electrolytic materials, but the urethane polymer is not compatible with the electrolyte.

This electrolyte was an opaque, off-white liquid. The electrolyte as described was made into an electrochromic cell with interdigited electrodes as described in Example 20. Substrates size and conditions were similar to Example 20 unless mentioned differently in the current example. This wet electrolyte coating as deposited was about 260 μm and when dried at 85° C. for 15 minutes it give a dry, off-white coating of ~90 μm thickness. This coating was then covered with white adhesive backing tape for encapsulation. The cell was then powered at 2 volts and a blue image of the X within a second along the scored lines. Upon shorting the device the dark blue X image immediately disappeared to give a white surface. This device was left at 85° C. for 24 hours upon which no significant change in performance was noted. Bleach kinetics of the cell was tested for different color times as shown in the table below. The average peak current was 0.26 mA. The cell was colored at 2.0 volts for 2 and 10 seconds and in shorted mode took 3 and 9 seconds to bleach respectively.

| Color Time (seconds) at 2.0 volts | Bleach time (seconds) in open circuit |
| --- | --- |
| 2 | 7 |
| 4 | 10 |
| 6 | 20 |
| 8 | 27 |
| 10 | 33 |

Example 23: Electrolyte and Devices Incorporating Polyurethane Matrix

A polyurethane comprising electrolyte was prepared as follows in a sure seal bottle. A thermoplastic polyurethane (PUL446-107, from Huntsman Chemical, The Woodlands, Tex.). This urethane is based on an aliphatic isocyanate and a polyether glycol. 0.5 g polyurethane (PU) was dissolved in 4 ml methyl sulfoxide (DMSO) by stirring on a magnetic stirrer at room temperature for several hours or until well dissolved. Then ionic liquid (IL), 1-butyl-1-methylpyrrolidinium bis(trifluoromethylsulfonyl)imide, (0.73 ml), 0.2M Ferrocene Viologen Imide Dye (0.142 g) and $TiO_2$ (Ti-pure R960 from Dupont,) (0.45 g) were also mixed in by stirring on a magnetic stirrer at room temperature for at least 1 hour or until well mixed. Finally, fumed silica (0.05 g, same material as in Example 19) was added and the solution was again stirred on a magnetic stirrer at room temperature for at least 30 minutes or until well mixed. This electrolyte was an opaque, off-white liquid. The electrolyte was made into an electrochromic cell where the back electrode was a printed carbon electrode.

The electrolyte was made into an EC device by sandwiching the electrolyte between two electrodes, one electrode being a piece of glass/ITO and the other formed by conductive carbon paste. The ITO resistivity was 12Ω/□ on Glass. The electrolyte was doctor bladed onto the ITO to give a wet thickness of ~260 μm. This coating was then dried at 100° C. for 15 minutes to give a dry, off-white coating of ~90 μm thickness. On this electrolyte coating was then doctor bladed a conductive carbon paste #8144 from DuPont Electronic Materials (Research Triangle Park, N.C.) with a wet thickness of ~180 μm. The cell was then dried at 110° C. for 15 minutes. The cell was powered at 2 volts and changed from off-white to deep blue in about 2 seconds and reversed when power was removed.

Example 24: Device with Solvent Free Printable Electrolyte

A polyurethane based solid electrochromic layer was prepared from a reactive ink using a prepolymer of aliphatic polyisocyanate (based on hexamethylene diisocyanate) from Bayer MaterialScience LLC with a trade name of Desmodur XP 2617 and a triol namely poly(glycerine/diethylene adipate) glycol with a trade name Diexter-G-1100G-50 from Coim USA Inc, Deptford, N.J. This electrolyte composition did not comprise of any solvent, and comprised of monomers that are reacted or polymerized after processing to yield solid electrolyte. The reactive ink was prepared as follows:

0.5682 g of Diexter-(G-11006-50) was added to a 50 ml plastic beaker and 1.085 g of ionic liquid, 1-butyl-1-methylpyrrolidinium bis(trifluoromethylsulfonyl)imide, added under stirring. To this was added 0.822 g of a ferrocene viologen imide dye and stirred until a complete solution occurred. To this solution was added under an argon atmosphere 0.175 g of Desmodur XP 2617 and the mixture stirred vigorously. Under ambient atmosphere 0.8621 g of $TiO_2$ (Ti-pure R960 from Dupont) was added and the mixture stirred until a white smooth paste formed. To this was added 0.0006 g of the catalyst DABCO MB20 (made by Air Products, Allentown, Pa.) and the mixture stirred vigorously. This resulted in a viscous white paste which was doctor blade onto an ITO/PET flexible substrate and cured at 110° C. for 15 minutes. This resulted in a solid white layer with good adhesion to the underlying substrate. A top electrode was formed on this electrochromic layer using printable conductive carbon black paste from DuPont Electronic Materials (#8144 Carbon Paste) with a wet thickness of ~180 μm and dried at 110° C. for 15 minutes. In this case instead of a pattern the carbon ink was deposited in a solid area of about 2×2 cm. Then the active area (with electrolyte and/or the carbon paste was encapsulated using a pressure sensitive tape with a metalized backing (in this case it had aluminum foil backing with an insulating pressure sensitive adhesive). The cell was powered at 1.2 volts and changed from white to deep blue in about 2 seconds. The durability of the cell was tested at 75° C. for four days without any change in the devices electrochromic performance or appearance. Another cell was made using the same materials and procedures, however, before the electrolyte deposition; a clear insulating coating of a UV curable layer was deposited on the ITO leaving areas (characters, numerals and pattern) that were not covered by this insulating layer. The electrolyte and then the carbon electrode were uniformly deposited over the substrate. When the device was powered, only those areas or pattern colored where the ITO was not masked by the clear insulating coating.

Example 25: Device with Solvent Free Printable Electrolyte

A reactive polyurethane ink was prepared as described in Example 24 above except that the uncured ink was deposited by a doctor blade onto an ITO/PET substrate and a second substrate with conductive pattern (in this case it was non-patterned ITO/PET substrate in a size of about 2×2 cm) placed on top such that both substrates sandwiched the ink layer with both ITO coatings touching the ink. In this configuration the ink was cured at 110° C. for 15 minutes. After curing, the edges of the device were encapsulated using a pressure sensitive tape with polyimide backing around all four sides. The device was activated at 1.2 volts and resulted in the white solid electrolyte layer changing uniformly to a deep blue layer (the negatively powered electrode) in about 2 seconds. When the electrodes were shorted or left in open circuit mode the electrolyte layer returned to a white color. The durability of the cell was tested at 75° C. for four days without any change in the devices electrochromic performance or appearance. Another cell was made using the same materials and procedures, however, before the electrolyte deposition; a clear insulating coating of a UV curable layer was deposited on the ITO leaving areas (characters, numerals and pattern) that were not covered by this insulating layer. The electrolyte was deposited on the patterned substrate and then laminated by conductive ITO coated polyester. When the device was powered (negative on the ITO electrode where insulating pattern was deposited), only those areas or pattern colored to blue where the ITO was not masked by the clear insulating coating. When the reverse potential was used to color the device (i.e. negative on the non-patterned ITO electrode), the pattern from the back electrode appeared in color on the front electrode (which was not patterned). In another device the reactive electrolyte was deposited and partially cured on the bottom electrode before it was laminated with the top electrode. Yet in another process variation an electrolyte layer was deposited and cured on the bottom electrode. Another layer of electrolyte was deposited on top of the cured electrolyte layer, cured partially and then laminated with the top electrode. All of theses devices functioned well when powered.

Example 26: Example of a Printable Device

A paste for depositing an electrolyte coating was prepared with the following composition: 1 g PU L446-107 polyurethane; 8 ml methyl sulfoxide+(with 0.1 wt % Novec FC4432 Fluorosurfactant from 3M, St. Paul, Minn.); 1.168 ml IL (1-butyl-1-methylpyrrolidinium bis(trifluoromethylsulfonyl)imide); (0.13M) 0.1477 g ferrocene viologen imide dye; 1 g TiO2; 0.48 g fumed silica, hygroscopic. The polymer was first dissolved in methyl sulfoxide, and then after adding the other ingredients, all of these were mixed for several hours using a mechanical mixer until a smooth paste was formed.

A flexible film of polyester was obtained with an ITO coating so that all of the other layers for the device can be printed. First the above paste was screen printed onto the ITO with a 140 mesh screen to give a dry thickness of ~16 μm electrolyte coating when dried at 110° C. for 15 minutes. This electrolyte coating (with electrochromic properties) was then covered with a screen printed layer of conductive carbon paste #8144 from Dupont to give a dry thickness of ~17 μm when dried at 110° C. for 15 minutes. The cell was powered at 2 volts with ITO being negative, and the cell colored blue as observed through the polyester.

Example 27: Example of a Printable Device with One Redox Layer

A paste was prepared with the following composition: 2 g PU L446-107 polyurethane; 8 ml methyl sulfoxide; 2.92 ml IL (1-butyl-1-methylpyrrolidinium bis(trifluoromethylsulfonyl)imide; 0.3124 g ferrocene viologen imide dye; 0.0328 g Novec FC4432 Fluorosurfactant from 3M; 2.5 g $TiO_2$; 1.2 g fumed silica, hygroscopic This paste was doctor bladed onto a piece of polyester/ITO at a wet thickness of ~150 μm and was then dried at 110° C. for 15 minutes to form an electrolyte layer. This electrolyte coating was further coated with a layer of Baytron P PEDOT solution (from HC Starck) by spin coating at a spin speed of 650 RPM. The PEDOT coating was light blue in color and was uniform and smooth. This coating was then dried at 110° C. for 15 minutes. The polyester/ITO/electrolyte/PEDOT cell was powered at 1.2 volts (ITO being negative) by touching the back of the PEDOT coating with a sharp conductive pin. The device colored blue (as observed through the polyester), but only where the pin was touching the PEDOT coating. The PEDOT coating was then covered with a piece of conductive carbon tape, which stuck very well to the PEDOT. The cell was again powered at 1.2 volts and the cell completely colored blue this time.

Example 28: Solid Electrolyte Composed of Polymer Blends

An electrolyte was prepared by first dissolving 0.34 g of polyurethane (PUL446-107) and 0.10 g of polyvinylpyrrolidone (PVP, average molecular weight 10,000) in 1.9 ml of dimethylsulfoxide (DMSO). This mixture was heated to 110° C. while stirring for one hour to form a complete solution. The mixture was cooled to room temperature and 1 ml of ionic liquid [1-butyl-1-methylpyrrolidinium bis (trifluoromethylsulfonyl)imide]added and 0.058 g (0.06M based on ionic liquid) of the bridged dye 1-(4 ferrocenylbutyl)-1'-methyl-4,4'bipyridinium salt with 1,1,1-trifluoro-N-[(trifluoromethyl)sulfonyl]methanesulfonamide]. This was stirred for approximately 30 minutes until a complete solution formed. To this solution was added 0.40 g of titanium dioxide (Ti-pure R960 from Dupont, coated with alumina and silica) and 0.19 g of hygroscopic fumed silica which was mixed thoroughly by hand to form a white viscous paste. The polyurethane polymer used in this example swells in the ionic liquid by gaining 40% weight at room temperature, showing that its one phase is compatible with the ionic liquid, and PVP is soluble in the ionic liquid showing that this is also compatible with the ionic liquid. Further both of these polymers are soluble in the processing solvent DMSO.

The ITO on the PET substrate was scratched using a blade to form a "X" pattern such that four areas were formed which were not electrically connected, these were planar (or interdigited) electrodes. The size of each arm of the "X" was about 1.1 cm. The electrolyte paste was deposited onto 50'Ω/sq. ITO on polyester (ITO/PET) by doctor blade and heated at 120° C. for 15 minutes to form a white dry electrolyte 60 microns. Choosing two opposite electrodes as the anode and two as the cathode 1.8 volts was applied to the cell and immediately the "X" region colored deep blue. When shorted the "X" region immediately bleach back to a white color. At 1.8 volts the peak current was 0.218 mA. The cell was placed in an oven at 85° C. for 144 hours with no change in its cosmetics or electrochromic performance. Another device was made where in the electrolyte PVP was substituted by 0.06 g of polypropylene carbonate (everything else being the same) with a molecular weight of 10,000. This device showed reversible coloration when powered at 1.8V.

Example 29: All Printable Flexible Electrochromic Device

A spin coating solution of CLEVIOS pH 750 (obtained from HC Starck Company) was prepared by adding 0.7 ml of dimethyl sulfoxide (DMSO) and 0.0424 g of the surfactant Triton X to 15 g of CLEVIOS pH 750. The solution was stirred at room temperature for fifteen minutes prior to use. This solution was spin coated onto a rectangular piece of PET (1"×2") at 500 rpm and dried in an oven at 110° C. for fifteen minutes. A printable electrochromic electrolyte was prepared by dissolving 0.5 g of polyurethane (PUL446-107) in 5 ml of tetrahydrofuran at room temperature. The mixture was stirred for 4 hours to insure complete solution. To this solution was added 0.78 ml of ionic liquid (1-butyl-1-methylpyrrolidinium bis(trifluoromethylsulfonyl)imide and 0.098 g (0.13M based on ionic liquid) of the electrochromic bridged dye 1-(4 ferrocenylbutyl)-1'-methyl-4,4'bipyridinium salt with 1,1,1-trifluoro-N-[(trifluoromethyl)sulfonyl]methanesulfonamide] or Fc-Viologen imide dye. To this solution was added 0.40 g of titanium dioxide (Ti-pure R960 from Dupont, coated with alumina and silica) and 0.19 g of hygroscopic fumed silica (obtained from Aldrich Chemical Co, Milwaukee, Wis., product #38-126-8) which was mixed thoroughly for two hours. This electrolyte was deposited by doctor blade on the etched PET substrate pre-coated with conductive CLEVIOS coating. The electrolyte dried at room temperature to give a thickness of 60 microns. The electrolyte was then coated by doctor blade with a carbon paste from DuPont Electronics #8144 and cured at 110° C. for 20 minutes. The electrolyte layer was sandwiched between the Clevios and the carbon black layers. At one edge of the substrate the layer with carbon black and electrolyte was removed to a depth of 4 mm to expose the underlying conductive CLEVIOS layer. A potential of 1.8 volts was applied across this layer and the conductive carbon layer (the polarity at the carbon layer was positive). The cell immediately turned deep blue and when shorted bleached back to a white color. The peak current for coloration was 1.5 $mA/cm^2$.

Example 30: All Printable Flexible Electrochromic Device on Biodegradable Substrate A biodegradable substrate was obtained from McMaster-Carr of Santa-Fe Springs, Calif. as a plate, product #8445

T11. This plate was thick paper like consistency and completely opaque. Conductive carbon paste from DuPont Electronics #8144, was doctor bladed onto a this substrate and was then dried at 110° C. for 15 minutes. This was coated with the electrolyte described in Example 29 above and dried at room temperature for 15 minutes. These layers were then coated with a coating of PEDOT (Baytron P Jet HCV2 from HC Starck Company) by spin coating at 500 rpm. This coating was dried at 110° C. for 15 minutes. At one edge of the substrate the electrolyte and PEDOT layer was removed to a depth of 4 mm to reveal the underlying conductive carbon layer. A potential of 1.8 volts was applied across this layer and the top PEDOT layer. Upon applying the potential (top layer being negative) the cell immediately colored to a deep blue color and when the cell was shorted it immediately bleached back to a white color.

Example 31: All Printable Flexible Electrochromic Device on Biodegradable Substrate A cell was prepared using a biodegradable substrate as described in example 30 above except that the carbon black layer was replaced by CLEVIOS. The CLEVIOS spin coating solution was prepared as described in Example 29 and was spin coated at 500 rpm and dried at 110° C. for 15 minutes. This coating procedure was repeated a second time to obtain sufficient conductivity. To the finished device, when a potential of 1.8 volts was applied across the cell (top layer being negative) it colored within one second to a deep blue color and when shorted immediately bleached to a white color. This procedure of coloration and bleaching could be repeated.

Example 32: All Printable Flexible Electrochromic Device on Biodegradable Plastic Substrate The biodegradable substrate was a translucent polypropylene (PP) film with a biodegradable additive. This film was obtained from Bloomer Plastics Inc, Bloomer, Wis. (product MC200PQ, 200 microns thick). The film surface on one side had a matt finish and the other side had a glossy finish. Two devices were prepared on two different substrates, and in one case the device was formed by depositing the coatings on the glossy side and in the other on the matt side. A spin coating solution of CLEVIOS pH 750 (obtained from HC Starck Company) was prepared by adding 0.7 ml of dimethyl sulfoxide (DMSO) and 0.0424 g of the surfactant Triton X to 15 g of CLEVIOS pH 750. The solution was stirred at room temperature for fifteen minutes prior to use. This solution was spin coated onto a rectangular piece of PP (1"×2") at 500 rpm and dried in an oven at 110° C. for fifteen minutes. This process was repeated to increase the thickness of the first electrode. This coating was then coated over with the electrolyte described in Example 29 above and dried at room temperature for 15 minutes. These layers were then coated with a top electrode coating made out of PEDOT (Baytron P Jet HCV2 from HC Starck Company) by spin coating at 500 rpm. This coating was dried at 110° C. for 15 minutes. A potential of 1.8 volts was applied across the two electrodes and the cell immediately colored a deep blue color and when the cell was shorted it immediately bleached back to a white color. The performance of both the devices was similar.

Display Construction, Integration with Other Elements to Form Tags and Labels and their Applications Inexpensive displays and indicators are required that may be produced for product labels, office product labels, tickets, indicators attached to sensors for food, drugs and biological/medical applications, gift cards from various stores and tags which are disposable or replaced periodically. These displays may be irreversible or only have limited cyclability. Irreversible means that the display or the indicator change the state or show the information when they are activated the first time. This information may fade away after a few seconds or may last a long time giving permanence to the image. Further many of the tags and labels for such uses may not have an onboard power source and thus may have to be activated by power derived from other components located on the same tag or the label. Such power may be derived from a radio frequency coupling of an antenna on the tag, on optical coupling with a source or ambient light using a solar cell, or a sonar source, etc. In all cases an electronic control unit (typically in the form of an integrated chip) is introduced between the display and the power source to verify the source of activation, use a logic to arrive at a decision if the display needs to be powered, and condition the signal to appropriately power the display to show the desired information. The power to activate the display is limited when the power is derived from the wireless signal. When radio frequency electronic chips are used to further power another component (e.g., a display) it is also called radio frequency activation. Examples of these applications and some of the devices suggested for these may be found in U.S. Pat. No. 7,286,061 (conditional access for antitheft of optical media) and patent applications UA20080111675 (observable properties triggered upon interrogation of RFIDs for tracking systems); UA20080100455 (a tag with an antenna and a chip showing a persistent image after interrogation for inventory control); UA20080170287 (a security device to provide a visual alert); UA20070114621 (wirelessly powered flexible tag); UA20070114365 (antitheft optical shutter activated by RF); PCT applications WO08022972 (EC indicator for product authentication) and WO08022966 (EC indicator). This invention discloses methods and ways on how such display/tags may be configured to realize applications discussed in the above applications.

The displays may be made in any way using any specific technology, however, EC displays, and particularly those formed by printing technology are preferred. Further, EC devices are able to react at low potentials (typically less than 3V) which means that these may be powered directly from the low voltage output available from a variety of chips, solar cells, batteries and capacitors. Those batteries are preferred that are environmentally friendly, and more so for disposable products. For this reason alkaline or zinc air batteries are preferred. An advantage of EC displays is the ability to use batteries that output 1.6V and lower. When the power is from RF, then it needs to be rectified, as EC displays are DC devices. The rectification is built within the intervening electronics between the display and the antenna. As discussed below this can be the part of the chip or it may be a discrete element. In addition, these displays are preferably produced by a printing process to improve the economic viability.

Figure 12:
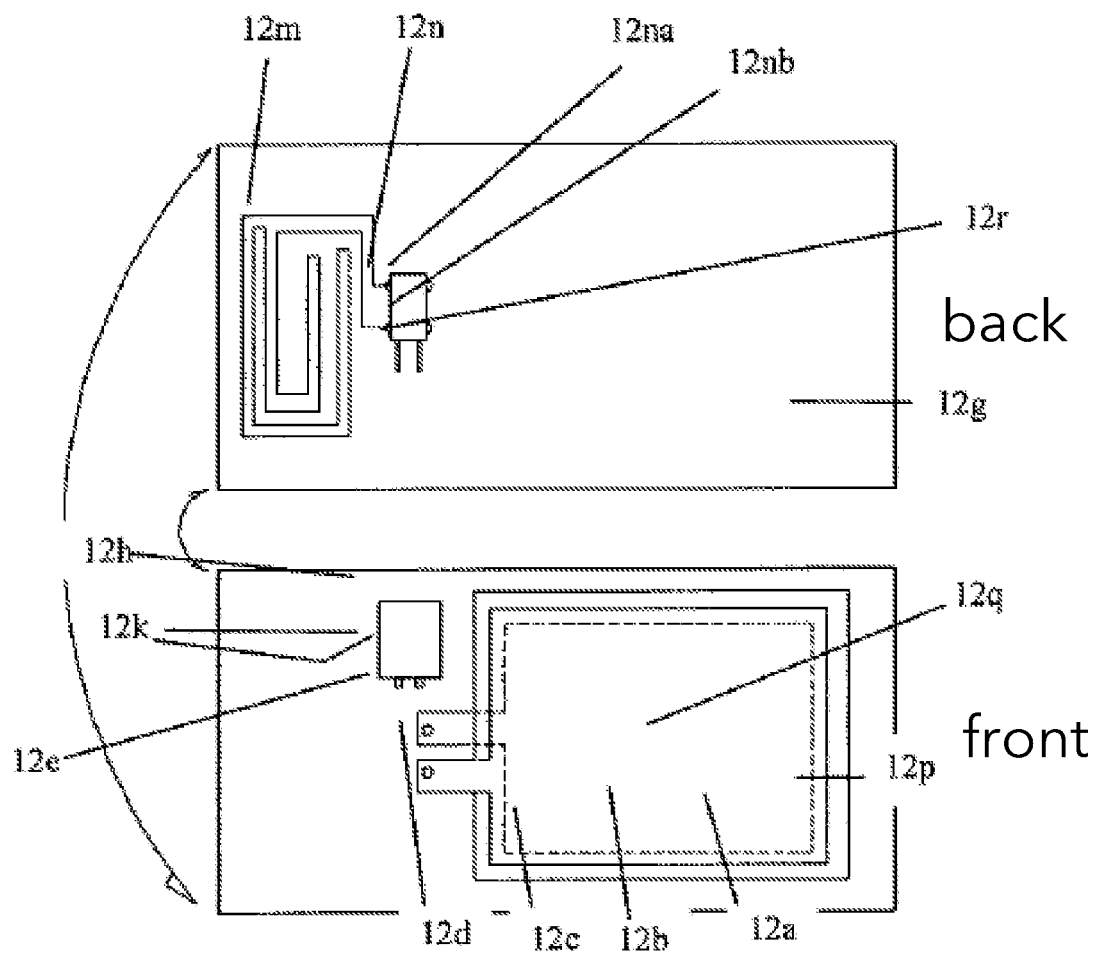
FIG. 12 Shows schematics of layout of a display and other components on a tag or a label.

The preferred display systems to be used for tags, product labels, payment cards, tickets, store gift cards, inventory control or to convey alerts, product authentication, etc., combine a display and a wireless communication system. For practical applications it is preferred to construct these as shown in FIG. 12. This figure shows the front (viewable side) and back of a label or a tag. This is formed preferably on an opaque substrate 12p (may be a plastic or a paper). The front side shows a display 12q which may be electrochromic and formed by sequential deposition of a bottom electrode 12b, an electrolyte 12c and the top electrode 12a. Either of the two electrodes may be patterned (not shown) or the bottom electrode may even comprise of active pixels, so that when the display is powered characters appear or only parts color. The top electrode is a transparent conductor. The display is powered by connecting the two electrodes 12d and 12e to a power source or a driver. Depending on the display complexity and pixels, there may be several leads that will be connected to the driver, which may be a different chip and also connected to chip 12n. However, use of additional chips decrease the economic viability for some applications. In this case it is connected through vias in the substrate to 12na and 12nb pads of the chip 12n which is located on the back side (the chip may be located on the front side, and then connected to the antenna on the back side). It is advantageous to locate the antenna on the rear so that the front part of the tag may be used for other visual information. The description of using front and back also includes situations where one may print or place an antenna and then deposit one or more layers or coatings to mask the antenna and then print or attach other visual information and the display on the other side of these layer(s) or coating(s). The display and the antenna are similarly connected either through vias in the coating or by going around its edges. Further, the display may be energized by the power generated by the antenna once the chip confirms via the wireless communication (as discussed later) that the display needs to be energized. As an option, the chip may also be connected through the pads 12r through the vias to a solar cell 12h located on the front side via the terminals 12k. This solar cell may provide additional power. As an alternate, the solar cell may be replaced by a capacitor or a thin film battery, and these may be located either on the front or the back of the label. Any of the components, i.e., solar cell, chip, antenna display and the interconnects may be formed by printing technology or one may pre-form these and then assemble them on a common substrate. For example PolyIC (Furth, Germany) is able to print transistors and other circuitry, whereas Nanosolar (San Jose, Calif.) and Konarka Technologies (Lowell, Mass.) have demonstrated printed solar cells. Similarly, printed batteries are available from a number of sources, such as from Solicore Inc (Lakeland, Fla.), Blue Spark Technologies (Westlake, Ohio) and Power Paper Ltd (Einat, Israel). For EC displays typically a preferred output voltage range is from about 1 to 3V. The charge capacity of this will vary depending on the display size, power consumption and the number of cycles that need to be powered. Since most of the displays for labels and tags will be powered rapidly from within a few seconds to some taking a few minutes or so. A battery with a charge exceeding 20 mA-min for every square cm of display would be sufficient for a one time display. Further, this may be a secondary battery that may be charged from the solar cell and/or the power derived from the periodic coupling of the onboard antenna to an emitter. If a sensor (not shown) is integrated with the display system this can be connected to the chip 12n using additional input/outputs from the chip (not shown), so that when the sensed output signal reaches a certain threshold, the display can be activated. In addition, the power to the sensor may be provided by additional leads (not shown) from the power source 12h or this may be provided through its connectivity to the controller 12n which receives the power from 12 h.

In order to keep the costs low, preferred printable batteries are formed out of zinc manganese dioxide or carbon zinc technology. These are low cost materials and can be formulated into inks to be printed by screen printing process or other printing methods. To retain a long term permanence, those solar cells and batteries are preferred that comprise of ionic liquids in their electrolyte layer. Ionic liquid provides more permanency or durability to the device as the liquid phase is not readily lost to the atmosphere due to their low vapor pressure. Printable batteries using ionic liquids have been disclosed on paper (see Pushpraj, V. L., et al, *Flexible energy storage devices based on nanocomposite paper*, Proceedings of the National Academy of Sciences, vol 104 (34), p-13574 to 13577 (2007)), similarly, ionic liquid eutectics are being increasingly used in the solar cells (Michael Grätzel et al.; "*Stable, High-Efficiency Ionic-Liquid-Based Mesoscopic Dye-Sensitized Solar Cells*"; Small 2007, 3, No. 12, 2094-2102). Batteries and solar cells may be printed on line where the displays are produced so that all of these may be printed on the same substrate, or the other components can be prepared elsewhere and are integrated to the substrate with the display. The display substrate may be preprinted with the conductive lines where the other printed components are placed (like a sticker) to align with the conductive pads and lines so that electrical connections are formed. All of these can then be protected by a layer of a curing resin that is deposited, a thermoplastic resin or by a lamination process to another film or substrate.

Figure 13:
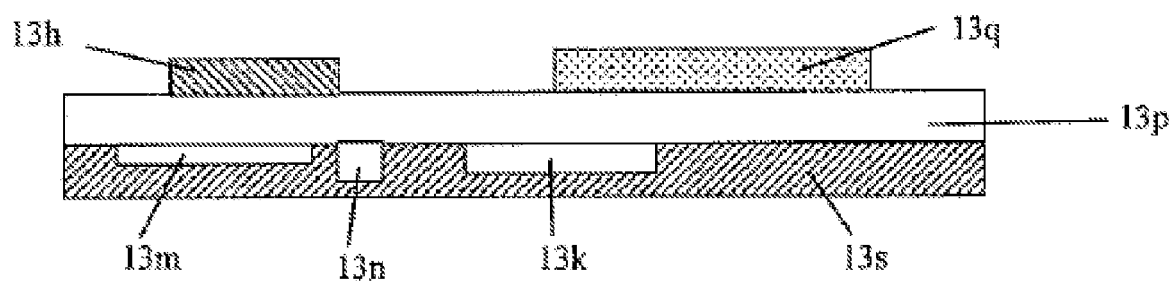
FIG. 13 Shows cross-section of a display that may be used as a label or a tag.

A cross-sectional view of the tag or the label described above (FIG. 12) is shown in FIG. 13. The substrate 13p is shown with the optional solar cell (13h) and a display (13q) on one side and the antenna (13m), optional battery 13k and the controller chip 13n on the other side. The connections between these elements are not shown. The connectors are made by conductive lines on the same plane, conductive vias through the substrate, or by providing conductive paths around the substrate edges. There is an adhesive layer 13s which is used to stick this label to a product package. Typically the antenna is not visible and may be quite large occupying the entire back side. There may be other printed information on the label (not shown) which is always visible. One may protect the display with an optional layer or a coating (e.g., UV cured coating) on the top which protects all the elements. One may also make a tag from this which has no adhesive backing. One may also laminate additional layers either on the back or front for hiding some of the elements or protecting them and then applying an adhesive layer if necessary to bond this to the product or product package.

Figure 14:
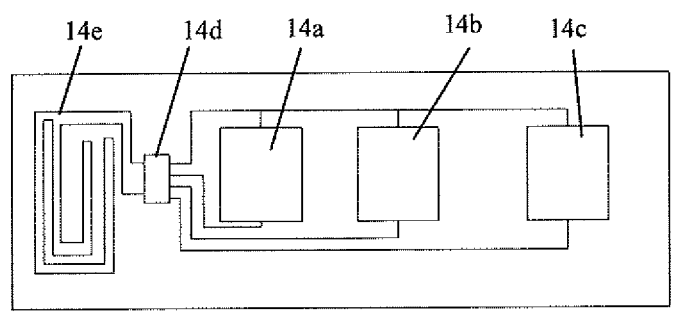
FIG. 14: Shows a schematics of a label or a tag that uses several indicators.

Such tags and displays have many applications. For example, a label may be applied to a product that has an expiration date. For example, a wireless system in the store may broadcast and communicate with the product tag once a day. During that communication, it checks for the information stored on the chip (in the tag) before instructing the chip to power the display element, and if the product has expired or is close to its expiration date, it energizes the display and changes the color of the pixel or displays new information. This provides a visual cue to the store owner to remove this or for customers to visually identify the product if that has been put on sale. As an alternative, for expired products the label may change color or display information when it is scanned at the checkout counter. As shown in FIG. 14, several indicators or displays (14a, 14b and 14c) may be placed on one tag or a label, and each may be energized for different reasons. One scheme of connecting several displays on the same tag is to one chip (14d) and one antenna (14e) is shown in FIG. 14. To maintain concept clarity all of these have been shown on the same side. One may use multiple chips and antennae on the same label. Some of these may correspond to different activation schemes, e.g., one or some may be activated by the store system, and the others by customer using wireless devices such as a cell phone using "near field communication" (NFC) to confirm certain product characteristics. Other wireless technologies, such as Bluetooth, may also be used. Sometimes more than one technology may be used on the same label, e.g., to communicate longer distances using blue tooth and shorter distances by NFC.

Figure 15:
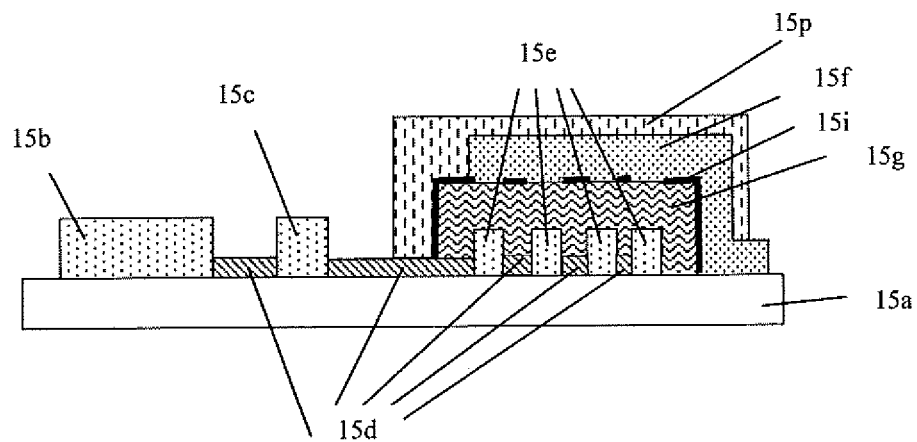
FIG. 15: Shows cross-section of a display that may be used as a label or a tag.
Figure 16:
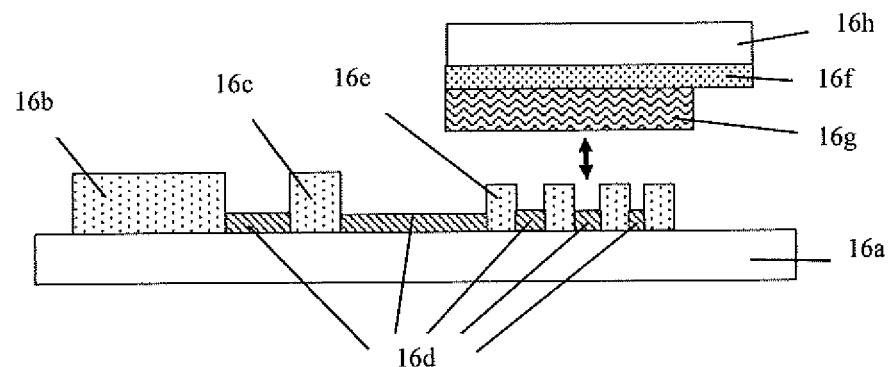
FIG. 16: Shows cross-section of a display that may be used as a label or a tag.

FIG. 15 shows another variation to assemble electrochromic displays. A substrate 15a (paper, plastic, metal, etc.) is prepared with an antenna 15b, a wireless chip (e.g., an RF chip) 15c, and one set of electrodes (back electrodes when opaque substrates are used). The patterned back electrodes are shown as 15e. These are connected to the chip using connectors (15d) also deposited on the same substrate. 15d may be optionally isolated from coming in contact with the electrolyte 15g by depositing an insulating layer (not shown). All these components may be prepared discretely and then assembled, or preferably printed on the substrate (e.g., as by PolyIC or technology from Kovio). The layer of EC electrolyte 15g is deposited (e.g. printed), followed on the patterned back electrode by a transparent conductor 15f, e.g. using intrinsically conductive material such as PEDOT or a polymer filled with particulate conductors as discussed before. If upon application of power, the electrochromic materials color near the top transparent electrode (as opposed to the bottom) then the pattern from the bottom electrode may bleed. This means the coloring EC material may spread at the top conductor and the edges may appear fuzzy. One way to overcome this is to coat the top electrode in a pattern that is aligned with the bottom electrode pattern. Another preferred way is to coat or print the top of the electrolyte with a patterned transparent electrically insulating material (shown optionally as 15i) leaving non-coated areas that are aligned with the bottom electrode pattern. The transparent conductor is then deposited uniformly on top of the patterned insulator. These layers or stack may be further encapsulated optionally by printing or coating another resin (shown as 15p). In a reverse build one can start with a substrate coated with conductive transparent conductor and then coat this layer with a patterned insulating layer (e.g., UV or thermal cured) not covering those areas where the electrolyte would color, then coating it with the electrolyte followed by a patterned conductive coating (typically opaque such as carbon black, or carbon layer followed by a more conductive layer). This coating is aligned with the patterned insulting layer deposited earlier and then coated with an encapsulation layer as long as the access to the tabs or lines to connect to the bottom and the top electrodes is still available. As mentioned earlier, solar cells, batteries or other components may also be added. The back electrode may be conductors for passive displays or these may be pixels for active matrix display electrodes. As discussed earlier if active matrix is used, then it is important for the display to have a voltage threshold (unless the connections to the pixels are masked by an insulating layer) so that upon activation only the area above the pixels is activated. The figure shows that the pixels are connected to each other; however, these are usually connected to the chip. There may be more than one chip, e.g., a chip connected to the antenna which may provide logic and memory for say authentication, and then this powers another chip that drives the display i.e., the display pixels. In this figure no patterning is shown for the electrolyte and the top conductor, but that may also be changed. As an example, if a colored display is needed, one may print the electrolyte in a way so that it is localized on top of every pixel (though it is desired that these touch each other, or any space between is filled with any one of these or an inert electrolyte, i.e. electrolyte without redox materials), and further, one may use a set of every pixel with material that upon activation will change to red, blue or green colors or any other required color set. In addition this also shows that the top conductor is brought in the same plane as the substrate so that it is easy to connect that to the chip (the connection between the chip and the top conductor is not shown to convey the principles in a simple way). A slight variation of this concept is shown in FIG. 16. Here as before the substrate 16a with the antenna 16b, chip 16c and the pixels 16e all connected by connectors shown collectively as 16d are laminated to another substrate 16h that is produced separately with a conductor 16f and the EC electrolyte 16g. 16d may be optionally isolated from coming in contact with the electrolyte 16g by depositing an insulating layer (not shown). The conductor 16f may be bonded to form a conductive path with pads on the substrate 16a (not shown) to form the circuitry in the same plane. As an example, substrate 16a may be opaque (paper, metal foil, or an opaque plastic), where as 16f and 16h are transparent. Not shown in this picture is a optional patterned transparent insulating layer to control bleeding. Further all of these layers may be encapsulated by another layer of polymeric material if desired. Several other methods may be used to make these displays using electronics on a back plane. For example U.S. Pat. No. 7,443,571 describes a process where an electrooptic medium is pre-formed between conductive substrates along with an adhesive and a release layer. This medium is then assembled on to the back plane by removing the release layer and then adhered on to the back plane. This may be done on a continuous web process. This patent and its teachings are incorporated herein in entirety. For EC devices the electrolyte (usually the electrooptic medium itself) needs to adhere to the back plane as it needs to touch the conductive electrode. Thus if an EC medium is deposited on a substrate (typically transparent conductor coated polymeric film) along with a release layer, then it can be assembled using principles as described in the above patent but without using a distinctive adhesive layer. The electrolyte itself may be tacky or polymerizable after assembly. Further if the EC device is interdigited type then a top conducting electrode is not required, i.e., the electrolyte can be directly deposited on to a polymeric film and protected with a release layer, and at the time of assembly on to the back plane, the release layer is removed and the electrolyte contacted with the conductive pixels on the back plane.

FIGS. 14 and 15 show that the opposing electrodes are in different planes, However, using the concepts described in FIG. 9, one may place all electrodes in the same plane, thus eliminating the need of an electrode on a different substrate or even bringing down the top electrode to a common plane to connect to the other elements of the system.

Although it is preferred that these tags be made by printing all components in a single process line, in reality an integrative approach is preferred by some. This is because different companies are going to focus on different components (e.g., electronic chips, power sources, power harvester, displays, antennas, etc), and also some of the materials for these components may have to be handled in controlled atmospheres and may require processing conditions/equipment which may interfere with processing of other materials. Further, in some modules the precision required may be so high that specialized equipment may be required which can push the capital cost of the entire line at the label integrator's facility. In one preferred approach the manufacturer of these labels and tags prints standard materials and integrates other components that are produced by other suppliers or on a different line and are provided on a roll or a sheet form which can be assembled in an automatic equipment. As an example, the integrator starts with a roll of a plastic material, paper or any desired stock "tag material", and prints conductive lines that will be used to electrically connect all the electronic modules. In addition the integrator may also print pictures, text, opaque layers and other information, and also laminate and apply adhesives that are needed on the tag to complete the product. The electronic modules comprising of a display, battery, solar cell, power harvester, antenna and the electronics may be bought from other suppliers on a roll or sheets with a release layer which are then bonded and the electrical connections formed using electrically conductive adhesives. All or some of these components may have been produced by printing and are assembled on to the tag as if laying down stickers. Since there may be several closely spaced lines to be connected to different parts of the component, in this case it is preferred that the bond to the lines be made by "Z" conductive adhesive (ZCA) or also called anisotropic conductive adhesive which is formed by dispersing isolated conductive particles in an adhesive so that they can couple with conductive substrates through their thickness but not laterally. This material may be used only in selective area of the component or all over its bonding area. When the component is bonded to the tag material, then it is placed in a fashion so that the ZCA lines up with the desired conductive lines so that the component is in communion with the system. ZCA allows an electrically conductive bond to be formed between the component and the conductive lines or pads formed on the tag material. This adhesive may be thermoplastic adhesive or a thermoset adhesive. The thermoset adhesive may be cured by heat or UV. This may be a pressure sensitive adhesive (e.g., pre-applied to the component), or it may be dispensed on the tag by the integrator during the process. Some sources of ZCAs are Molex® from Molex Switch Products (Lisle, Ill.), Loctite® products 3441 and 3446 from Henkel (Rocky Hill, Conn.), Adhesive Transfer Tape 9703 and 9705 from 3M (St. Paul, Minn.), adhesives from Creative Materials (Tyngsboro, Mass.) which may be supplied in sheet forms or can be partially cured (B-staged) on the components and then fully cured after assembly. Use of ZCA is important only when there are closely spaced lines which the printer or integrators equipment is not able to address individually due to the lack of precision. This precision will vary from one printer to next. If for a given purpose the printer can handle the precision then isotropic adhesives may be used, or these may be used for some connections and ZCA for the others in the same product.

Figure 17:
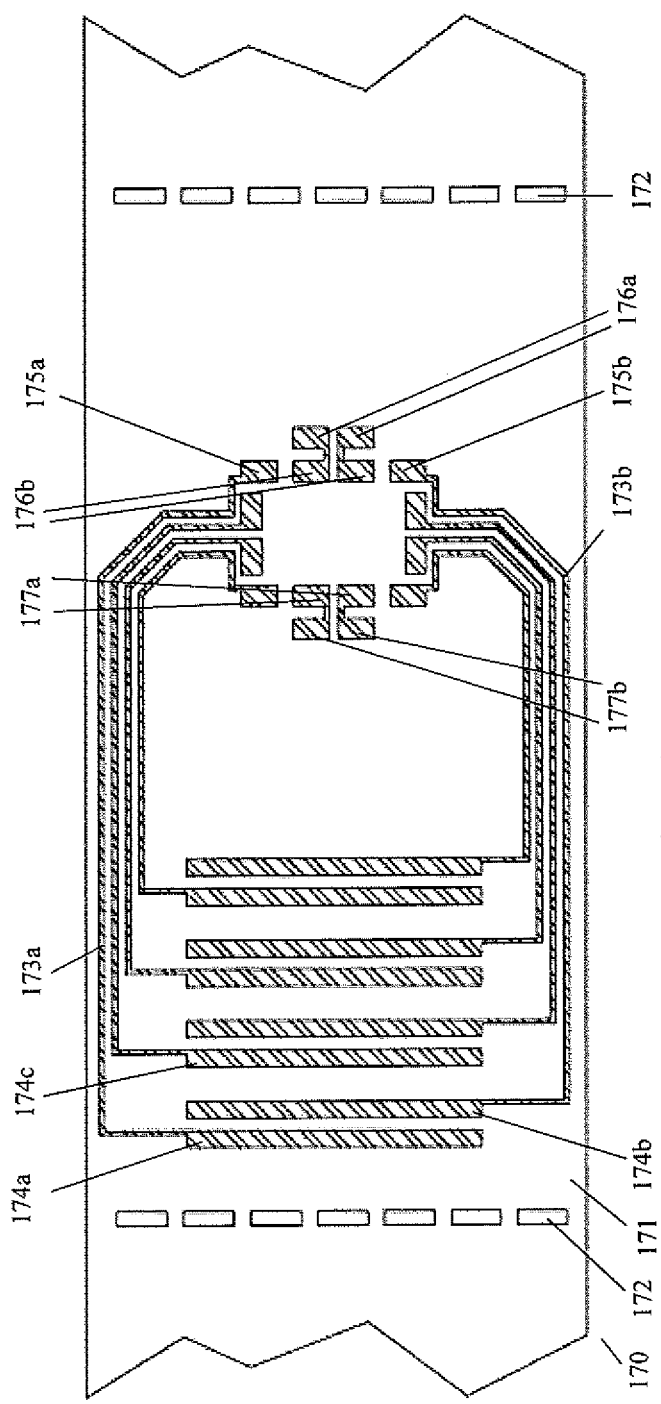
FIG. 17: Schematics of electrodes for electrooptic device and connections scheme to various tag components on a substrate.

FIG. 17 shows the salient features of one of the preferred methods to form these tags or labels using a roll to roll process. The tags shown in this specific example are based on interdigited electrode design and this tag will be formed by printing all the conductive paths, printing EC electrolyte and then assembling the other components. When finished the display can be viewed through the transparent or translucent substrate 171. 170 shows a tag that is part of a roll comprised of a transparent substrate 171. The tags are separated by perforations (172) along which these could be cut or torn later so as to physically separate these. These perforations may also be formed after the complete tag is formed. The display area is shown by four pair of electrodes, where one pair comprising electrodes 174a and 174b is labeled. When the display is powered these electrodes power in opposite polarity, which causes the electrochromic material adjacent to one or both of these electrodes to color. If all the electrodes of this display are powered four or seven sets of lines will be formed depending on the distance between each set of electrodes. For example electrode 17b can be opposite polarity for both 174a, and 174c. As discussed earlier (FIG. 9), one may also form the alphabets using these principles. Also one may form a matrix of pixels where each pixel is independently controlled to display any desired information. These may be active or passive matrices. The passive electrodes in the display area of this example are formed using a transparent conductor. These transparent conductors could be printed or formed by uniformly coating the substrate and then selectively removing the coating to generate the desired pattern. Typical resistivity of the transparent conductors is about 50 to 2000 ohms/square. The lines connecting to these electrodes shown by 173a and 173b may be formed of the same material or preferably from a material of high conductivity (to reduce power loss, resistance typically less then about 10 ohms/sq and preferably less than 0.1 ohms/square)) even if these are opaque, such as inks comprised of metal large or nano particles. The same opaque inks are also used to form the pad areas such as 175a (four of these only one labeled for clarity), 175b (four of these only one labeled for clarity), 176a, 176b, 177a and 177b. These pads are made so that they have large projected areas with generous separation. This is because the label manufacturers usually do not have access to equipment to place components with high precision. Typically, one should preferably design for tolerances of about ±50 μm, and more preferably greater than ±200 μm in order to make them more process friendly for the label manufacturers. Some of the printable carbon based opaque inks that can be used to form the lines and pads in this device or even back electrodes in any of the devices can be obtained from Creative Materials as products 102-05F, 112-15, 101-59, 118-43, 113-37, 110-03, 118-09 A/B, 105-43, 117-48 and 11841 that range in conductivity from about 0.01 ohms/square/mil to about 0.020 ohms/square/mil. Examples of carbon based inks from the same company are 104-18, 112-48, 108-46, 116-19, 110-04 and 119-28 with conductivity of about 20 to 75 ohms/square/mil. Similar materials may also be available from several other companies. One may use only silver inks to get high conductivity paths or electrodes or carbon if the conductivity is acceptable. In case one needs a high conductivity path, but lower electrochemical or chemical interaction with the electrolyte, one may use composite electrodes, i.e., the carbon electrodes touching the electrolyte or the reactive electrode and the silver in contact with the carbon. The thickness of these may be from about 2 to 125 microns when dried or cured.

Figure 18:
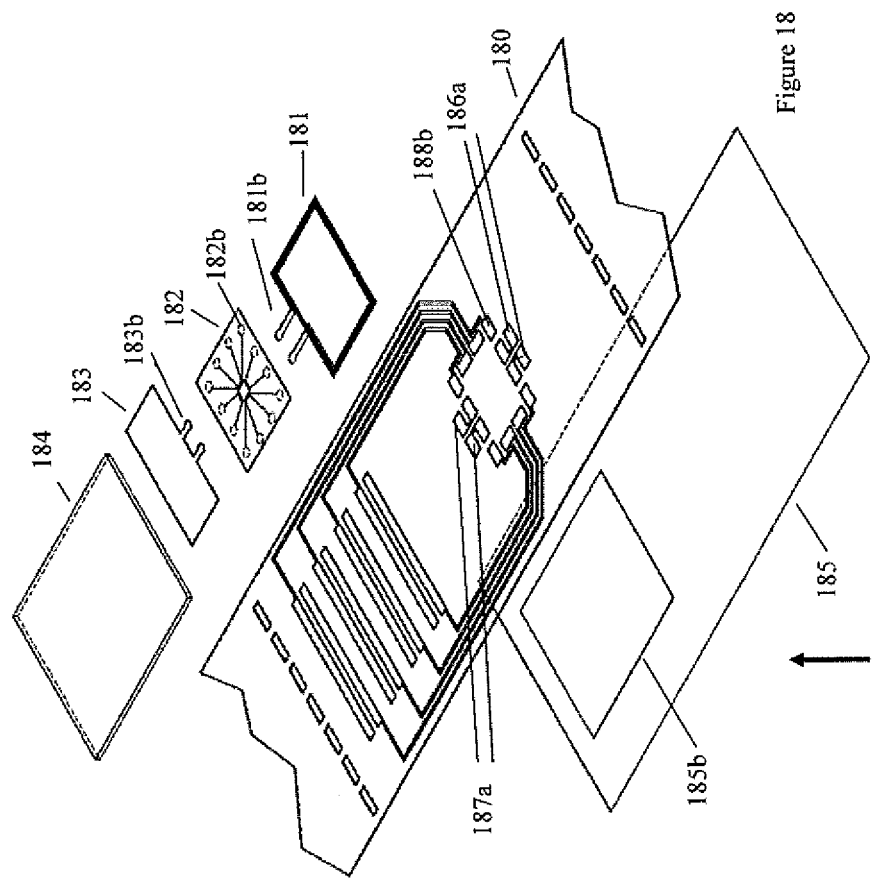
FIG. 18: Schematics of integration of various components on the tag substrate shown in FIG. 17.
Figure 19:
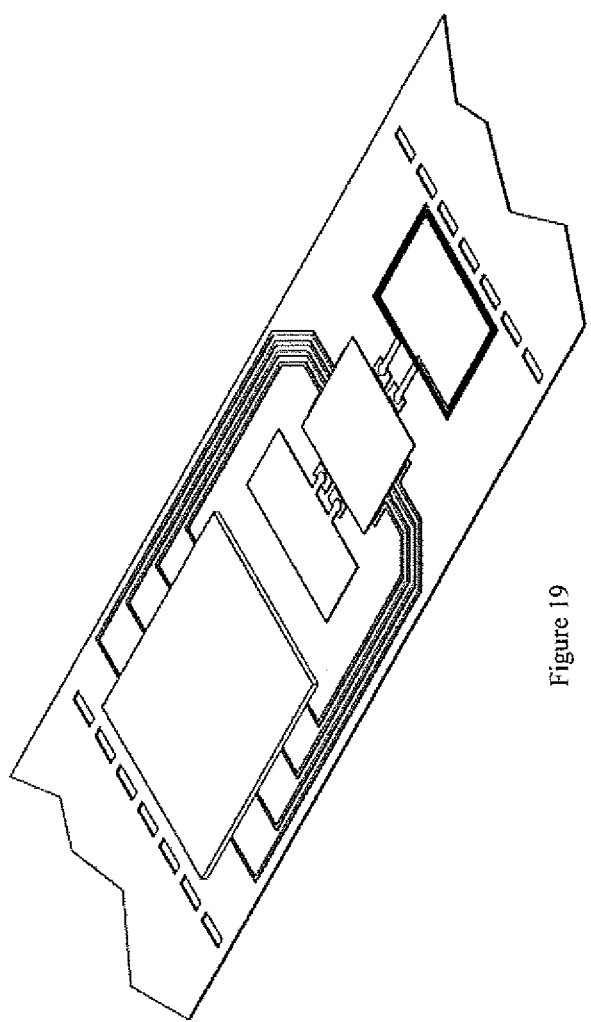
FIG. 19: Schematics of various components on the tag substrate shown in FIG. 18.
Figure 20A:
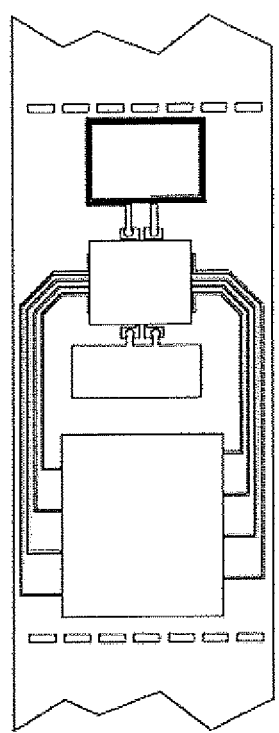
FIG. 20a: Schematics of various components on the tag substrate shown in FIG. 18, top view.
Figure 20B:
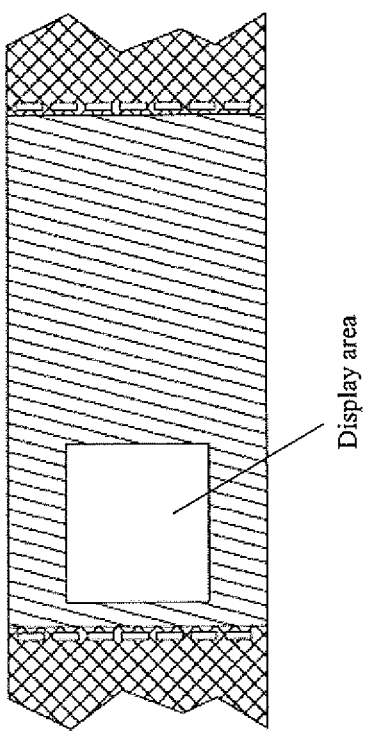
FIG. 20b: Schematics of various components on the tag substrate shown in FIG. 18, bottom view.

FIG. 18 shows an exploded view of how the other components can be integrated on a substrate after forming the conductive lines and the electrodes as was discussed in FIG. 17. The electrolyte 184 (assuming this has the EC material) is deposited on top of the electrodes. The battery or solar cell or any other power source if used (183) is assembled so that its connector 183b connects to the pads 187a (or 177b as shown in FIG. 17). This connection is preferably established using ZCA. Similarly, the antenna 181 is connected using connectors 181b and they touch 186a (or 176a in FIG. 17). Finally the chip 182 is placed on the substrate so that its connectors 182b touch the interior pads. These pads are shown more clearly in FIG. 17 (i.e., 175a, 177a, 175b and 176b in order to electrically connect with the power source, antenna and all of the electrodes for the display. The sequence of integration may be any that is convenient. A preferred method is where all or some of these components are provided as flexible stickers on a roll with a release layer, and at the assembly point the release layer is removed and these are bonded to the substrate. The conductors may also be provided on a roll (e.g., see thermal transfer printing from Coding Products, Kalkaska, Mich.). The ZCA may be a part of the stickers or this may be dispensed. The sticker may encompass the connectors 181b and 183b, and not be sticking out as shown in the figure. Also shown in FIG. 18 is another layer 185. This is an opaque layer with a window 185b that is deposited on the substrate to hide all of the components from view other than the display. In addition this opaque layer can also be used to print any other information required for the product or use. This opaque layer may be deposited before printing the lines and electrodes in FIG. 17, or this may also be a laminated layer which is deposited on another substrate and then laminated to the label. A label so formed with all the components is shown in FIG. 19. FIG. 20 shows the assembly from the top side and FIG. 20b shows the same assembly from the bottom side. Any optional printed material on the opaque side is not shown. For a tag this may be completed by laminating this with another substrate. The other substrate with the opaque layer and printed matter may be provided on the assembly line with glue and a release layer, or the glue may be deposited on line. For a label where it may be bonded to a product container or package, one can deposit an adhesive (curable or pressure sensitive with a release layer) on the side which has all the components so that when the label is glued to the product package all of the components are hidden from the view. One may also laminate this using double sided adhesive with a pair of release layers where one of the release layers is removed in the process and the other is removed when the label is applied to the product. If need be the perforations as shown in the figures (e.g., see 172 in FIG. 17) may be formed at this stage.

One of the important issue in this assembly is to realize that most convertors will not have access to form all components by printing and further will not have high precision equipment. For example a manufacturer, such as Kovio or PolyIC, may provide printed electronics stickers on a roll that may be used for the above assemblies. Alternatively, one may use chips on regular silicon or other semiconductor substrates that are assembled with high precision on flexible substrates at a specialty shop so that the converts can use rolls of these materials and use these to assemble the labels using low precision equipment. An advantage of silicon chips is their ability to have more electronic features and memory and compatibility with a wide variety of global protocols, e.g., electronic product codes (EPC) standards, such as EPC Global Gen2 are promoted for RFID devices by GS1 EPCglobal (GS1 EPCglobal is a subsidiary of GS1, US offices of GS1 are located in Lawrenceville, N.J.). FIG. 21 is an exploded view of the assembly showing a substrate 210 on which a conductive pattern 211 is printed and a chip 212. The pattern end that is in contact with the chip will have high precision and narrow lines. However, the pads 211a that will eventually connect to the label are large and can be placed with low precision during label assembly. A complete chip assembly on the substrate is shown in FIG. 21b. FIG. 21c shows a plan view of the assembly and magnified images of the chip connections to the printed patterns is shown. These connections may also be formed by ZCA. The chip may have a ball grid array type or solder bump type of connectors (not shown) that rest on the printed conductive lines 211 on the substrate. The precision of the chip assembly is usually finer than about 100 microns, but preferably about +20 microns or lower. These assemblies may be provide on rolls of flexible substrate as discussed earlier and integrated with the final product at the label manufacturer's facility. A close-up of the chip and the integration with printed lines shows that all inputs and outputs (I/Os) on the chips are not being used. This may be fine if a generic chip is used for a variety of uses and only specific features of this may be used in the final product. One may connect all the I/Os to a printed pattern, and the label manufacturer may change printed pattern on the substrate of the label in a way to use or connect to only specific I/Os. This allows the label manufacturer to order one type of chip on a flexible substrate which may be customized to a different requirement from the end user of the label/tag product. In some cases one may be able to acquire partially integrated assemblies, e.g. a chip and an antenna assembled on a common substrate and the lines from the chip terminating as larger pads to avoid the issue of precision discussed above.

The above represents a flexible approach to make tags and labels by using printing technology and integrating them with pre-formed components, which may also have been manufactured by printing technology. For example, one converter may want to print the antenna along with the conductive lines and decide that a display module needs to be bought and integrated with the label, while another may print conductive lines and a display and buy the other components. Another example of this approach is also discussed below. Further, when several components are used to assemble them together it is highly preferred that the composition of all the flexible substrates be similar. As an example, one may use polyester for both the label stock and the other components. This keeps their thermal expansion characteristics similar and provides products and labels with lower propensity to fail, particularly at the conductive joints. Further, ZCAs should be flexible within the range of temperature the product is subjected to, for the labels to work reliably.

Figure 22:
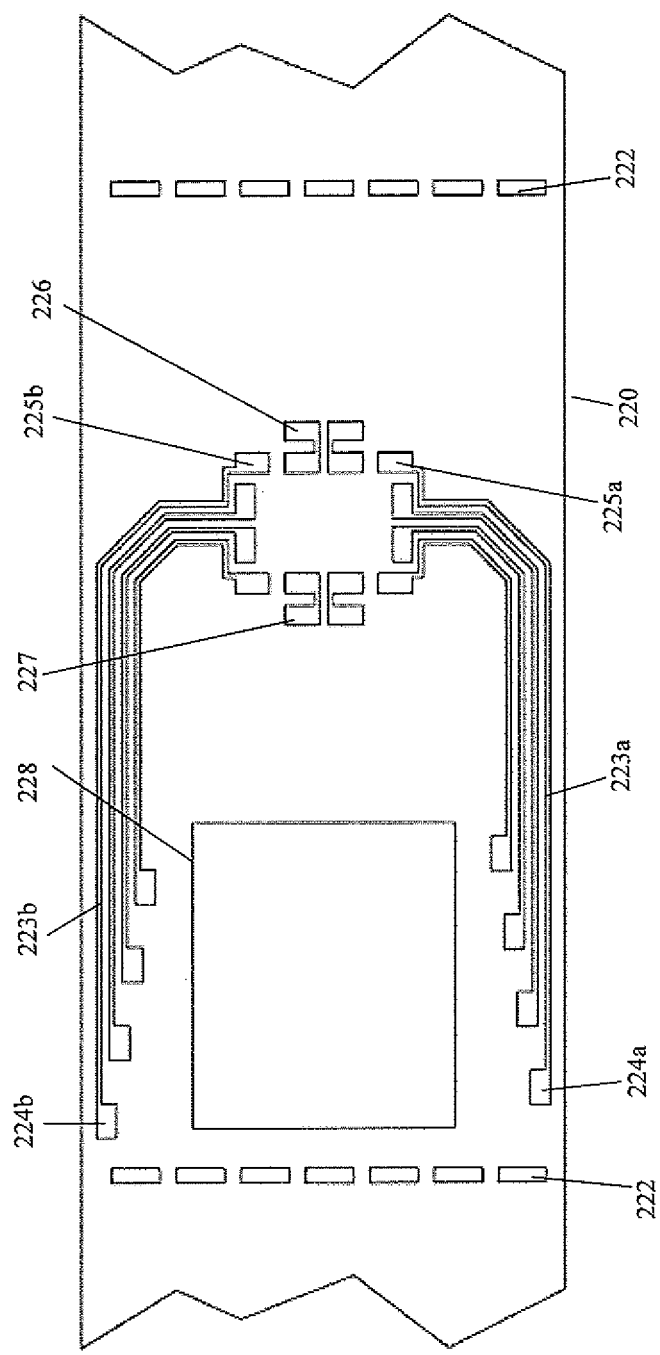
FIG. 22: Schematics of connections for placement of an electrooptic device and connections scheme to various tag components on a substrate.

A variation of the above concept is demonstrated where a display element is acquired or formed on another line and then integrated with the label. FIG. 22 shows part of a roll of labels 220 with the usual perforation lines 222 to separate one label from the other. Also shown are conducting printed lines 223a and 223b which will connect to the display via the pads 224b and 224a and to the chip substrate via 225a and 225b (for clarity only one of the four sets is labeled). The chip or the chip substrate will connect to the other components via pad sets 226 and 227, as explained earlier in FIG. 17. This also shows a cut-out 228 for mounting the display element which is fabricated offline or purchased (in a flexible roll or as a stack) so that it can be integrated. The display construction on a different substrate is shown in FIGS. 23, and 24. FIG. 23 shows a substrate 230 on which the connecting pads 232a and 232b along with the electrodes 231a and 231b are deposited (four of these, only one labeled for clarity). The electrodes and the connecting pads could be the same materials. The description of materials and deposition processes is the same discussed earlier in FIG. 17. This could be a part of a roll to roll process where these are fabricated by printing. FIG. 24a shows an exploded view which shows the substrate with electrodes 240 (this is again for interdigited electrode configuration, although other configurations may also be used) and then an electrolyte layer 241 can be deposited by printing or another process. The displayed is eventually viewed from the bottom side of 240 as shown by an arrow. 242 is another flexible layer (transfer connection sheet) that is used to transfer the electrical connections from substrate 240 to 242 using ZCA. To show this transfer process clearly, FIG. 24b shows another view of 242 where it is flipped over. This shows a sequence of features 243a and 243b which are formed by printing electrically conductive materials (generally the same materials 223a and 223b in FIG. 22 or 173a and 173b in FIG. 17). It is to these features that 232a and 232b, shown in FIG. 23, connect to. FIG. 24c shows an assembled view of 240, 241 and 242 which is together shown as 245. This is also shown in 24d where all the underlying layers are shown by dotted curves to show the connections. FIG. 25 shows the integration of 220 (from FIG. 22) and 245 from FIG. 24c or 24d. FIG. 25a shows the top view showing 245 and 220 and FIG. 25b shows the view from the bottom and the cut out 228 (see FIG. 22) through which the display 245 is visible. The visible parts of 243a and 243b (see FIG. 24c) connect with ZCA to 224a and 224b on the substrate 220. FIG. 26a shows a set of connections where 243b on the "transfer connection sheet" is used to electrically connect the display to the label or the electronics (only one of eight such connections shown is labeled for clarity). The same top and bottom views respectively of the label where all the connections are shown, are shown in FIGS. 26a and 26b. As discussed earlier in FIGS. 17 through 21 other elements (electronics, antenna, power source, backing adhesive, opacifying layers, etc) can be integrated to complete the label.

Figure 27:
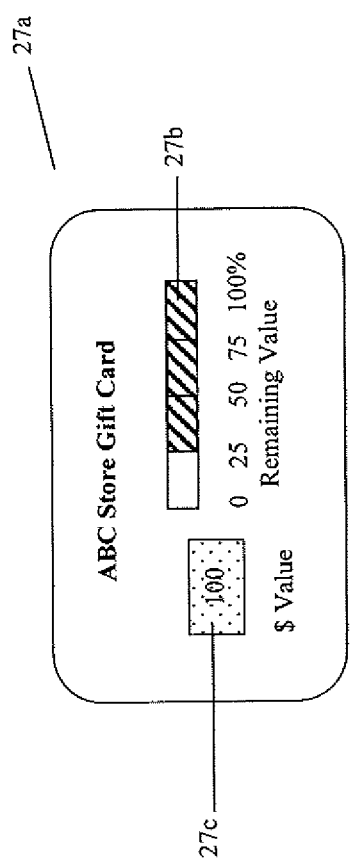
FIG. 27: Shows a card incorporating display according to the invention.
Figure 28A:
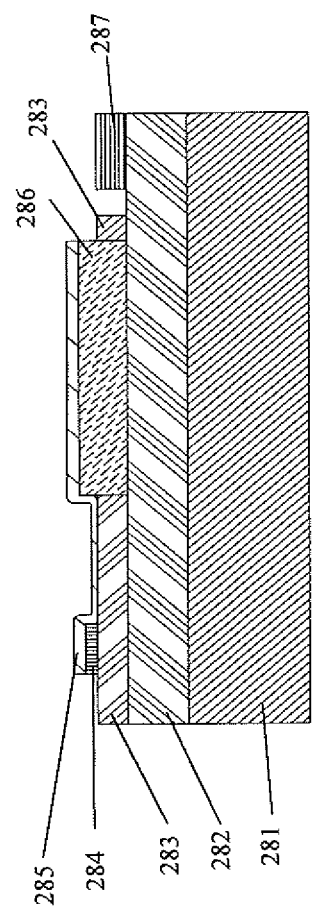
FIGS. 28a-f: Schematics of an indicative device and a processing sequence for its formation.
Figure 28B:
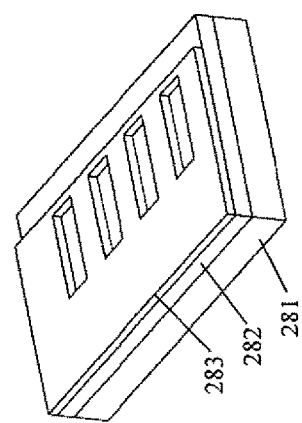
Figure 28C:
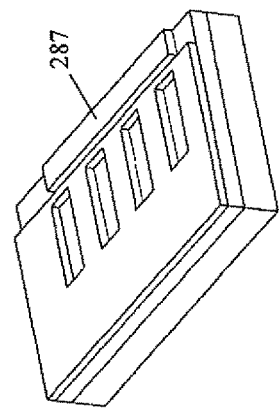
Figure 28D:
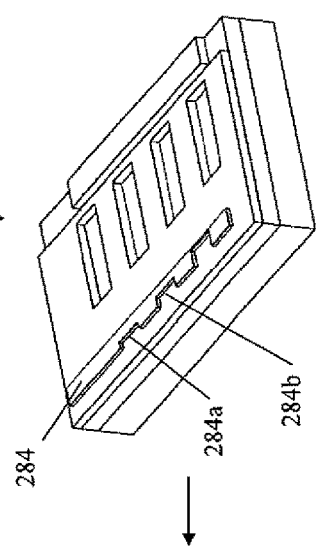
Figure 28E:
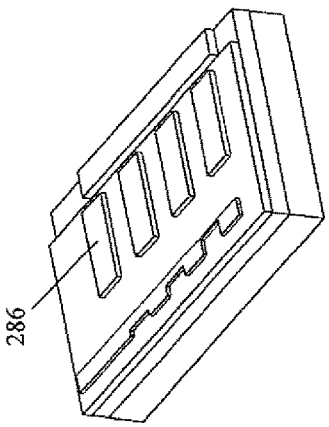
Figure 28F:
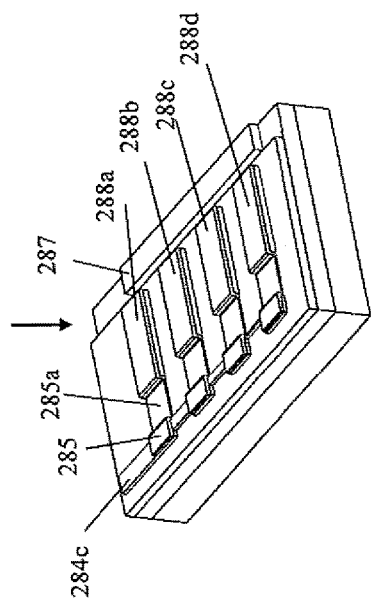

A particularly useful type of display for product labels, tickets, gift cards from various stores and tags which are disposable or replaced periodically uses an irreversible EC technology, where after activation (preferably wireless) an electronic signal is applied to the display so that the information is printed "forever" without the need of consuming additional power in order to continue to display the information. Printed "forever" means relative to the product life which may be a day to several years. A particularly preferred method of achieving this is by polymerizing a colorless or a differently colored monomer that produces a colored or a differently colored polymer as discussed earlier. The display may have a hidden message or a logo, which upon activation reveals a visible code. This can be used for a prize, or show that the product has expired, validation of the product, or may trigger another event. As an example, a store gift card may have a display, and when it is activated, the amount put into the card is displayed permanently. One may have receive several gift cards, and not know the amount unless they go to that store or one physically writes that information on the card. Further, one may store this amount information on the card or on a store network. Further, if the gift card has been used, it is difficult for the user to check the residual amount if any. Thus the display can be activated in a sequence of events as they happen. When the card is bought by a customer it is activated and the total value available is displayed. Later as it is used, the information is optionally updated to show the residual value as described below. One part of the display may be an alphanumeric or a numeric display and another part may be represented as a bar or a strip as described below. Upon the card activation, the initial amount appears on the display which is permanently shown. In addition to displaying the information on the initial amount, may have a bar formed by with several irreversible individually addressable pixels, strung together in a line (e.g., like a thermometer), and every time the card is used and some money consumed, the information is verified with the store network and/or the information on the card, and a proportional number of pixels change color giving a good estimate of the residual value. With increasing use as more of the funds on the card are used up, more of the pixels are activated with each successive activation. This provides the user with a visual cue on the card value prior to using the card or even visiting the store. A gift card based on such a system is shown in FIG. 27. The card is shown as 27a, and one display or part of a display shows the full amount of the card as $100 in 27b. This card also shows that the value of the card remaining is $25 or 25%, shown as 27c. Element 27c comprises of a bar with four pixels, but these can be in any number depending on the cost to produce this display and suitability of the application. Although the displays 27b and 27c are shown as separate, these are usually part of the same system with different windows or may be integrated within the same window. In a similar way a ticket may be configured, where separate parts of the tickets are activated at different times. For example, a part of the display is activated when the ticket is validated. Another part of the ticket is validated when an additional item. e.g., food is bought, and yet another part of the display on the ticket is activated when some prize is won, or different parts are activated as the customer goes from one event to the other. Another application could be the price tags for various products in the stores, e.g. an apparel store. There may be a few spots (say 0.2 sq cm spots/pixels, about 1-4 in number) on the labels that may be activated independently. When promotions are done then any number of these spots may be activated, where one active spot may mean a certain discount and more may mean a different discount/promotion. Since this can be implemented store wide, even if an item is misplaced in the store, its tag can still convey its status, and these tags do not have to be manually tagged for promotions. This activation may be permanent or fade away after some time so that if necessary this can be refreshed as necessary (e.g. once a day). Another example may be folders where such a display is located (e.g., a hanging folder or a binder). When a user is looking for a specific folder, the user sends a wireless signal to the entire drawer full of such folders each having a specific electronic address. Only those folders that the user wants are activated (by displaying an image or by a change in color of a tag) for sufficient time so that these are easily identified. For this reversible display is more suitable. One may also combine displays with reversible and irreversible elements on a single product. As an example, one area of the folder label may be reversible and other irreversible. The irreversible part of the label is activated when the folders need to be identified for discarding or to be permanently moved to another location.

Another method may be used wherein the display of the product (e.g., a card) is reversible but has only a limited persistent time, i.e., once the display is activated, the information is displayed for a "short while" and then fades away. "Short while" is again relative to the product life. This "short while" can be seconds, minutes or even several days. However, the last information displayed is stored in the chip (assembled or printed) on the card. This information may be readily displayed on the screen whenever the product is brought into an energy field, which is preferably a wireless system. This does not alter the amount left on the card, or interact with any feature that would allow the information from the card to be transmitted or altered. As an example, the last displayed information may be displayed when the product is coupled to a cellular phone, a Blue Tooth device, a source of light, or may be an activator designed to activate the display. This activator may be a small universal display activator that is powered by batteries or the mains.

FIG. 28 shows a method which can be used to create a series of bars that can be powered by a single connection. This means that each bar need not be connected to the power supply separately. This would allow chips (or power supplies) with few input/outputs (I/Os) to be used. This works o the principle that as each bar is colored it continues to drain current, thus there would be a potential drop in powering that bar or pixel. If the connections to the bars are configured so that the potential drop to color each bar is different, then depending upon the voltage applied by the power supply, and the resistance configured, the bars will experience different potentials. If the potential is above the coloring threshold, the pixel colors, if not then it stays bleached, unless the voltage is increased. Thus the voltage applied by the chip or the power supply can be controlled by the logic/software This allows one to display information by coloring a number of bars but using fewer I/Os. Since each bar or pixel requires one pair of I/Os, this would mean that this allows selectively one or more than one pixel (or bar or segment) to be colored in the display, and uses less number of I/Os, i.e., the number of I/Os are less then the number of pixels which need to be addressed independently. FIG. 28a shows a cross-section of such a device, where the section is taken through one of the pixels. 281 is a substrate with a conductive coating 282. 282 may be a conductive pattern that is deposited by printing and only needs to be below 286 and 287 to connect them electronically. 283 is an insulating layer (e.g., a polymer that is curable or may be deposited by solvent evaporation) deposited by a print process. 286 is the electrolyte comprising anodic and cathodic redox materials where at least one of them is electrochromic. One may have additional EC layers below or above the electrolyte which are not shown. 284 is a conductive busbar that connects all the pixels and will be described in more detail below. 285 is the top conductive electrode for powering the EC device that is also connected to the busbar 284. 287 is a conductive pad that is connected to the layer 282 to provide power to the bottom electrode of the EC device. FIG. 28b through 28f describe the complete layout of the device and its formation. One such sequence is described; however, it will be evident from the description below, that countless permutations are possible. A substrate 281 with a conductive coating 282 is utilized where an insulting layer 283 is deposited as shown in FIG. 28b. This also shows that four rectangular areas are left uncoated which will be used for depositing the EC material/electrolyte (see 286 in FIG. 28e). As shown in FIG. 28c, a conductive pad 287 is then deposited touching the layer 282, to form the bottom connection to the device. FIG. 28d shows addition of the busbar connector for all pixels (284) being added. This can be added at the same time as 287 and both formed from the same materials. Schematically, 284 shows that its width between the pads for each successive pixel decreases (compare 284a and 284b). This is showing the increased resistance between the successive bars. These may even be coils of conducting lines to achieve a specific resistance. It is preferred that this be formed by positive temperature coefficient materials (PTC) so that with increasing temperature the resistance of these paths do not change, so that the device performance can be maintained in a wide temperature range. The electrolyte 286 is then deposited as shown in FIG. 28e. Finally the top electrode 205 is deposited that connects the busbar 284 to the EC layer 286, as shown in FIG. 28f. Some of the notable variations are a process where the EC layer is deposited after forming the insulation layer, and then 287, 286 and 285 are deposited at the same time and are made of the same material. One can also introduce resistance in the landing area of 285 shown as 285a in FIG. 28f. When a potential is applied at terminals 285c and 287, the voltage drop at the closest pixel 288a is least and increases as one goes towards 288d (FIG. 28f). If the voltage applied is such so that even after accounting for the voltage drop it is above the threshold for coloration at pixel 288d, then all pixels (or bars will color). If the applied voltage is such that pixel 288d experiences a potential less than the threshold potential then it will not color, whereas if it is above the threshold for 208c then this and all the earlier ones i.e., 288a and 288b will also color. This EC device may also be used as an inexpensive, printable voltage gage or voltmeter. One may print alongside of the bars showing the applied voltage depending on how many of these pixels color.

Figure 29:
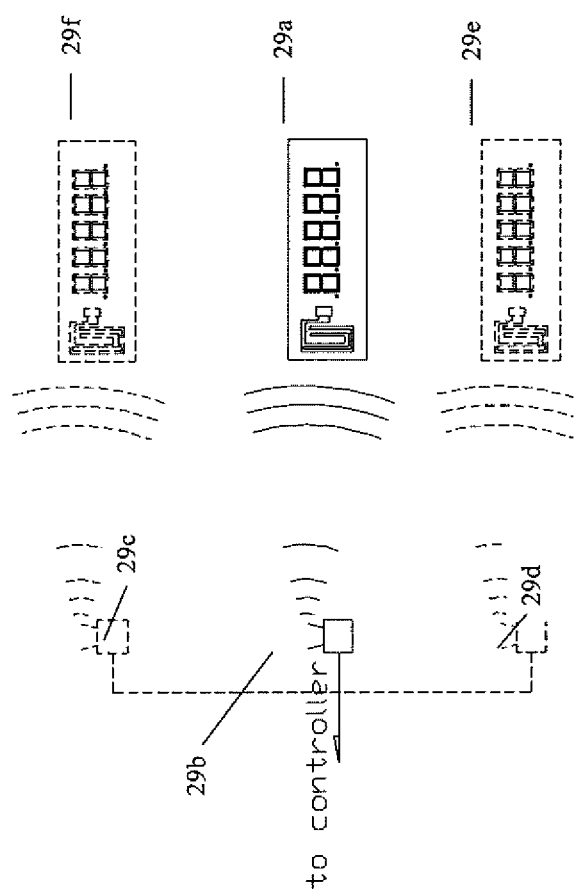
FIG. 29: Shows a schematics of a system that uses a display.

One display system that can be implemented in a store warehouse or other places is shown in FIG. 29. A wireless tag or a label 29a is shown that comprises at least of a display, a chip and an antenna (other components such as battery, solar cell, a capacitor or others may be added as discussed above). This could be a pricing tag or a product label. A control bus with a wireless transciever (29b) runs through the shelf or the area close to the wireless tag. A preferred distance between a wireless emitter and the tag is in the range of 1 cm to 10 meters. There could be a number of transceivers that may be hard wired running along the length of a shelf. A number of these (e.g., 29c and 29d) may communicate with a central communication system either wirelessly or they may be hard wired. Each one of these communicates with a specific display, e.g., 29d with 29e, 29b with 29a, and 29c with 29f respectively and so on. These wireless transceivers can draw power from the mains, or may have sufficient battery power. This system may be used to automatically update product pricing on a shelf, or indicate a special event, such as a sale. This may also be used to communicate with product labels to show a change in status, such as reduced pricing, expiration, etc. In the case of product labels each label, such as 29a in FIG. 29, represents a bunch of labels placed on the packages of identical product. In addition, the chip on the product labels can also assist to communicate in terms of inventory levels remaining on the shelf. These are located so that as the product is handled, these do not wear out, whereas the tags may be replaced periodically. The wireless transceiver may also be a hand held device or be located on a mobile cart or a rail, which communicates with the wireless tags as it approaches within the vicinity of communication/powering range. NFC may also be used at the check-out counter by the store scanning system, where the labels of expired items or for any other pre-determined reason may show a visual change so that an action may be taken at that point.

Figure 30:
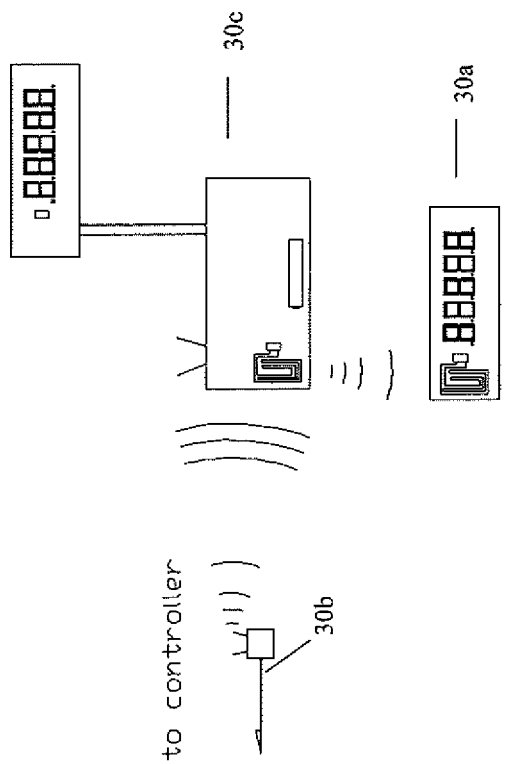
FIG. 30: Shows a schematics of a system that uses a display.

Another system is shown in FIG. 30. The wireless tag 30a communicates with a station 13c, which in turn is in communication with a wireless control system 30b. Station 30c may be powered by mains or by a battery. As an example, 30a may be a product label, 22c may be a checkout station of a store which communicates to a central inventory and product monitoring system 30b. At the checkout the communication between 30a and 30c and then between 30c and 30b establishes the product authenticity or makes sure that it is not expired or has not gone through storage conditions where it may not be suitable for the purpose. In this example 30b and 30c may also be hard wired. For example see U.S. Pat. No. 7,286,061 to understand the transaction at a systems level where authenticity may be established by providing a unique key or code to each package by the manufacturer which is verified at the point of sale via the network. In this case through sensors or other means, the time/temperature/humidity history is stored on the product label 30a. If the product is fine against a pre-defined criterion, an indicator changes color or information and is displayed on the tag 30a to assure its status.

Example 23: Display System with Wireless Activation

Figure 31:
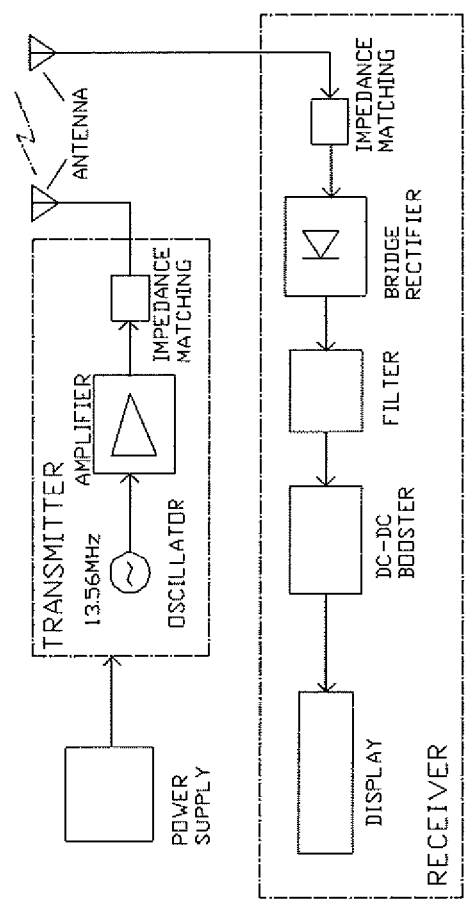
FIG. 31: Schematics of a wireless powered display system constructed using this invention.

FIG. 31 shows schematics of a wireless system with a transmitter and a receiver. The receiver includes a display. This receiver is equivalent to a tag or a label. The display was made as described in Example 14. The receiver was a passive type system, i.e., it had no power source other than the power derived from the antenna when it coupled with the signal from the emitting side. The transmitter was powered using a 12 VDC power source. Impedance matching for the antennas was provided on both sides. The physical separation between the two antennas was about 2 cm. The filter on the transmitter side provided a stable DC signal which was about 1.2V. This was increased by the DC-DC booster to an output voltage of 2.3V. This voltage was measured without any load or when the display was not connected. When the system was powered with the display connected, the output voltage dropped from 2.3 to 1.8V and the display colored. In an application the receiver will be packaged on a single substrate with all or most components to be printed as described earlier. This example only shows a powered passive wireless display. This does not show any intelligence on either side that can discriminate or make a decision on if the display must be powered when the system is energized. A chip or a printable chip may be placed and connected to the circuitry on both or only the receiver side as discussed earlier to add this functionality.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

The invention claimed is:

1. An irreversible electrochromic device, comprising:
a flexible substrate;
a redox material, wherein the redox material comprises an electropolymerizable monomer;
an electrolyte;
an electrically conductive electrode on the flexible substrate, the redox material or the electrolyte in electrical contact with the electrode; and
wherein an electrical activation using the electrode results in an electrically irreversible optical change to the redox material and wherein at least one of (1) the redox material, (2) the electrolyte material or (3) the conductive electrode material is printed.

2. An irreversible electrochromic device, comprising:
a flexible substrate;
a redox material, wherein the redox material comprises an electropolymerizable monomer;
an electrolyte;
a first electrically conductive electrode on the flexible substrate, the redox material or the electrolyte in electrical contact with the electrode;
a second electrically conductive electrode on the flexible substrate; and
wherein an electrical activation using the electrodes results in an electrically irreversible optical change to the redox material; and
wherein the electrically conductive electrodes further comprise an interdigitated electrically conductive electrode pattern of opposing electrodes that include the first electrically conductive electrode and the second conductive electrode on the flexible substrate.

3. The electrochromic device of claim 1, wherein the substrate is a polymeric material.

4. The electrochromic device of claim 1, wherein the electrode is transparent or opaque.

5. The electrochromic device of claim 2, wherein the interdigitated electrodes are transparent or opaque.

6. The electrochromic device of claim 1, further comprising:
the electrolyte positioned adjacent the electrically conductive electrode; and
wherein the redox material is in a separate layer from the electrolyte.

7. The electrochromic device of claim 1, further comprising:
the electrolyte positioned adjacent the electrically conductive electrode; and
wherein the redox material is in a same layer as the electrolyte.

8. The electrochromic device of claim 1, further comprising:
the electrolyte adjacent the electrically conductive electrode; and
wherein the redox material is in a same layer as the electrolyte and the redox material is also in a separate layer from the electrolyte.

9. The electrochromic device of claim 1, wherein the redox material is positioned adjacent the electrically conductive electrode and the redox material also functions as an electrolyte.

10. The electrochromic device of claim 1, wherein the redox material is constructed as a redox layer.

11. The electrochromic device of claim 1, where the conductive electrode material comprises a metal oxide, a conducting polymer, a conductive carbon, or a metal.

12. The electrochromic device of claim 2, further comprising the electrolyte material in electrical contact with the conductive electrodes.

13. The electrochromic device of claim 12, wherein the electrolyte material is disposed as a liquid formulation and is selected to be solidified by (a) thermal polymerization, (b) radiation polymerization or (c) removal of a solvent.

14. The electrochromic device of claim 1, further comprising an encapsulation coating that is positioned such that the redox material and the electrolyte are between the substrate and the encapsulation coating.

15. The electrochromic device of claim 14, wherein the encapsulation coating further comprises (a) a tape with pressure sensitive adhesive or (b) a polymeric coating, wherein the polymer coating is selected to be deposited as a liquid formulation and further selected to be solidified by (i) thermal polymerization, (ii) radiation polymerization or (iii) removal of a solvent.

16. An irreversible electrochromic device, comprising:
a flexible substrate;
a redox material, wherein the redox material comprises an electropolymerizable monomer;
an electrolyte;
an electrically conductive electrode on the flexible substrate, the redox material or the electrolyte in electrical contact with the electrode;
an encapsulation coating that is positioned such that the redox material and the electrolyte are between the substrate and the encapsulation coating; and wherein an electrical activation using the electrode results in an electrically irreversible optical change to the redox material and wherein the encapsulation coating is biodegradable.

17. The electrochromic device of claim 1, wherein the electrically conductive electrode is arranged to display information after the irreversible optical change.

18. The electrochromic device of claim 1, wherein the substrate or the redox material is biodegradable.

19. An electrochromic device, comprising:
an electrically conductive electrode pattern on a flexible substrate;
an electrolyte material and a redox material, the electrolyte material or the redox material in electrical contact with the electrode pattern, wherein the redox material comprises an electropolymerizable monomer;
an encapsulation coating to protect the electrochromic device; and
wherein an electrical activation using the electrode pattern results in an electrically irreversible optical change to the redox material and wherein at least one of (1) the redox material, (2) the electrolyte material or (3) the conductive electrode material is printed.

20. The electrochromic device of claim 19, wherein the electrolyte material and the encapsulation coating are selected to be deposited as a liquid formulation and then solidified.

21. The electrochromic device of claim 19, wherein the electrolyte material and the redox material are in a same layer.

22. The electrochromic device of claim 19, wherein the electrolyte material and the redox material are in different layers.

23. An electrochromic display comprising:
an irreversible electrochromic device further comprising:
a redox material and an electrolyte material, wherein the redox material comprises an electropolymerizable monomer;
a pair of conductive electrodes wherein at least one of the electrodes is in contact with the redox material; and
wherein the redox material undergoes an electrically irreversible change in its optical state when electrical power is applied to the conductive electrodes and wherein at least one of (1) the redox material, (2) the electrolyte material or (3) the conductive electrode material is printed.

24. The electrochromic display of claim 23, wherein the pair of electrodes comprise a conductive coating deposited on a substrate in an interdigitated conductive electrode pattern.

25. The electrochromic display of claim 23, wherein the pair of conductive electrodes are on separate spaced-apart substrates and the redox material and the electrolyte material are sandwiched between the electrodes.

26. An electrochromic display comprising:
an irreversible electrochromic device further comprising:
a redox material and an electrolyte material;
a pair of conductive electrodes wherein at least one of the electrodes is in contact with the redox material;
wherein the redox material undergoes an electrically irreversible change in its optical state when electrical power is applied to the conductive electrodes and wherein at least one of (1) the redox material, (2) the electrolyte material or (3) the conductive electrode material is printed; and
wherein one of the conductive electrodes is patterned such that when activated to change optical states the display irreversibly presents information.

27. An electrochromic display comprising:
an irreversible electrochromic device further comprising:
a redox material and an electrolyte material;
a pair of conductive electrodes wherein at least one of the electrodes is in contact with the redox material;
wherein the redox material undergoes an electrically irreversible change in its optical state when electrical power is applied to the conductive electrodes and wherein at least one of (1) the redox material, (2) the electrolyte material or (3) the conductive electrode material is printed; and
wherein at least one conductive electrode has a pattern of an electrically insulating layer partially covering the one conductive electrode, so that the covered portions of the one conductive electrode does not contact the redox material or the electrolyte material.

28. The electrochromic device of claim 2, wherein the redox material is a printed redox material.

29. The electrochromic device of claim 2, wherein the electrolyte material is a printed electrolyte material.

30. The electrochromic device of claim 2, wherein at least one of the conductive electrodes is a printed conductive electrode.

31. An electrochromic display comprising:
an irreversible electrochromic device further comprising:
a redox material and an electrolyte material;
a pair of conductive electrodes wherein at least one of the electrodes is in contact with the redox material;
wherein the redox material undergoes an electrically irreversible change in its optical state when electrical power is applied to the conductive electrodes and wherein at least one of (1) the redox material, (2) the electrolyte material or (3) the conductive electrode material is printed; and
wherein the redox material is a printed redox material.

32. An electrochromic display comprising:
an irreversible electrochromic device further comprising:
a redox material and an electrolyte material;
a pair of conductive electrodes wherein at least one of the electrodes is in contact with the redox material;
wherein the redox material undergoes an electrically irreversible change in its optical state when electrical power is applied to the conductive electrodes and wherein at least one of (1) the redox material, (2) the electrolyte material or (3) the conductive electrode material is printed; and
wherein the electrolyte material is a printed electrolyte material.

33. An irreversible electrochromic device, comprising:
a flexible substrate;
a first redox material, wherein the first redox material comprises an electropolymerizable monomer;
an electrolyte comprising the first redox material;
a second redox material
an electrically conductive electrode on the flexible substrate, the second redox material in electrical contact with the electrode and the electrolyte; and
wherein an electrical activation using the electrode results in an electrically irreversible optical change to the first redox material.

34. An irreversible electrochromic device, comprising:
a flexible substrate;
a first redox material, wherein the first redox material comprises an electropolymerizable monomer;

a second redox material;
an electrolyte comprising the first redox material and the second redox material;
an electrically conductive electrode on the flexible substrate, the electrolyte in electrical contact with the electrode; and
wherein an electrical activation using the electrode results in an electrically irreversible optical change to the first redox material.

* * * * *